United States Patent [19]
Ushio et al.

[11] Patent Number: 5,325,376
[45] Date of Patent: Jun. 28, 1994

[54] COMMUNICATION SYSTEM FOR DETECTING A COMMUNICATION ERROR IN INFORMATION TRANSMITTED BETWEEN A PLURALITY OF UNITS AND A MAIN CONTROL UNIT

[75] Inventors: Yukihide Ushio, Tokyo; Akio Noguchi, Ebina; Yoji Serizawa, Yokohama; Seiji Uchiyama, Tokyo; Kazuro Yamada, Machida; Makoto Takeuchi, Yokohama; Shimpei Matsuo, Tokyo, all of Japan

[73] Assignee: Canon Kabushiki Kaisha, Ohta, Japan

[21] Appl. No.: 658,391

[22] Filed: Feb. 20, 1991

[30] Foreign Application Priority Data

| Feb. 23, 1990 | [JP] | Japan | 2-043796 |
| Feb. 23, 1990 | [JP] | Japan | 2-043797 |
| Feb. 23, 1990 | [JP] | Japan | 2-043798 |
| Feb. 23, 1990 | [JP] | Japan | 2-043799 |
| Feb. 23, 1990 | [JP] | Japan | 2-043800 |
| Mar. 2, 1990 | [JP] | Japan | 2-051170 |
| Jun. 22, 1990 | [JP] | Japan | 2-164910 |

[51] Int. Cl.$^5$ ............................................. G06F 11/00
[52] U.S. Cl. ................................ 371/57.1; 371/55; 371/70
[58] Field of Search ............... 371/48, 30, 57.1, 49.1, 371/55, 70; 359/111, 113

[56] References Cited

U.S. PATENT DOCUMENTS

| 2,909,768 | 10/1959 | Kautz | 371/49.1 |
| 3,156,893 | 11/1964 | Harel | 371/55 |
| 3,652,988 | 3/1972 | Yamamoto et al. | 371/55 |
| 3,961,203 | 6/1976 | Hutch | 371/55 |
| 4,166,272 | 8/1979 | Deck | 371/70 |
| 4,389,636 | 6/1983 | Riddle, Jr. | 371/70 |
| 4,399,563 | 8/1983 | Greenberg | 359/113 |
| 4,422,179 | 12/1983 | Albanese | 359/111 |
| 4,425,647 | 1/1984 | Collins et al. | 371/70 |
| 4,723,309 | 2/1988 | Mochizuki et al. | 359/119 |
| 4,777,662 | 10/1988 | Nakata | 359/153 |
| 4,809,361 | 2/1989 | Okada et al. | 359/111 |
| 4,850,047 | 7/1989 | Iguchi et al. | 359/117 |
| 5,077,721 | 12/1991 | Sako et al. | 369/59 |

FOREIGN PATENT DOCUMENTS

| 0202602 | 11/1986 | European Pat. Off. |
| 0207313 | 1/1987 | European Pat. Off. |
| 0276794 | 8/1988 | European Pat. Off. |
| 0307749 | 3/1989 | European Pat. Off. |
| 2002543 | 7/1991 | Fed. Rep. of Germany |
| 2395560 | 1/1979 | France |
| 2213969 | 8/1989 | United Kingdom |

OTHER PUBLICATIONS

IEEE Trans. Comm., vol. COM-20, No. 2, Apr. 1972, pp. 87-93, Garliardi, "The effect of timing errors in optical digital systems."
Computer Design, vol. 19, No. 8, Aug. 1980, pp. 136-138, Rony, "Interfacing Fundamentals: Conditional I/O Using Two Microcomputers" Pat. Abs. Jp. vol. 12, No. 93, Mar. 26, 1988 and JP-A-62226260.

Primary Examiner—Charles E. Atkinson
Attorney, Agent, or Firm—Fitzpatrick, Cella, Harper & Scinto

[57] ABSTRACT

A communication system includes a main control unit controlling a plurality of units, a transmitter for transmitting information between the main control unit and the plurality of units, and an error detector. The error detector can include a modulator and demodulator for modulating or demodulating the transmitted information on the basis of a predetermined rule. The error detector detects a communication error in the transmitted information in accordance with the predetermined rule. Alternatively, the error detector can include a transmitted data creator/analyzer for creating data based on the transmitted information in a state in which the information contains positive data and negative data of the same bit in one frame and analyzes data when the data is received. This error detector detects a communication error in the transmitted information on the basis of the comparison between the positive and negative data. The error detector can also include a space bit addition separator for creating data based on the transmitted information in a state in which a predetermined space bit is added in one frame and separates the space bit when the data is received. This error detector detects a communication error in the transmitted information on the basis of the timing at which the space bit and other bits appear.

23 Claims, 51 Drawing Sheets

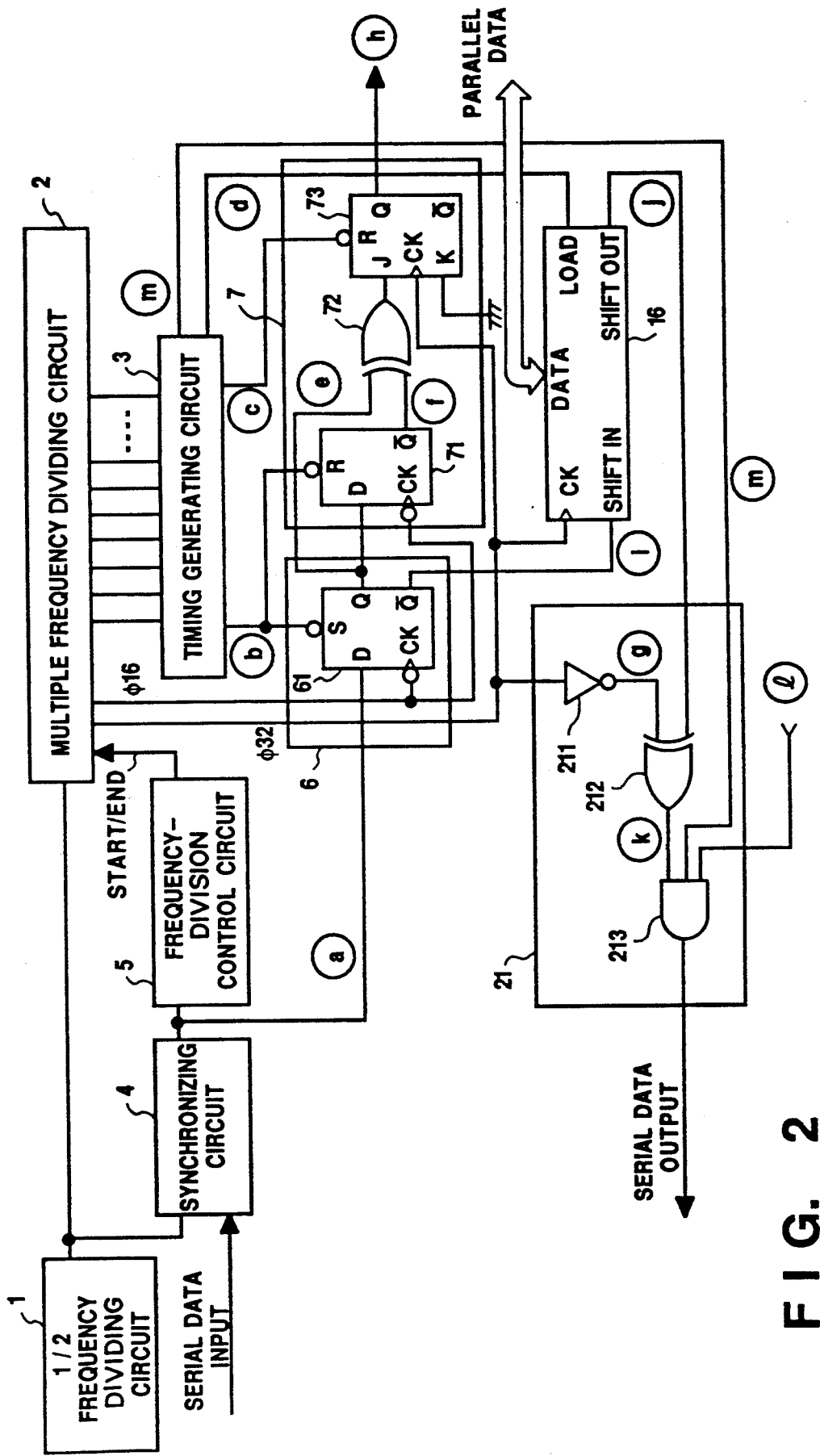
F I G. 2

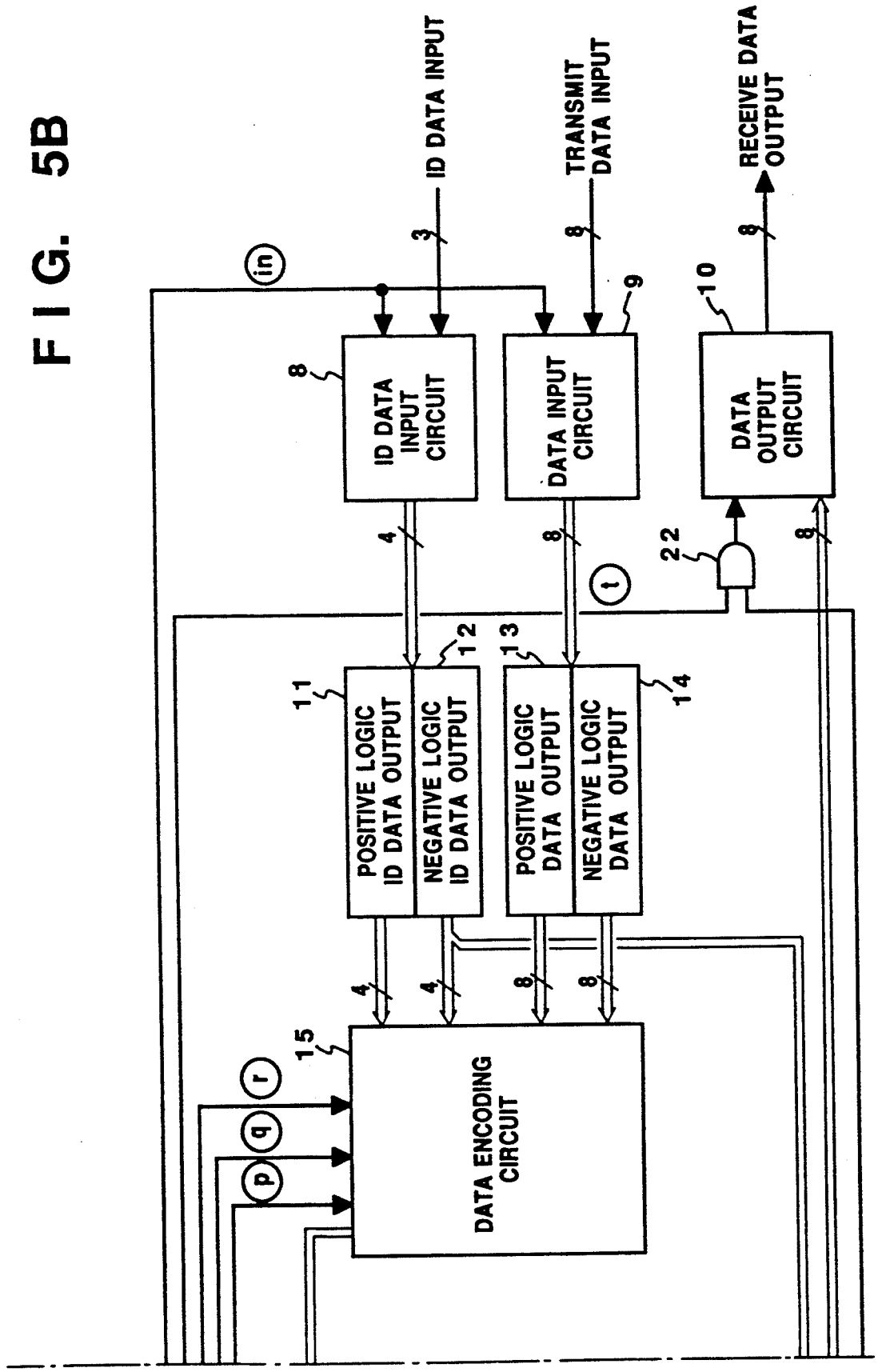

| < FIRST SHIFT LATCH DATA > | | |
|---|---|---|
| BIT0 | I | EXOR COMBINED WITH O |
| BIT1 | O | EXOR COMBINED WITH I |
| BIT2 | ID2 | EXOR COMBINED WITH /ID2 OF NEGATIVE LOGIC ID DATA 12 |
| BIT3 | ID1 | EXOR COMBINED WITH /ID1 OF NEGATIVE LOGIC ID DATA 12 |
| BIT4 | D7 | EXOR COMBINED WITH /D7 OF THIRD SHIFT LATCH DATA |
| BIT5 | D6 | EXOR COMBINED WITH /D6 OF THIRD SHIFT LATCH DATA |
| BIT6 | D5 | EXOR COMBINED WITH /D5 OF THIRD SHIFT LATCH DATA |
| BIT7 | D4 | EXOR COMBINED WITH /D4 OF THIRD SHIFT LATCH DATA |

| < SECOND SHIFT LATCH DATA > | | |
|---|---|---|
| BIT0 | D3 | EXOR COMBINED WITH /D3 OF SECOND SHIFT LATCH DATA |
| BIT1 | D2 | EXOR COMBINED WITH /D2 OF SECOND SHIFT LATCH DATA |
| BIT2 | D1 | EXOR COMBINED WITH /D1 OF SECOND SHIFT LATCH DATA |
| BIT3 | D0 | EXOR COMBINED WITH /D0 OF SECOND SHIFT LATCH DATA |
| BIT4 | /D0 | |
| BIT5 | /D1 | |
| BIT6 | /D2 | |
| BIT7 | /D3 | |

| < THIRD SHIFT LATCH DATA > | | |
|---|---|---|
| BIT0 | /D4 | |
| BIT1 | /D5 | |
| BIT2 | /D6 | |
| BIT3 | /D7 | |
| BIT4 | /ID2 | EXOR COMBINED WITH ID2 OF FIRST SHIFT LATCH DATA |
| BIT5 | /ID1 | EXOR COMBINED WITH ID1 OF FIRST SHIFT LATCH DATA |
| BIT6 | /ID0 | EXOR COMBINED WITH ID0 OF FIRST SHIFT LATCH DATA |
| BIT7 | ID0 | EXOR COMBINED WITH /ID0 OF NEGATIVE LOGIC ID DATA 12 |

F I G. 6

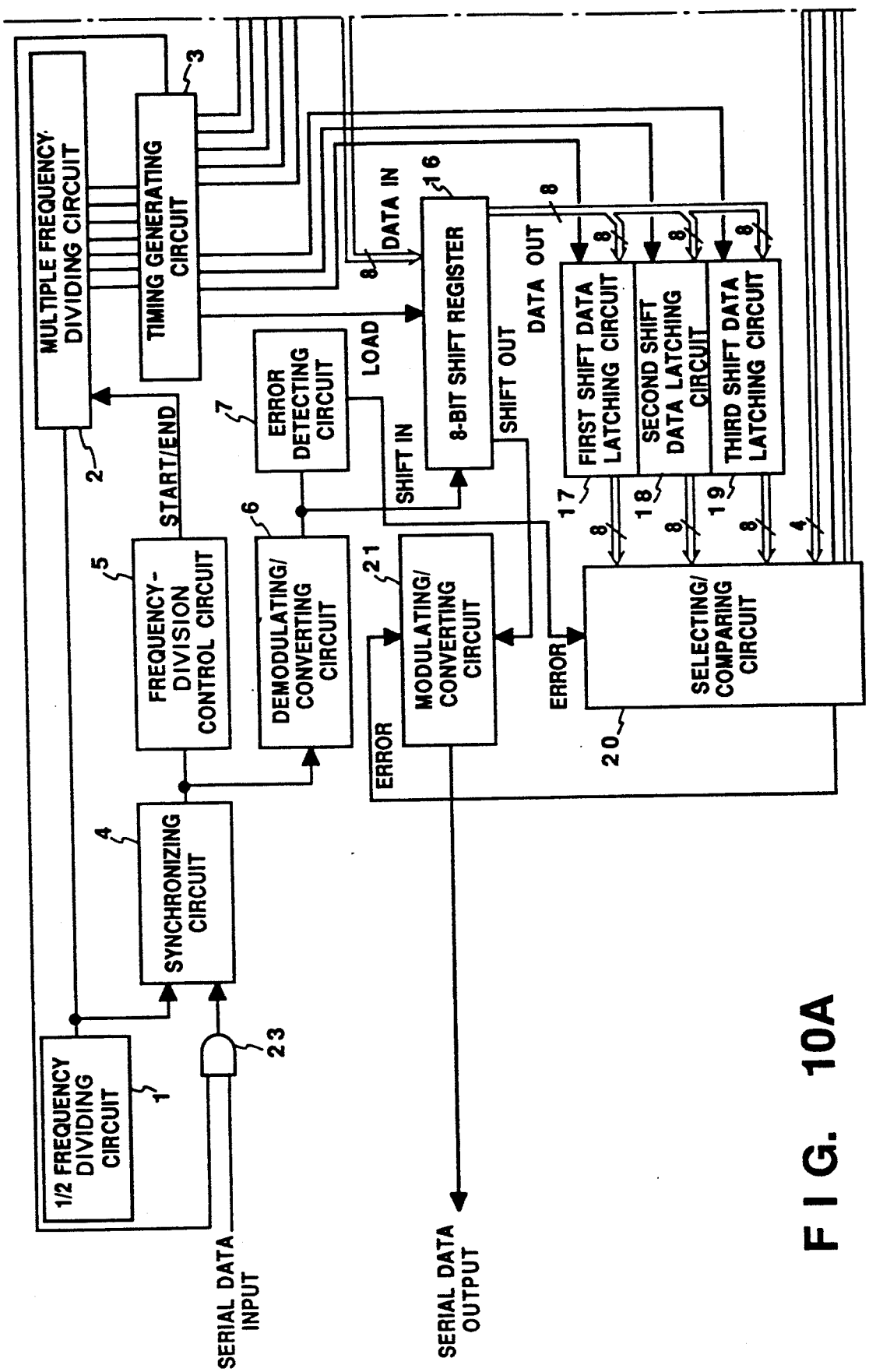
F I G. 10A

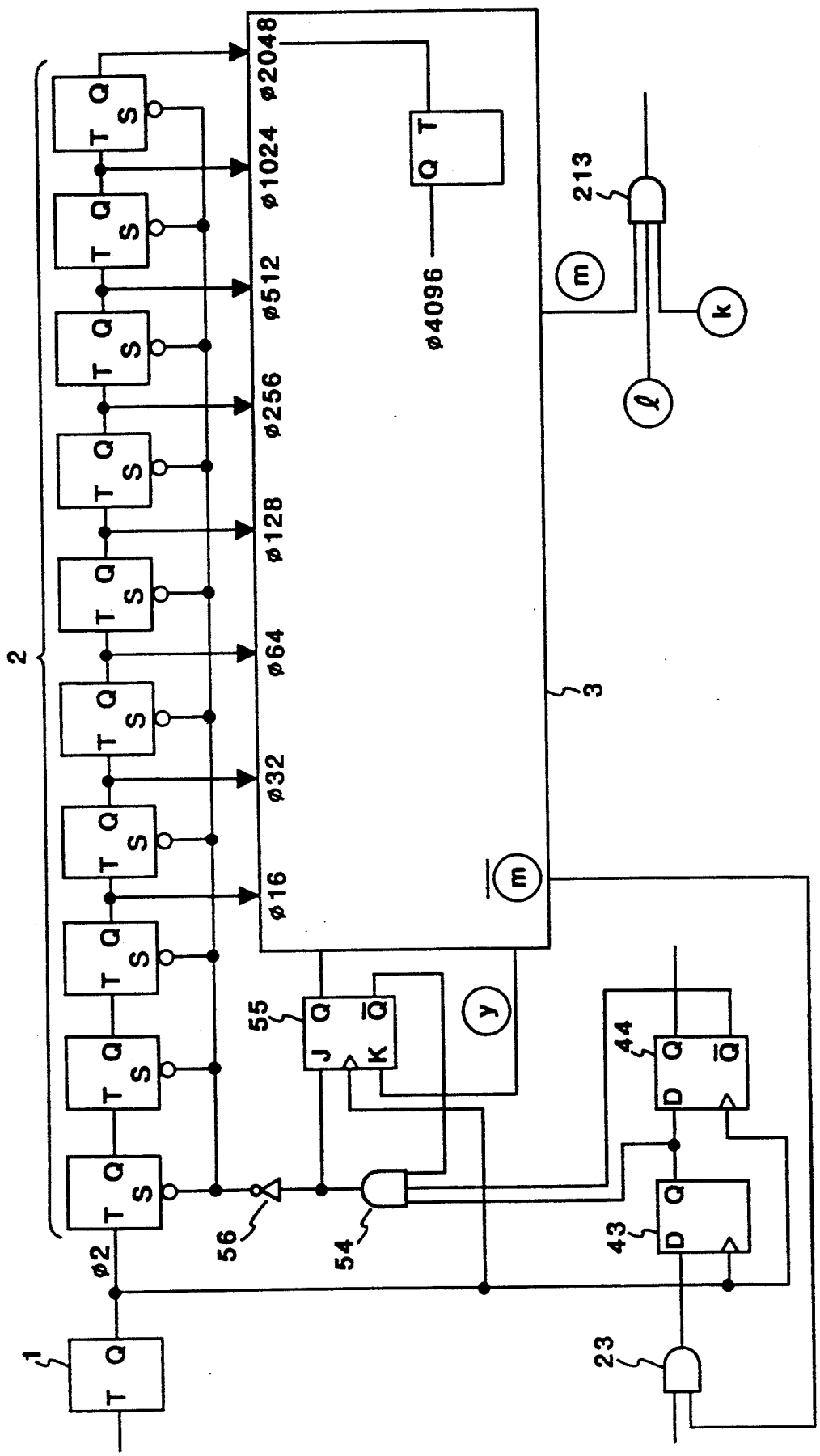
F I G. 12

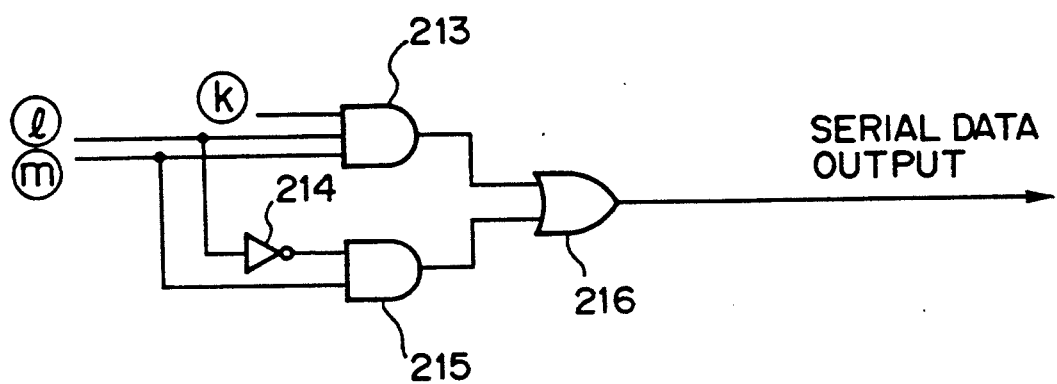
F I G. 14

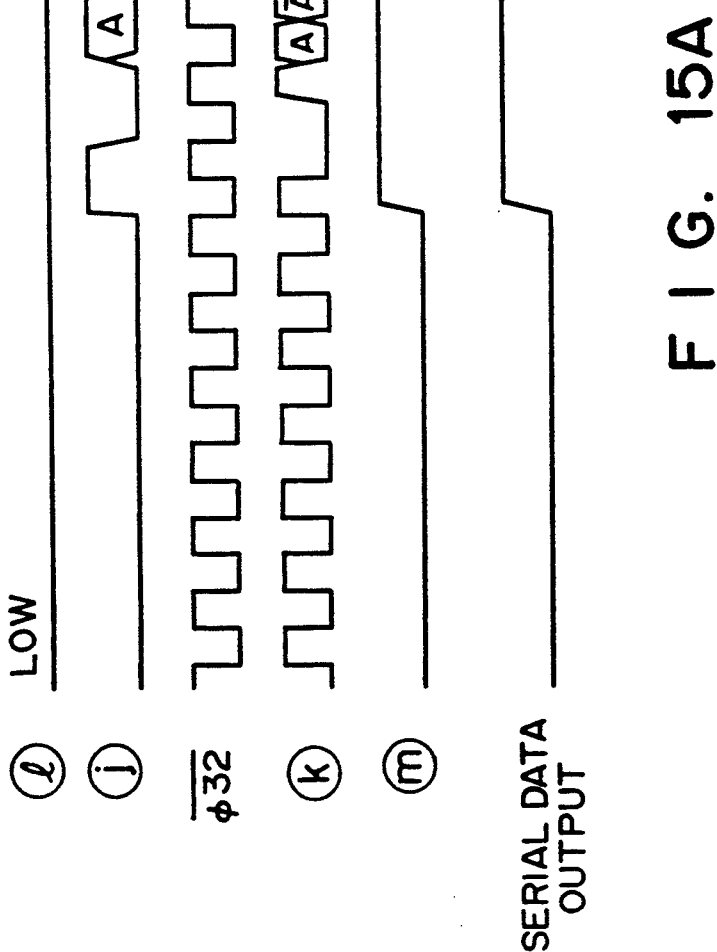
F I G. 15A

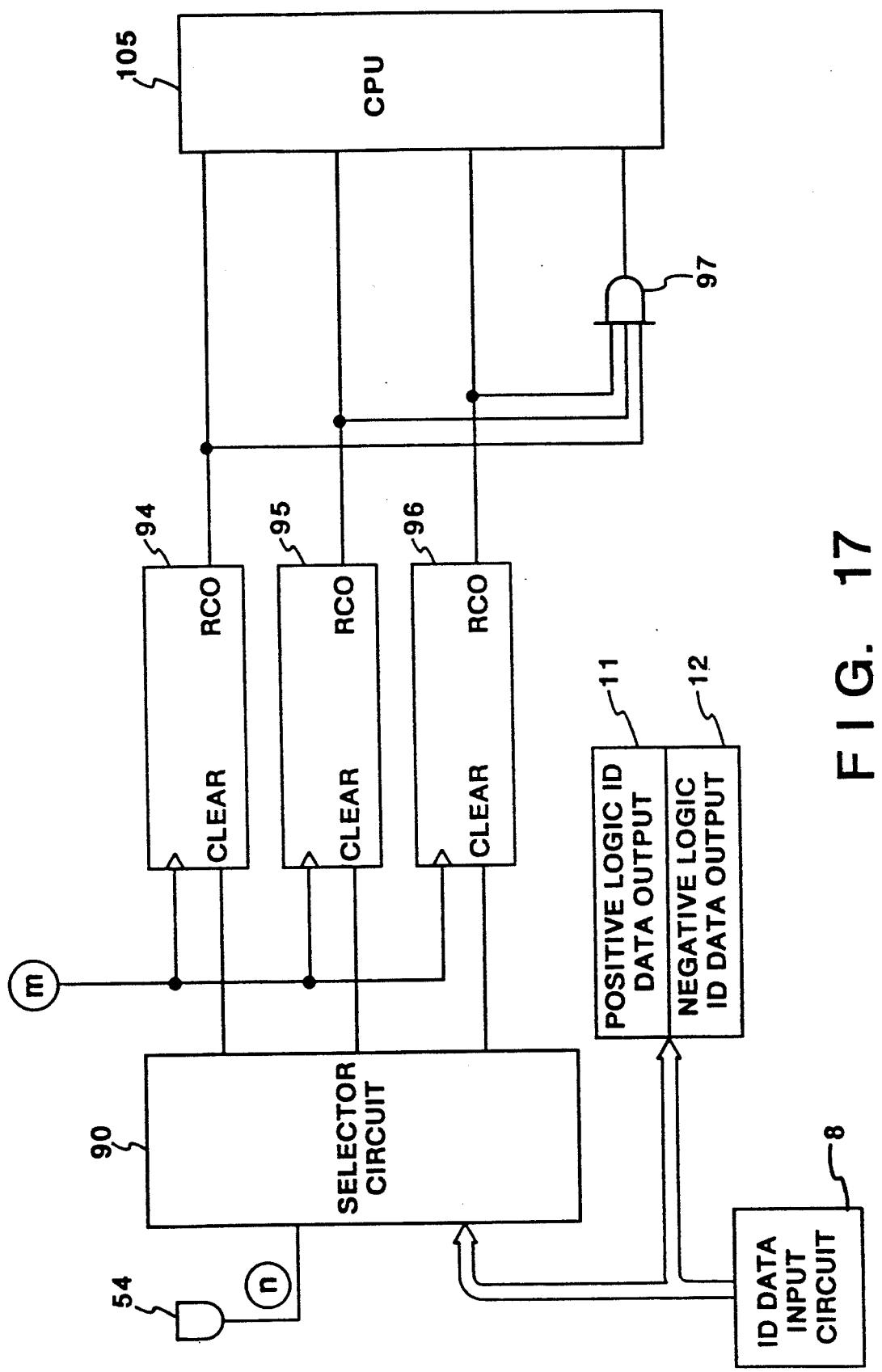
F I G. 17

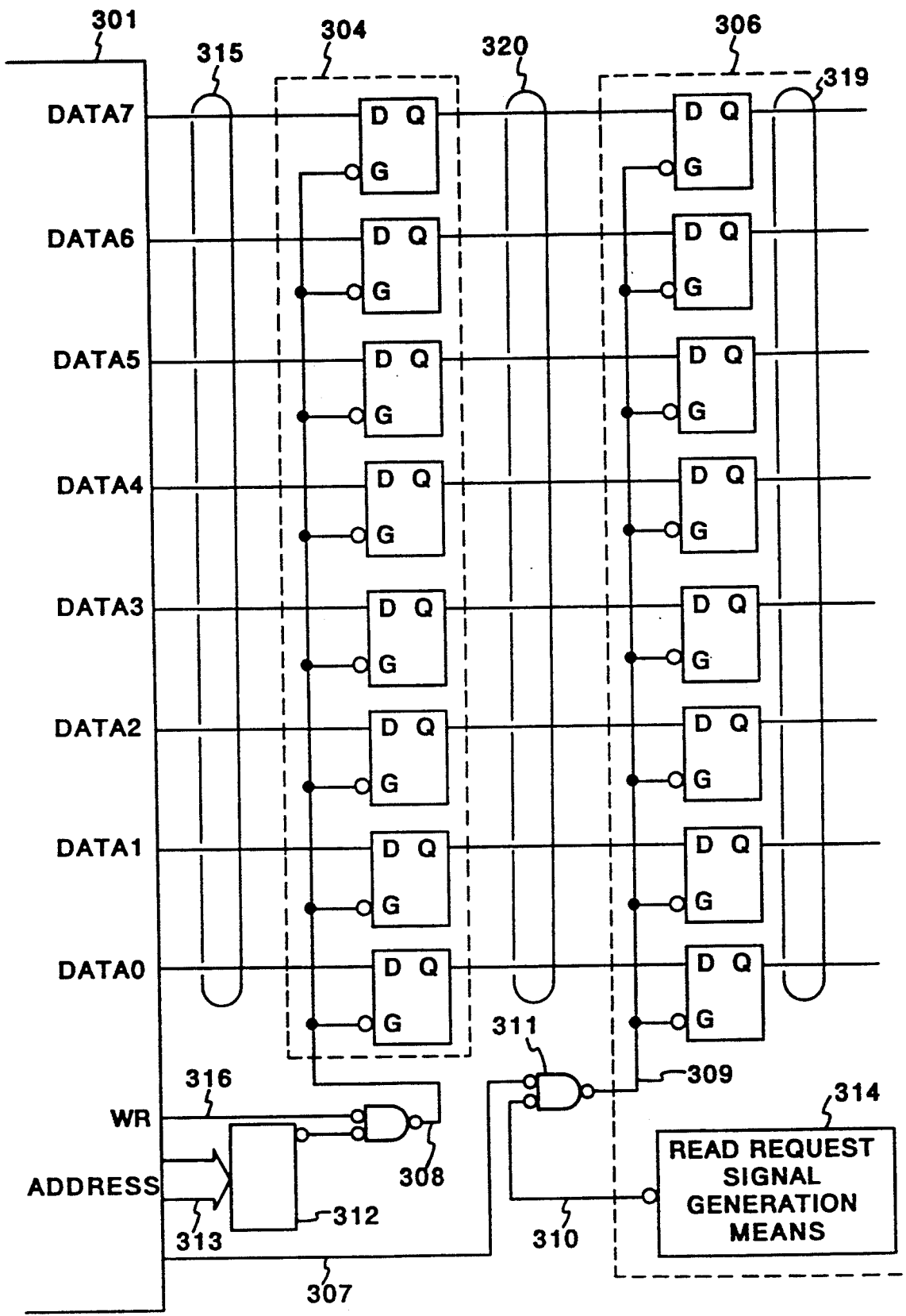
F I G. 22

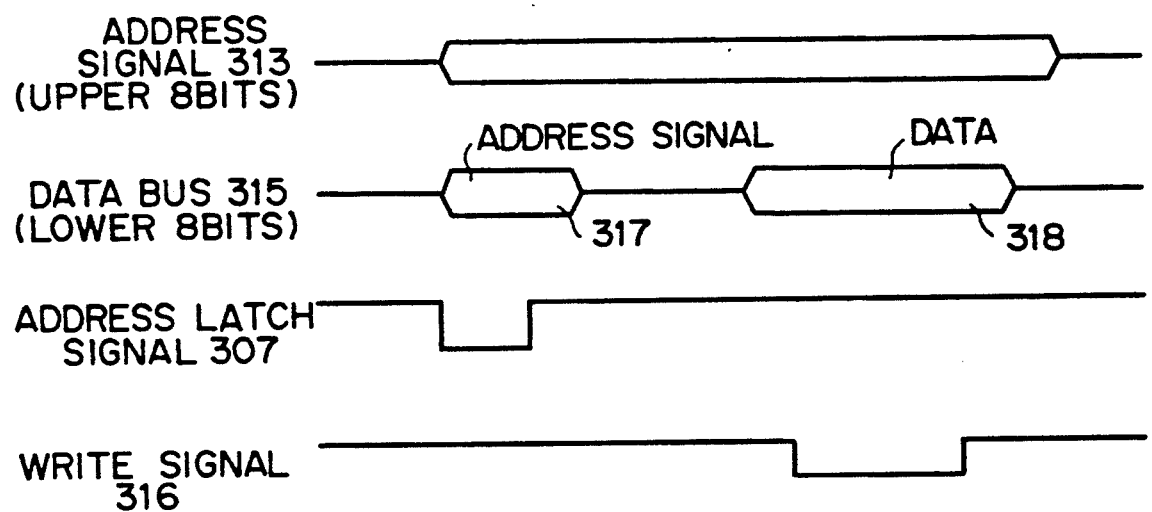
F I G. 23

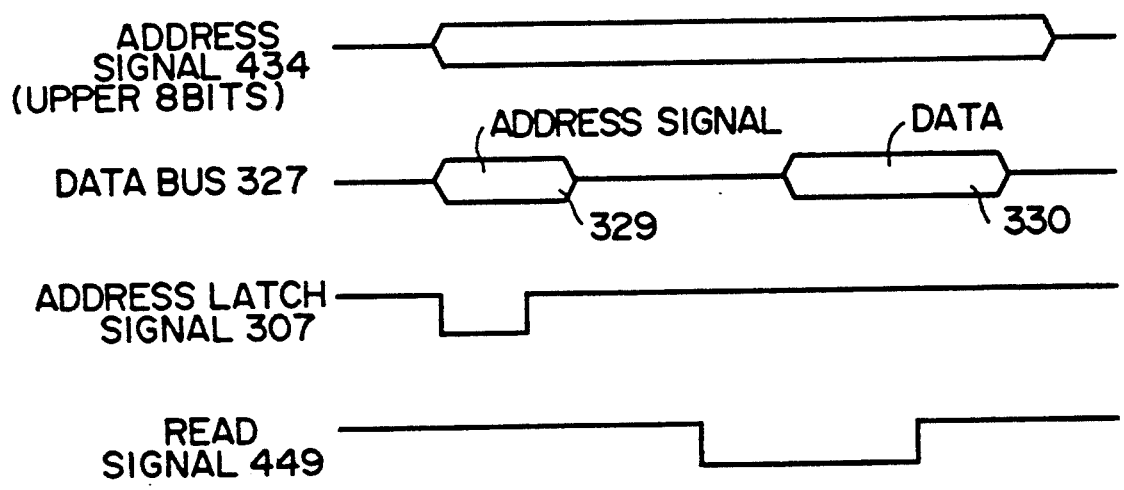
F I G. 27

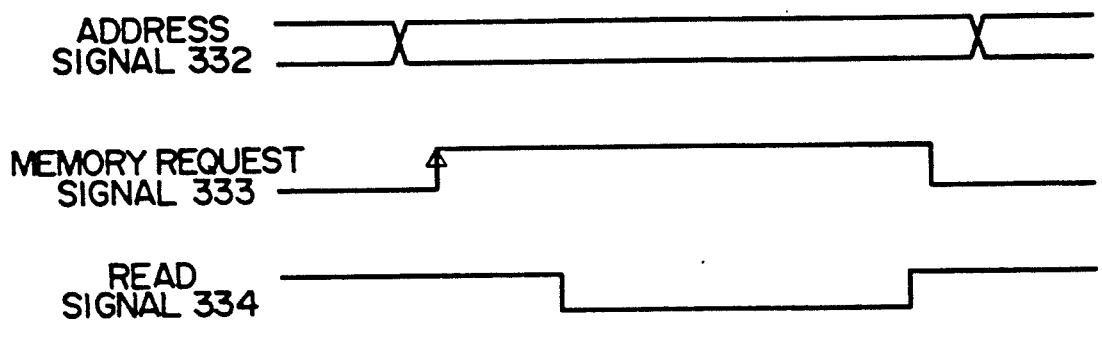
F I G. 29
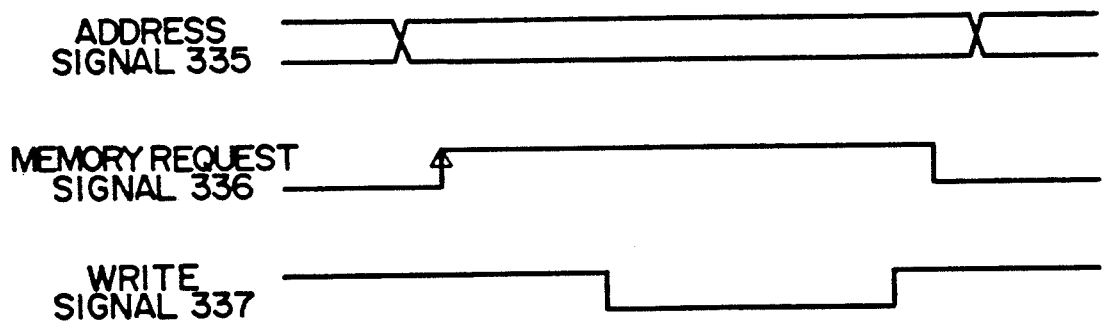
F I G. 30

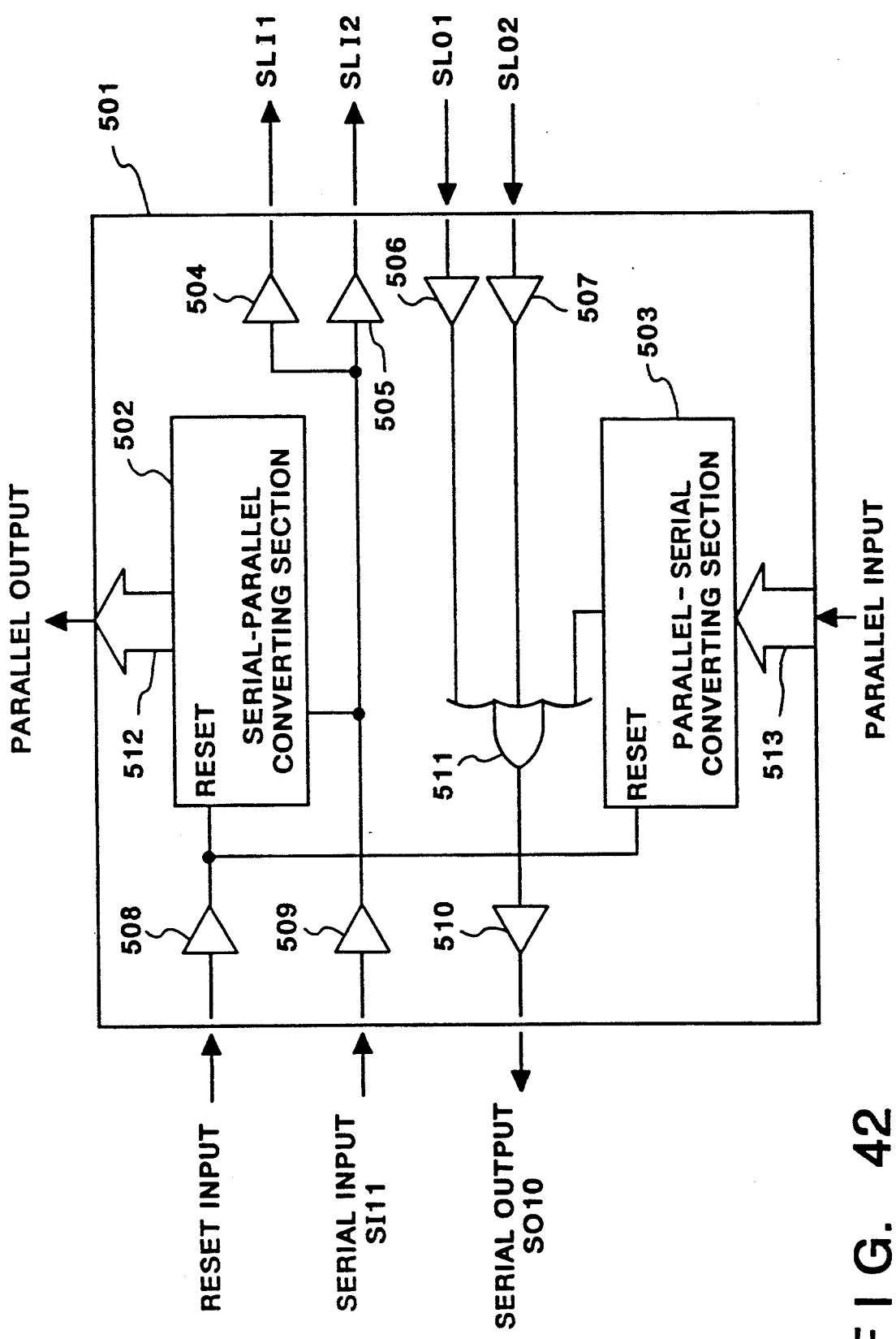
F I G. 42

COMMUNICATION SYSTEM FOR DETECTING A COMMUNICATION ERROR IN INFORMATION TRANSMITTED BETWEEN A PLURALITY OF UNITS AND A MAIN CONTROL UNIT

BACKGROUND OF THE INVENTION

1. Field of the Invention

The present invention relates to a unit control oriented communication device for exchanging information between a group of units scattered inside and outside of a system and a main control section for controlling the group of units, and more particularly, to an optical radio communication device which utilizes light (hereinafter referred to as a wireless optical communication device).

2. Description of the Related Art

Conventionally, a copier, a FAX, or a laser beam printer (hereinafter referred to as an LBP) is composed of a main control portion for controlling the entire system and a group of units scattered inside and outside of the system. The group of units are each composed of an output control section comprising a motor, a fan or an actuator, such as a solenoid, and an input control section comprising switches and sensors. In that case, the input/output control sections are respectively controlled mainly through an I/O port of a CPU. Since these input/output control subjects are scattered within the system, they are connected with each other through a wire harness. These input/output control subjects are connected to the main control portion independently from each other (hereinafter referred to as parallel connection). Alternatively, the main control portion serially transfers data to each unit utilizing serial communication. Each unit conducts "serial-parallel conversion", by which the control subjects are connected to the main control portion independently.

An example of the aforementioned parallel connection will be described. In the case of a system shown in FIGS. 31 and 32 which consists of units 406 and 407, the unit 406 serves as a control unit, and the unit 407 serves as a controlled unit (on which a mechanism part, such as a solenoid, is mounted). In this case, a CPU 301 is connected through signal lines directly to respective mechanism portions 401, 402, 403 and 404 in the controlled unit (FIG. 31) to control them. Although an amplification means or the like, such as a transistor, is disposed between the control unit 406 and the controlled unit in an actual circuit configuration, it is omitted in FIGS. 31 and 32 in order to explain the flow of signals.

In another case, the subjects to be controlled are controlled by the CPU 301 through an I/O expansion device 301a, as shown in FIG. 32.

In the above-described methods, the number of signal lines (signal line bundles) increases in proportion to the number of subjects to be controlled, and this makes reduction in the overall size of the system difficult.

That is, as the number of functions of the system increases, the number of input/output control subjects increases, thereby increasing the number of control lines for parallel connection. As a result, production cost increases, and assembly efficiency deteriorates. Hence, the general trend is toward an arrangement of scattered output and input signals into a plurality of physical or functional blocks and transmission of signals by the serial communication.

Serial communication commonly conducted between the main control portion and the group of units is asynchronous serial communication, called UART, or clock synchronizing type serial communication.

In the former type of serial communication, a single frame consists of twelve bits, including a starting bit (1 bit), a data bit, and a stop bit (2 bits). The transmission side outputs a signal representing one frame with a predetermined period. The reception side reads data representing one frame at the same period as the transmission side when it confirms the starting bit.

In the latter type of serial communication, a single frame consists of eight bits. The transmission side outputs a signal representing one frame with a clock signal and a data signal separately through corresponding paths. The reception side reads the status of the data signal at a timing at which a clock signal rises or falls and receives data representing one frame.

However, the above-described conventional methods have the following disadvantages.

(1) In the method of decreasing the number of control lines by conducting serial transfer from the main control portion utilizing serial communication such as UART, a malfunction may occur due to the erroneous transfer caused by noise generated in the system, or the control line may generate radiation noises in the form of an electric field as the serial transfer speed increases.

To overcome this disadvantage, radio transmission of data using light has been considered.

In the field of electric appliances, radio transmission of data using light, so-called remote control, has been conducted. However, such a system is of the unidirectional type (in which data is transmitted only from the transmission device to the reception device). Furthermore, the data transmission speed is such that it cannot catch up with the transmission speed of input/output signals in, for example, a copier, FAX or LBP. Furthermore, when optical transfer is conducted at a relatively high speed in two directions, collision of light or erroneous transmission caused by a disturbance may occur. Also, the existence or non-existence of the reception device cannot be determined at the main control portion. Furthermore, adjustment or checking conducted during the assembly is troublesome, and reduces efficiency.

(2) Although there is no problem in the case of transmission of a signal consisting of one bit, when a signal consisting of a plurality of bits is to be transmitted, all the bits do not change at one time, and transmission of an erroneous signal may thus occur unless data latching is not adjusted.

This problem will be explained in detail with reference to FIG. 33.

In the case shown in FIG. 33, communication is made between the units 406 and 407 through a communication line 405. The communication line 406 may be parallel or serial. This choice is made depending on the transfer speed or the application of the transfer. Although this communication is more advantageous when a plurality of units 407 to be controlled exist, the units 406 and 407 make one-to-one correspondence in this case for the ease of explanation.

A CPU 301 and a transmission means 409 function independently. The CPU 301 sends transmit data to a transmission register 408. The transmission means 409 transfers the content of the transmission register 408 to the unit 407 at predetermined time intervals. A reception means 302 transfers the received data to the individual mechanism sections 401, 402, 403 and 404.

In order to control the unit 407, monitoring of an external status is required. Fetching of externally monitored signals to the CPU 301 through the communication line will be described below with reference to FIG. 34.

A signal from sensors (for example, microswitches or photo-interruptors) 410, 411, 412 and 413 is transferred from a transmission means 303 to a reception means 414. A communication line 416 which connects the transmission means 303 and the reception means 414 may be of the parallel or the serial type. The reception means 414 writes receive data in a reception register 415. The reception register 415 is connected to the CPU 301, and the CPU 301 can read the content thereof at a desired time. That is, new data (which represents the state of the mechanism sections 410, 411, 412 and 413, in this case) is kept stored in the reception register 415.

The transmission register 408 and the reception register 415 will be described in more detail.

FIG. 35 explains the operation of the transmission register 408. The transmission register 408 is required for the CPU 301 and the transmission means 409 being operated independently. The number of bits for the register 408 must be made to coincide with the total number of bits in the destination unit.

In order to conduct mapping between the transmission register 408 and the CPU 301 and thereby assign a certain address of the CPU 301 to the register 408, a write signal 438 is created by decoding an address signal on an address bus 434 by means of a decoder 435 and then by performing an AND operation on the decoded address signal and a write signal 433. The transmit data is transferred to the transmission register 408 synchronously with the write signal 438.

The transmission means 409 latches the content of the transmission register 408 synchronously with a latch signal 439 from a control circuit 437. That is, the transmission means 409 takes in data from the transmission register 408 to its latches corresponding to the bits of the data, e.g., the data in a latch 417 is latched to a latch 425, the data in a latch 418 is latched to a latch 426, and so on. Thereafter, the transmission means 409 conducts transmission operation independently.

Next, the reception register 415 will be described in detail with reference to FIG. 36. Once the reception means 414 receives data from the transmission means 303 of the external unit 407, it outputs a write pulse 452 and latches the data in latches 440 to 447 of the reception register 415. The receive data is read by the CPU 301 from the reception register 415 by means of a signal obtained by decoding an address signal 434 output from the CPU 301 for mapping by a decoder 448 and then by performing an AND operation on the decoded signal and a read signal 449.

Unit control is thus performed through the communication lines 405 and 416.

In a case where data is transmitted from the CPU 301 to the unit 407, the timing of the write signal 438 of the CPU 301 may differ from that of the read-out signal 439 of the unit, as shown in FIG. 37. In that case, data 453 output from the CPU 301 may be latched in the transmission register 408 at a time indicated by data 454 in FIG. 37, and that data may be read in the transmission means 409 at a time indicated by data 455 in FIG. 37. Erroneous transmission of the data does not occur when the data is read in the transmission means 409 at a time other than a transition of the data 454, as in the case of the above-described case. The same thing applies to the case in which data is transmitted to the CPU 301. In the case shown in FIG. 36, data 457 from the reception means 414 is latched in the reception register 415 by the write signal 452 at a time indicated by data 456 in FIG. 38. The latched data 456 is taken in the CPU 301 by the read signal 451 at a time indicated by data 458 in FIG. 39. There is no problem in the case shown in FIG. 38 in which the data is taken in the CPU 301 at a time other than a transition of the data 456.

However, the above-described conventional technique has the following disadvantages.

In the case of the signal whose one bit has a significance, like the signals 401 and 402 shown in FIG. 33 and like the signals 410 and 411 shown in FIG. 34, there is no problem. However, in the case of a significant signal consisting of a plurality of bits, since transition does not occur on the individual bits simultaneously, erroneous transmission may occur.

That is, in a case where the transmission means 409 latches data at the transition of the data 454, as shown in FIG. 39, the transmit data subsequent to a reference number 459 is not guaranteed. Also, in a case where the CPU 301 reads in data at the transition of the data 456, as shown in FIG. 40, data subsequent to 460 is not guaranteed.

In order to avoid this disadvantage, a handshake may be conducted in terms of software or hardware between the CPU 301 and the transmission means 409 or between the CPU 301 and the reception means 414. However, this requires complicated additional circuits and hence increases the production cost of the system.

(3) Parallel connection between a communication device (hereinafter referred to as a master) of the main control portion and the communication device (hereinafter referred to as a slave) of each of the group of units is easily affected by noise or the like. In the case of a series connection, the unit to be controlled independently may affect or be affected by other units.

When the operation of a system is to be controlled utilizing the serial communication for the exchange of information between the central processing unit for executing the main control of the system and the individual units which scatter in the system, the system is conventionally structured in the manner shown in FIG. 45.

In FIG. 45, a master 550 is a main communication device in the central processing unit which controls serial communication. Slaves 551 to 554 are sub-communication devices in the individual units scattered in the system which conduct serial communication and executes information exchange.

In this serial communication, the master and slaves make 1-to-N correspondence. Therefore, exchange of serial data signal is conducted between the main communication device and the individual sub-communication devices which are parallel-connected to the main communication device independently.

Therefore, in the above-described conventional system, the communication lines for the serial data signal are extended over a long distance because of parallel connection, causing malfunction to occur due to the noise generated within the system. Furthermore, its drive ability of the master communication device must be enhanced by providing a drive means in the master communication device. This may increase the production cost.

Furthermore, in the case of a unit that can be detachably mounted by a user, the serial data signal lines may directly receive external noise from the connector of the detachably mounted unit, which leads to breakage of the main control unit. This increases maintenance cost.

Furthermore, in a case where an abnormality occurs in the system, the sub-communication device in a certain unit may be forcibly reset in order to turn off all the actuators or the like connected to that sub-communication device. In another unit, serial communication may be continued for anomaly processing. These necessitate independent parallel connection between the main communication device and the individual sub-communication devices. For example, in a laser beam printer, if paper jam occurs during the paper feeding operation, high-voltage output must be stopped instantaneously in order to protect a light-sensitive drum or the like. However, interruption of the paper feeding logic and restarting of the paper feed after jam has been removed may cause a jam again.

SUMMARY OF THE INVENTION

In view of the overcoming of the disadvantage of the conventional technique described in Item (1), an object of the present invention is to provide a unit control oriented communication device which is free from malfunctioning due to transmission of erroneous data caused by noises or disturbances.

Another object of the present invention is to provide a unit control oriented communication device which is capable of preventing collision of data which would occur in the bidirectional transfer of data, of eliminating erroneous transmission of data, and of high-speed transmission.

Another object of the present invention is to provide a unit control oriented communication device which is capable of overcoming problems, such as the erroneous transmission of data, caused by collision of light or disturbances, which would occur when data is transmitted in two directions during optical communication, and of preventing the generation of data from the disturbance data.

Another object of the present invention is to provide a unit control oriented communication device which is free from communication run-away caused by the generation of communication errors.

Another object of the present invention is to provide a unit control oriented communication device which is capable of recognizing existence and non-existence of units.

Another object of the present invention is to provide a unit control oriented communication device which is capable of discriminating a communication error and non-existence of the unit.

Another object of the present invention is to provide a unit control oriented communication device which can simply be adjusted or checked for assembly and which is hence effective.

Another object of the present invention is to provide a unit control oriented communication device which does not fail to enter the self-diagnosis mode due to a communication error which occurs accidently.

In order to achieve the aforementioned objects, the present invention provides a unit control oriented communication device which is for use in a system, including a group of a plurality of units each of which is the physical or functional unit of scattered output and input signals and a main control portion for controlling the group of units, for serially transmitting information between the main control portion and the group of units. The unit control oriented communication device comprises at least one error detection function selected from first, second and third detection functions. The first detection function includes a modulation/demodulation means for conducting modulation or demodulation on the basis of a predetermined rule, and a first error detection means for detecting an communication error in accordance with the predetermined rule. The second error detection function includes a transmit data creation/analysis means for creating serial data which is to be transmitted in a state in which it contains positive data and negative data of the same bit in one frame which is the unit of communication and for analyzing the serial data when it is received, and a second error detection means for detecting a communication error on the basis of the comparison between the positive and negative data. The third error detection function includes a space bit addition/separation means for creating the serial data which is to be transmitted in a state in which a predetermined space bit is added in the one frame and for separating the space bit when the serial data is received, and a third error detection means for detecting a communication error on the basis of the timing in which the space bit and effective bits appear.

The present invention further provides a unit control oriented communication device which comprises a first reception inhibit means for inhibiting data reception during data transmission, and a second reception inhibit means for inhibiting the starting of reception of another data in a predetermined period of time after receive data is received.

The present invention further provides a unit control oriented communication device which comprises a counting means for conducting counting when there is no reply to the transmitted data, and an error discrimination means for discriminating a communication error when the count of the counting means reaches a predetermined value.

The present invention further provides a unit control oriented communication device which comprises a number addition means for adding to the transmit/receive data a peculiar number which specifies the unit, and a discrimination means for discriminating a communication error and non-existence of the unit in accordance with the presence or absence of a reply from the individual communication device in the group of units which is based on the peculiar numbers.

The present invention further provides a unit control oriented communication device which comprises a first transmission inhibit means for inhibiting data transmission during data reception, and a second transmission inhibit means for inhibiting transmission of data when an error is detected in the receive data.

The present invention further provides a unit control oriented communication device which comprises a register means for registering peculiar numbers which specify switch over of the individual units in the unit group to the test mode, and a self-diagnosis means for attaining the test mode and conducting self-diagnosis in a case where the peculiar number in receive data is the peculiar number registered by the register means.

The present invention further provides a unit control oriented communication device which comprises a reply means for returning a reply only from the serial communication device in the unit which is registered by a peculiar number designated in received data, a peculiar number determination means for determining whether or not the peculiar number designated in the receive data is the register number of the main control portion, and a self-diagnosis means for suspending the serial communication and for attaining the test mode independently in a case where it is determined by the peculiar number determination means that the peculiar number in the received data is the register number of the main control portion.

In view of the overcoming of the disadvantage of the conventional technique described in Item (2), an object of the present invention is to provide a unit control oriented communication device which is capable of exchanging reliable data using a simplified circuit configuration for the control of the control subjects.

In order to achieve the above-described object, the present invention provides a unit control oriented communication device which comprises a microprocessor, a transmission means for transmitting transmit data to control subjects which are controlled by the microprocessor, and a transmission data register for storing the transmit data to be transferred from the microprocessor to the transmission means. The transmission means has a read request signal generation means for outputting a read request signal when the transmission means receives data from the transmission data register. The unit control oriented communication device further includes a read signal generation means for generating a read signal for the transmission data register from the read request signal and a signal dependent on the machine cycle of the microprocessor.

The reception means has a write request signal generation means for outputting a write request signal when the reception means writes the receive data in the reception data register. The unit control oriented communication device further comprises a write signal generation means for generating a write signal for the reception data register from the write request signal and a signal dependent on the machine cycle of the microprocessor.

In view of the overcoming of the disadvantage of the conventional technique described in Item (3), an object of the present invention is to provide a unit control oriented communication device which is capable of achieving a series connection in a physical fashion, and a parallel connection in an electrical fashion, between the master communication device and the slave communication devices.

In order to achieve the above-described object, the present invention provides a unit control oriented communication device designed for exchanging information within a system to achieve control of the operation of the system. The unit control oriented communication device includes a means for receiving a communication signal, and a means for transferring the received communication signal to another communication device, transfer of the received communication signal being possible even when the communication device is set to a reset state.

Other objects, features and advantages of the invention will be apparent from the following description taken in connection with the accompanying drawings.

BRIEF DESCRIPTION OF THE DRAWINGS

FIG. 2 shows modulating and demodulating circuits shown in FIG. 1 in detail;

FIG. 6 shows the comparison conditions of the comparison/selection circuit;

FIG. 12 shows frequency division control conducted when the communication means of FIG. 1 is used in a master device;

FIG. 14 shows a circuit for returning an error when reception error occurs;

FIGS. 16 and 17 shows examples of the circuit for detecting communication errors;

FIG. 22 is a circuit diagram of the vicinity of a transmission register 304 shown in FIG. 21;

FIG. 23 is a timing chart of the operation of outputting data to the transmission register 304;

FIG. 27 is a timing chart of the operation of reading out data from the reception register 321;

FIGS. 29 and 30 are timing charts of the operation in still another embodiment of the present invention;

FIG. 42 is a block diagram of a slave communication device of the embodiment;

DESCRIPTION OF THE PREFERRED EMBODIMENTS

An embodiment of the present invention will be described below with reference to the accompanying drawings.

SERIAL COMMUNICATION MEANS

Figure 1A:
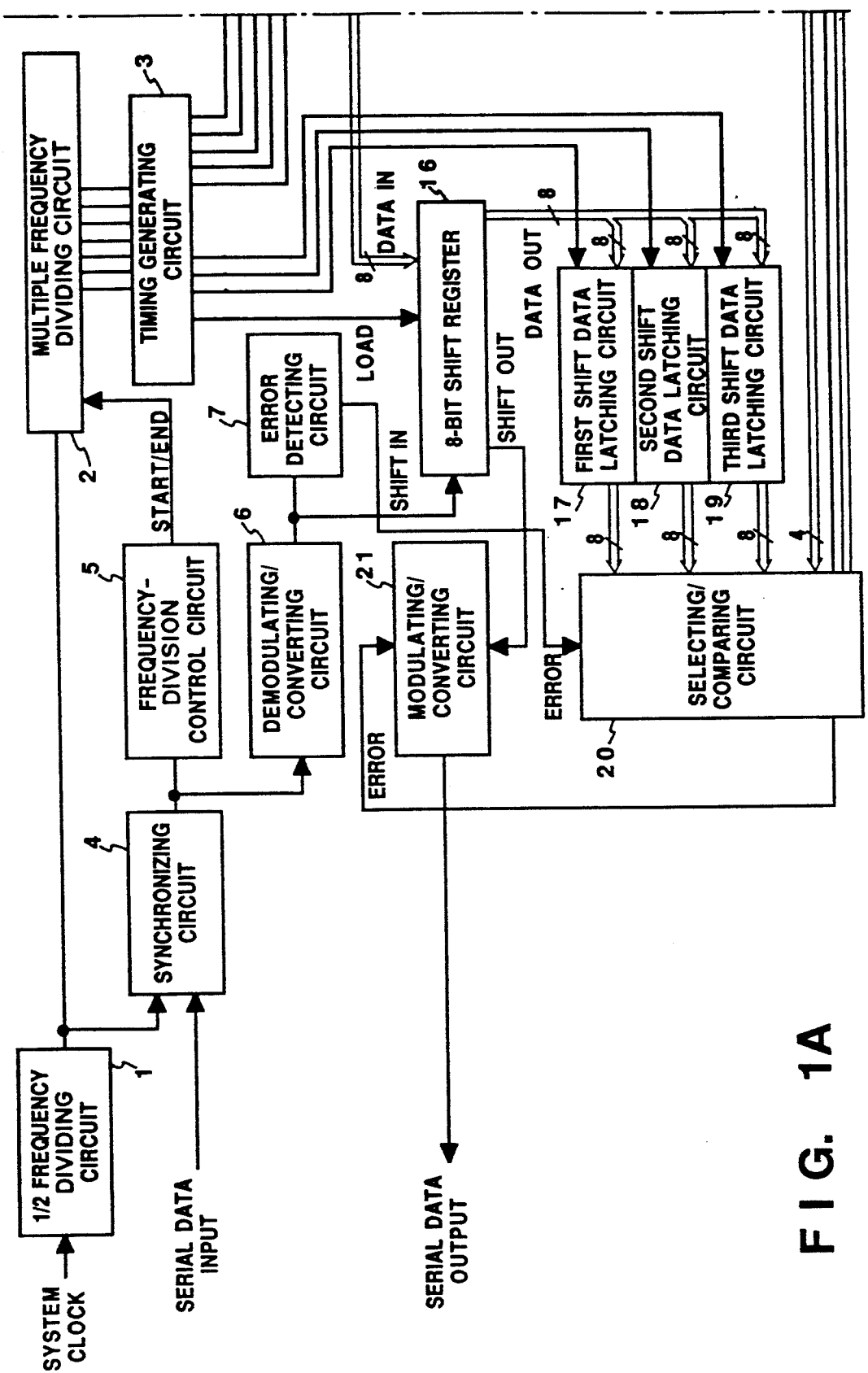
FIG. 1, comprised of FIGS. 1A and 1B, is a block diagram of a communication means for an embodiment of a unit control oriented communication device according to the present invention.
Figure 1B:
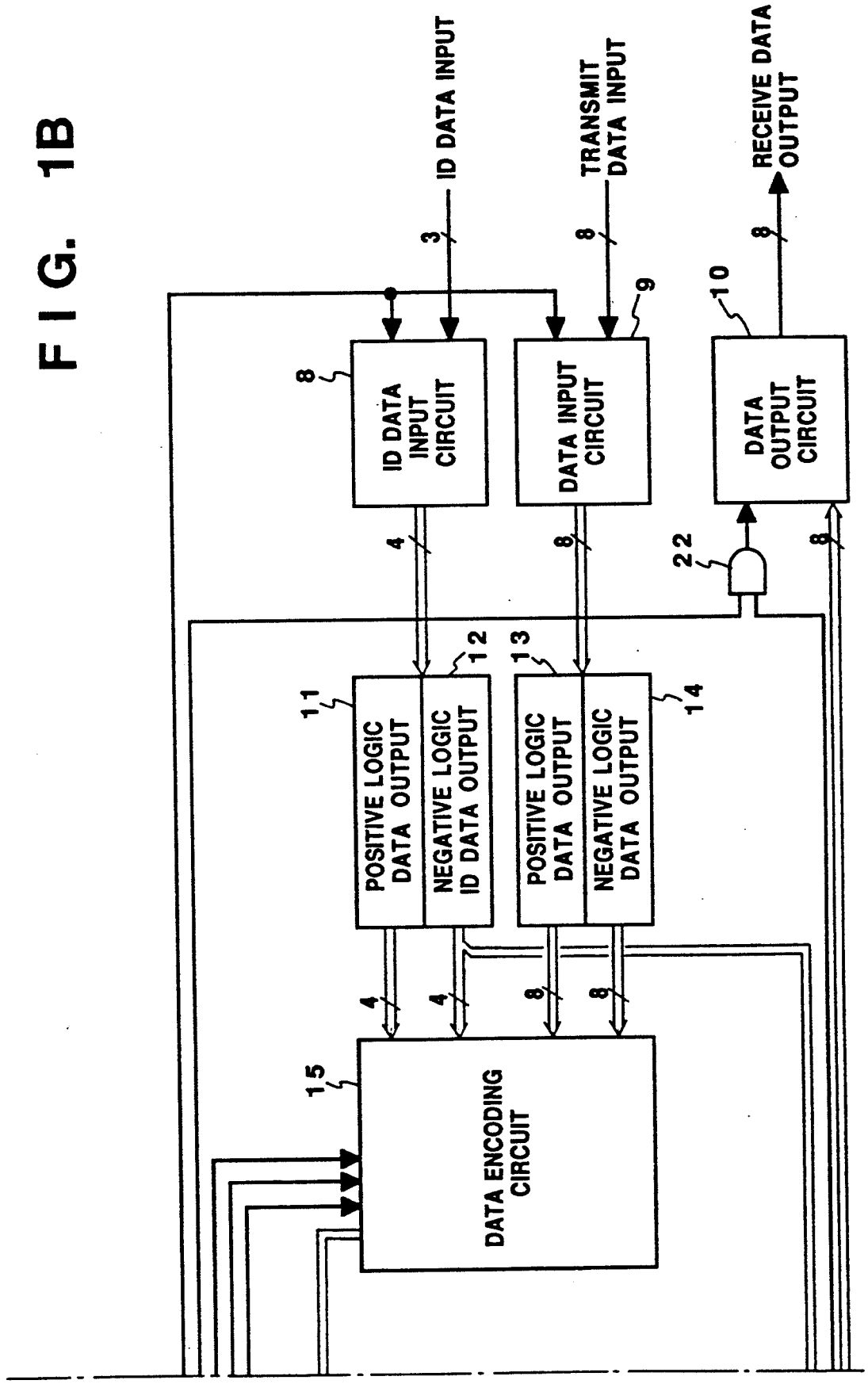

FIG. 1 is a block diagram of a serial communication means of this embodiment.

The serial communication means includes a ½ frequency dividing circuit 1 for decreasing a system driving clock by a factor of two, a multiple frequency dividing circuit 2, a timing generating circuit 3 for outputting a desired timing signal on the basis of a clock input from the multiple frequency dividing circuit 2, a synchronizing circuit 4 for synchronizing received serial data, a frequency-division control circuit 5 for reactivating the multiple frequency dividing circuit 2 in a timing obtained by the synchronizing circuit, a demodulating/converting circuit 6 for converting received modulated data into binary data, and an error detecting circuit 7 for detecting an error caused by conversion or noises during the demodulation of the decoding/converting circuit 6.

The serial communication means further includes an ID data input circuit 8 for inputting an ID number representing the attribute of the serial communication means, a data input circuit 9 for inputting transmit data of the serial communication means, a data output circuit 10 for outputting receive data of this serial communication means, a positive logic ID data output circuit 11 and a negative logic ID data output circuit 12 for separating the ID data obtained by the ID data input circuit 8 into positive logic data and negative logic data to obtain transmit data, a positive logic data output circuit 13 and a negative logic data output circuit 14 for separating the transmit data obtained by the data input circuit 9 into positive logic data and negative logic data to obtain transmit data, and a data encoder circuit 15 for creating binary data of the transmit data to be transmitted from this serial communication means and for outputting the same to an 8-bit shift register 16 in a transmission timing.

The serial communication means further includes the 8-bit shift register 16 for shift latching the binary data of the receive data which is obtained by the synchronizing circuit 4 and the decoding/converting circuit 6 and for shift outputting the transmit data output from the data encoding circuit 15, shift data latch circuits 17, 18 and 19 for latching the binary data shift input by the 8-bit shift register 16 in a timing generated by the timing generating circuit 3, three shift data latching circuits being provided in this embodiment for conducting latching on one frame three times, and a comparing/selecting circuit 20 for comparing data latched by the shift data latching circuits 17, 18 and 19 under a predetermined condition and for selecting necessary data to determine the truth or falsity of receive data.

A modulating/converting circuit 21 modulates the binary transmit data output from the 8 bit shift register 16 under a predetermined condition, i.e., for conducting an operation reverse to that of the demodulating/converting circuit 6, to obtain serial transmit data. An AND gate 22 controls a latch signal for inputting data in the data output circuit 10 on the basis of the result of the comparison made by the comparing/selecting circuit 20.

To simplify the description, the circuit configuration of this embodiment is in 8-bit unit. However, it may be in 16- or 32-bit unit.

The operation of the serial communication means shown in FIG. 1 will be described below. A system clock of this system enters the ½ frequency dividing circuit 1 which arranges the clock such that it has 50% duty factor. The output clock is used as the operation clock for the synchronizing circuit 4 and that of the frequency-division control circuit 5. The output clock is also input to the multiple frequency dividing circuit 2 which outputs the clocks obtained by division of "$2^{11}$" to the timing generating circuit 3 and thereby make it generate a desired timing which will be described later. The internal configuration of the circuits 1, 2, 3, 4 and 5 is a known one, and a detailed description thereof is therefore omitted. Therefore, the configuration thereof is not limited to the above-described one but various modifications are possible if they attain the objectives described in this specification.

Input/output of data into and from this serial communication means will be described below. In FIG. 1, the serial data input input to the synchronizing circuit 4 is the receive data input. This receive data is output from the data output circuit 10 as the receive data output. The ID data input and the transmit data input, which are input to the input circuits 8 and 9, are output from the modulating/converting circuit 21 as the serial data output. The ID data input is used to determine the truth of the receive data input, and the details thereof will be described later.

FIG. 2 shows the modulating and demodulating circuits shown in FIG. 1 in detail.

First, the operation of the modulating/converting circuit 21 will be described. In FIG. 2, data ⓙ output from a shift out terminal of the 8-bit shift register 1 is input to an EXOR 212 in the modulating/converting circuit 21. A clock $\phi_{32}$ obtained by decreasing the output of the ½ frequency dividing circuit 1 by a factor of 32 by means of the multiple frequency dividing circuit 2 is inverted by an inverting gate 211 to adjust the phase thereof, and the inverted signal ⓖ is input to the other input of the EXOR circuit 212 in the modulating/converting circuit 21. The EXOR circuit 212 outputs a serial data signal ⓚ to be transmitted. The modulation attained in the above-described circuit will be described in detail.

The shift out data ⓙ is sequentially output by the clock of $\phi_{32}$. EXOR operation is conducted on the shift out data ⓙ and the inverted signal of the clock $\phi_{32}$. That is, if "1" is shifted out, "10" is output from the EXOR circuit 212. Also, if "0" is shifted out, "01" is output from the EXOR circuit 212. Thus, if the transmit data is "1011000100 . . . ", "10 01 10 10 01 01 01 10 01 01 . . . " is output from the modulating/converting circuit 21 under the conditions of this modulation method. Hence, this transmit data will be demodulated at the reception side by inverting this transmit data and then by latching data alternately starting from the second one (by latching odd numbers). The same demodulation results can be obtained by latching the data alternately starting from the first one (by latching even numbers) and then conducting demodulation. Concrete modulation/demodulation method is not limited to the aforementioned ones.

The transmission serial data signal (k) output from the EXOR circuit 212 is serially output as the transmit data through an AND gate 213. At that time, output or non-output of the transmit data is controlled by signals (m) and (l). The signal (l) assumes the "low" level when an error is detected from the result of the comparison made by the comparing/selecting circuit 20 and from the result of the error detecting circuit 7, and thereby interrupts output of the transmit data (details being described later). The signal (m) is at the logical "high" level only during the shift out of the 8-bit shift register 16 which is controlled by the timing generating circuit 3, and thereby allows for the output of the transmit data.

Figure 3A:
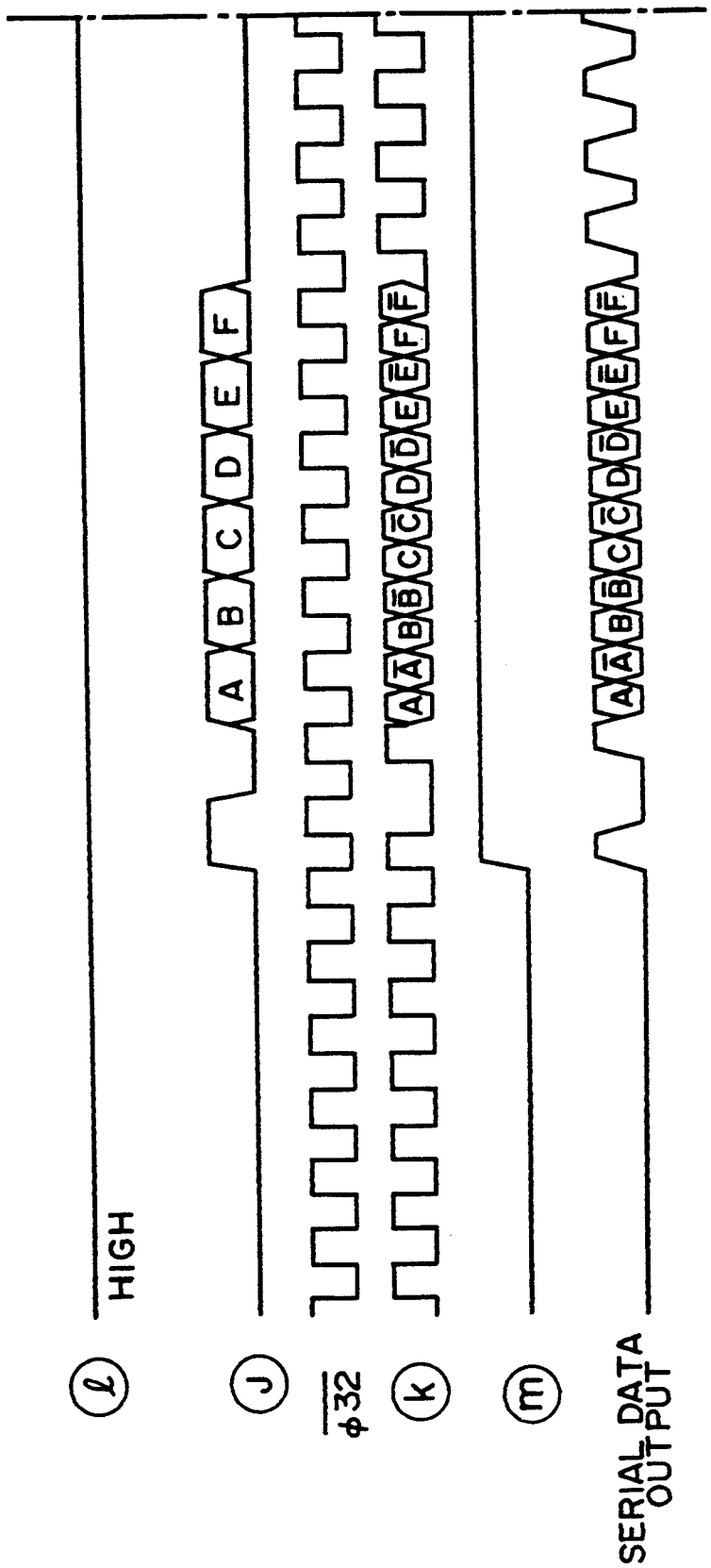
FIGS. 3, comprised of FIGS. 3A and 3B, and 4, comprised of FIGS. 4A and 4B, are timing charts of the circuit shown in FIG. 2.
Figure 3B:
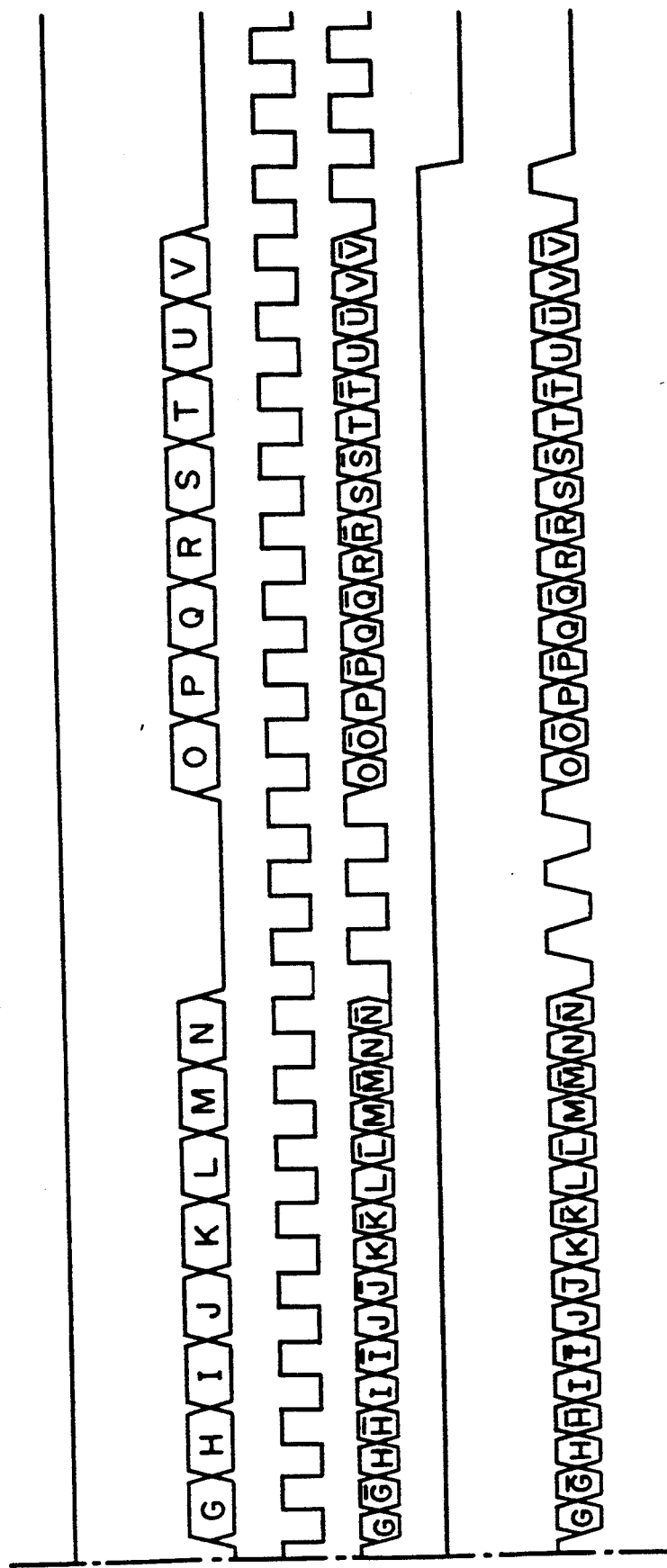

FIG. 3 is the timing chart of this modulation operation. In FIG. 3, the signal (l) is in a state in which no error is occurring. The states of the serial data output, (l), (j), /$\phi_{32}$, (k) and (m) located at the respective points indicated in FIG. 2 are shown in FIG. 3 as the functions along the time dimension (hereinafter /X represents inverted X).

The operation of the demodulating/converting circuit 6 and that of the modulation error detecting circuit 7 will be described below.

In FIG. 2, the receive data is first input to the synchronizing circuit 4. The synchronized receive data (a) is input to a D flip-flop 61 (hereinafter a flip-flop being referred to as a F/F). The multiple frequency dividing circuit 2 is reset and initialized by the frequency-division control circuit 5 synchronized by the synchronizing circuit 4 and thereby starts counting. The D·F/F 61 is triggered by a clock $\phi_{16}$ obtained by the multiple frequency demodulating circuit 2. Output (e) of the D·F/F 61 is input to both an EXOR circuit 72 and a D·F/F 71. The D·F/F 71 is triggered by the same clock as the D·F/F 61. Output (f) of the D·F/F 61 is input to the other input of the EXOR circuit 72. A signal (b) from the timing circuit 3 is input to the set terminal of the D·F/F 61 and to the reset terminal of the D·F/F 71. The EXOR circuit 72 compares the outputs of the D·F/Fs 61 and 71, and the results of the comparison is input to a JK·F/F 73. The JK·F/F 73 is triggered by a clock $\phi_{32}$ obtained by the multiple frequency dividing circuit 2, detects an error from the results of the demodulation, and outputs an error signal (h). That is, the EXOR circuit 72 checks whether or not each data bit is a combination of "0" and "1", that is, in the example of the modulating circuit, the EXOR circuit 72 checks whether or not 1 and 0 are respectively represented by "10" and "01". If the answer is negative, the JK·F/F 73 is set to raise the error signal (h).

An inverted output (i) of the D·F/F 61 is input to the shift in terminal of the 8-bit shift register 16. Since the shift clock of the 8-bit shift register 16 is the clock $\phi_{32}$ obtained by the multiple frequency dividing circuit 2, the inverted output of the D·F/F 61 is latch shifted alternately.

Figure 4A:
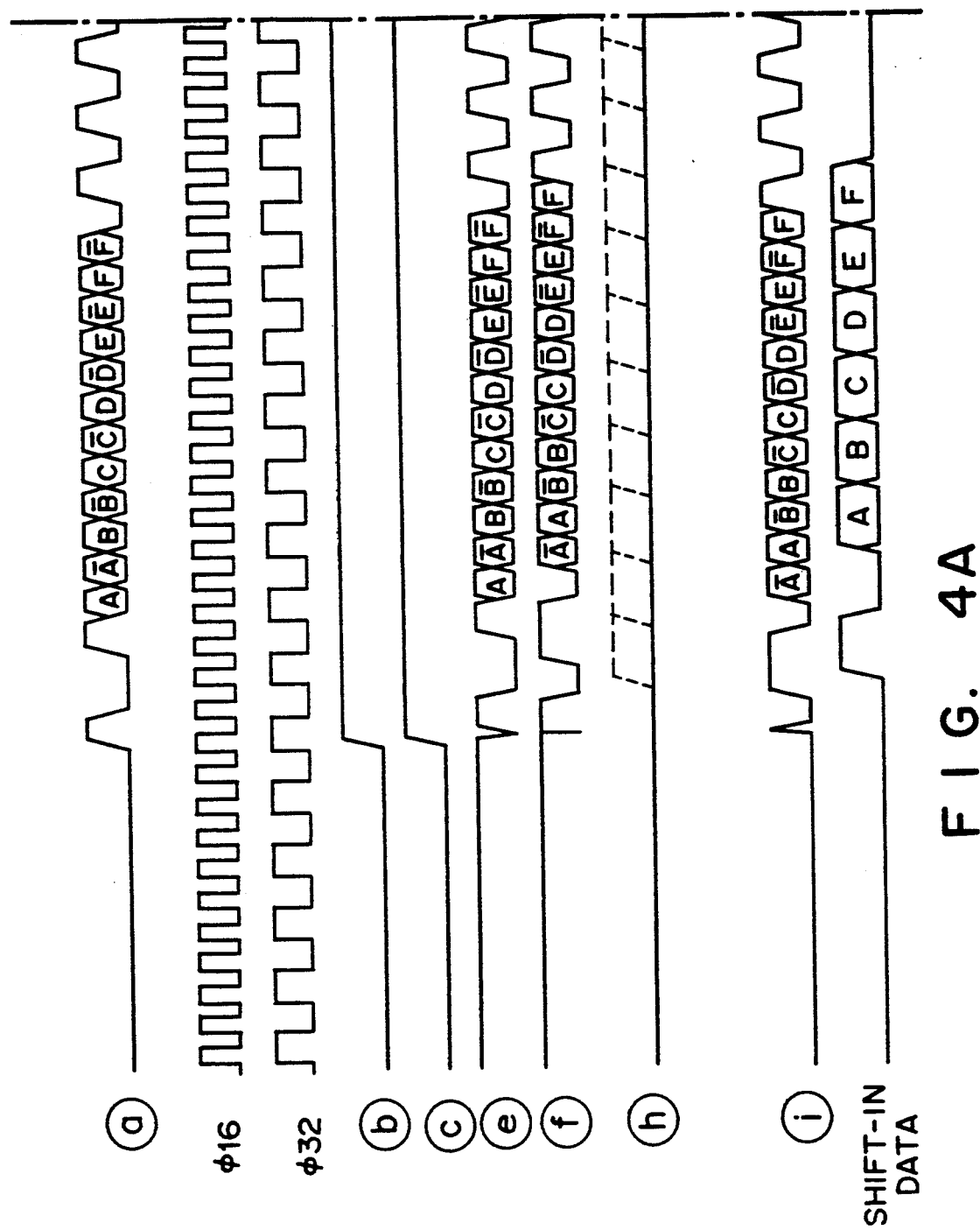
Figure 4B:
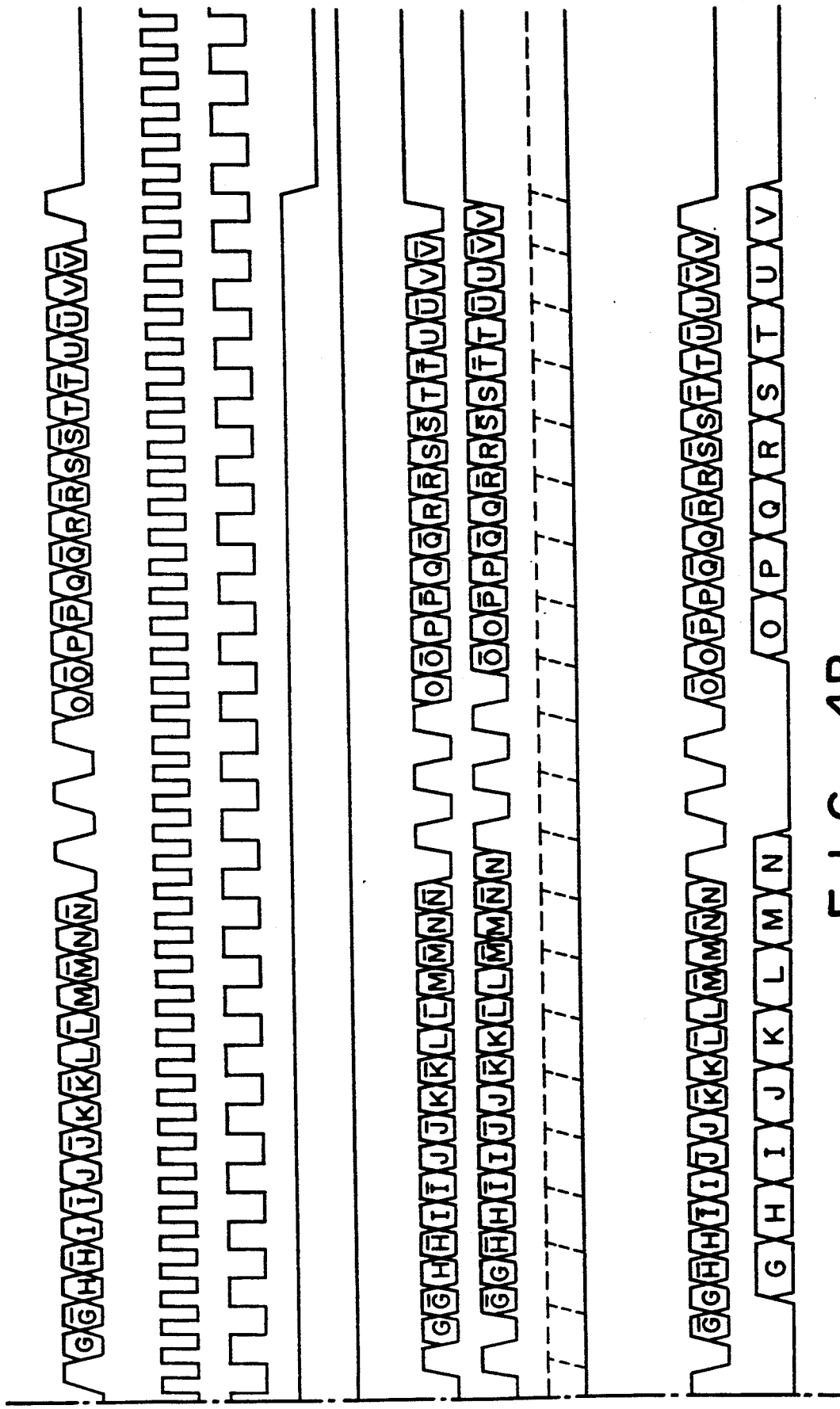
Figure 5A:
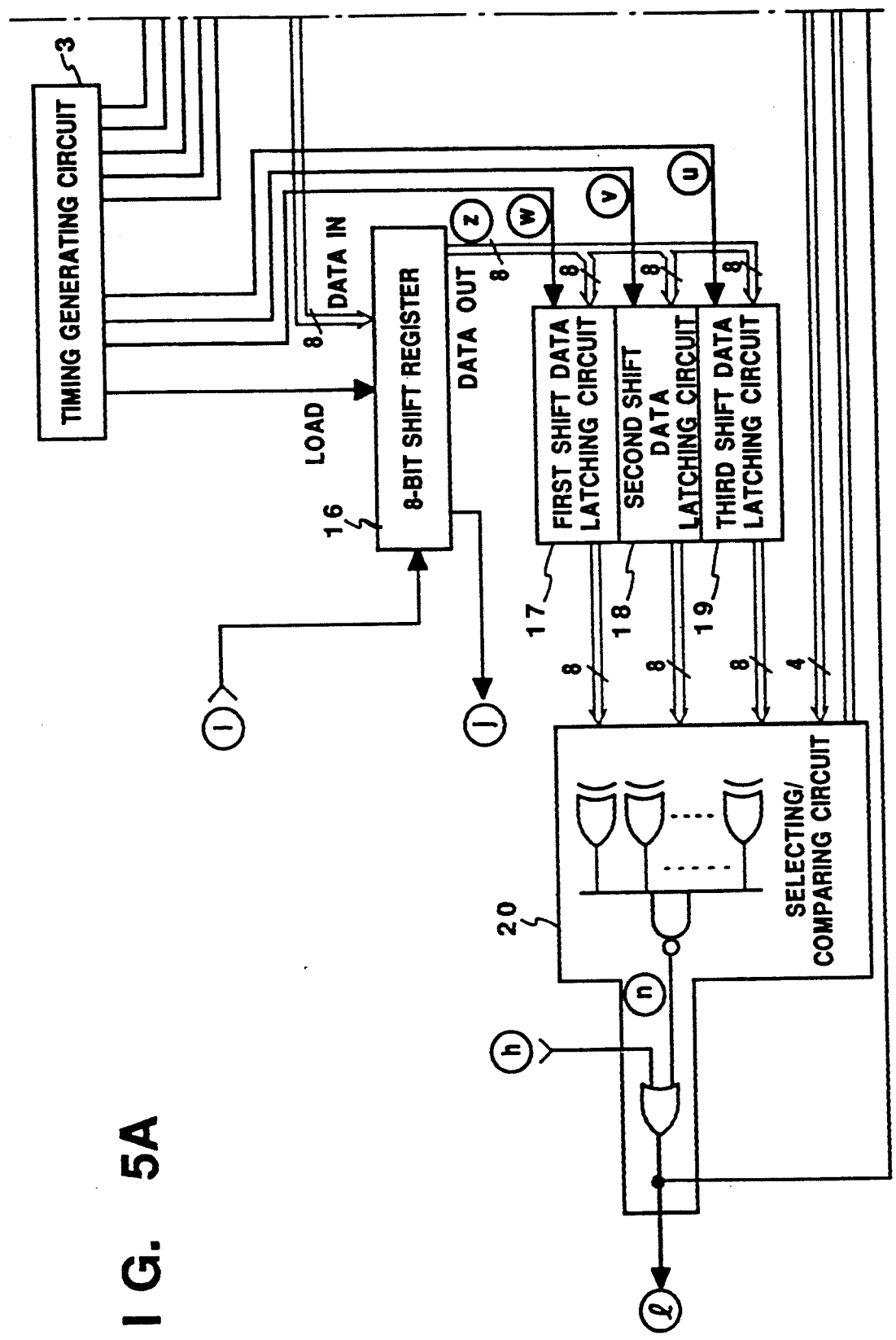
FIG. 5, comprised of FIGS. 5A and 5B, shows a comparison/selection circuit of FIG. 1 in detail.

FIG. 4 is a timing chart of the above-described operation. FIG. 4 shows the states of (a), $\phi_{32}$, $\phi_{16}$, (b), (c), (e), (f), (h) and (i) which are located at the respective points shown in FIG. 2.

The digital modulation/demodulation means for modulating the output data of the serial communication under a predetermined condition to obtain an output signal and for demodulating the input signal under a predetermined condition to obtain an input data, as well as an error detection means for detecting an error in accordance with modulation/demodulation regulations when the input signal is demodulated by the digital modulation/demodulation means, have been described.

Next, parallel data of the 8-bit shift register 16 shown in FIG. 2 and the signal (l) will be described in detail with reference to FIGS. 5 to 8.

When demodulated data (z) is present in 8 bits as a consequence of the shifting of the receive data (i), the 8-bit data is input in a first shift data latch circuit 17 by means of a latch pulse (w) from the timing generating circuit 3. Thereafter, when another 8 bits of the demodulated data (z) are present after the 4 bits have been passed by, the 8-bit data is input to a second shift data latch circuit 18 by means of a latch pulse (v) from the timing generating circuit 3. Finally, when another 8 bits of the demodulated data (z) are present after the 3 bits have been passed by, the 8-bit data is input to a third shift data latch circuit 19 by means of a latch pulse (u) from the timing generating circuit 3. In other words, in this embodiment, space bits, i.e., dummy bits, are inserted in one frame, so that the bits in a predetermined duration can be made effective on the time-series basis. It is to be noted that even the space bits are serially communicated in a modulated state.

Figure 7A:
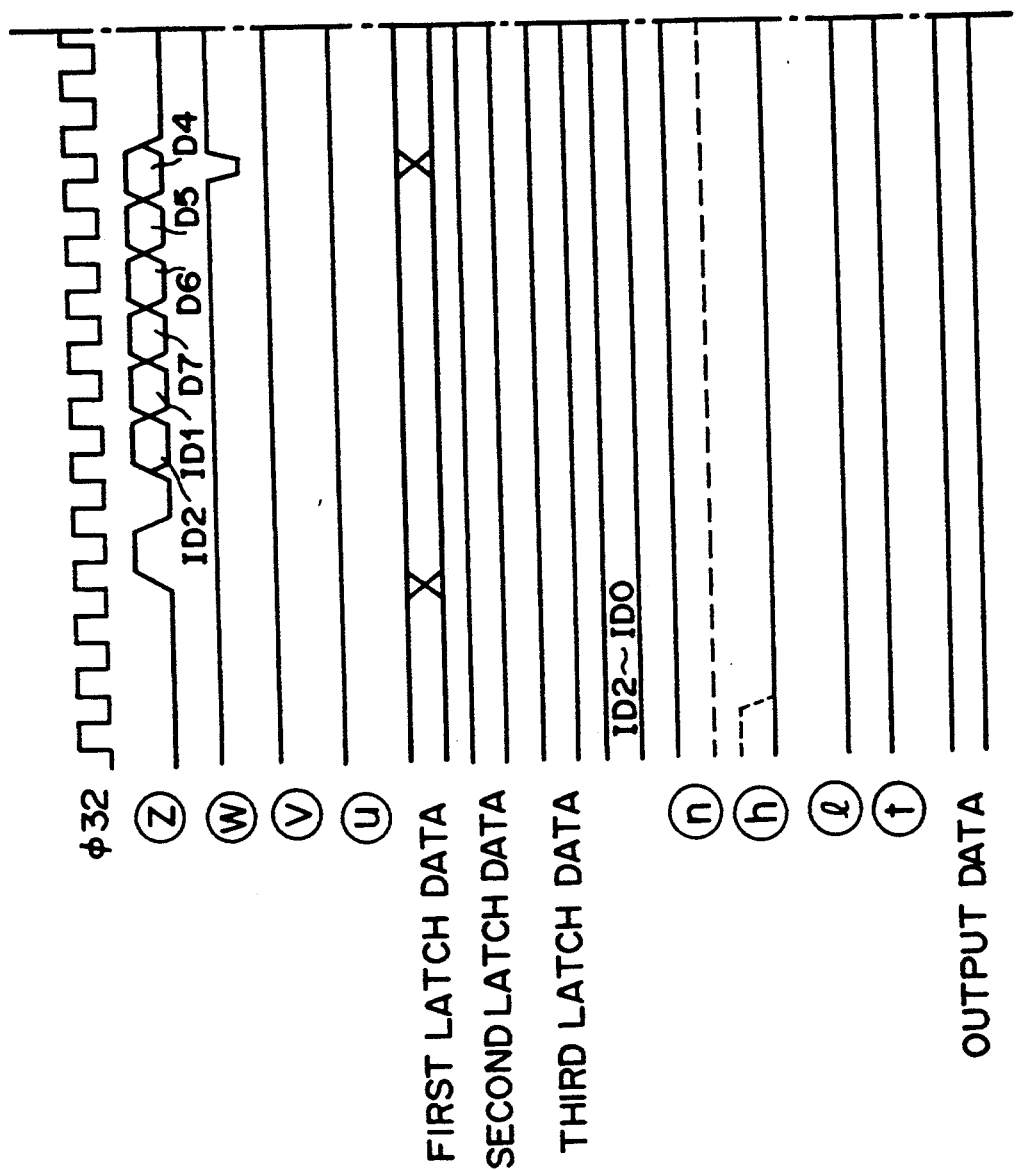
FIGS. 7, comprised of FIGS. 7A and 7B, and 8, comprised of FIGS 8A and 8B, are timing charts of the circuit shown in FIG. 5.
Figure 7B:
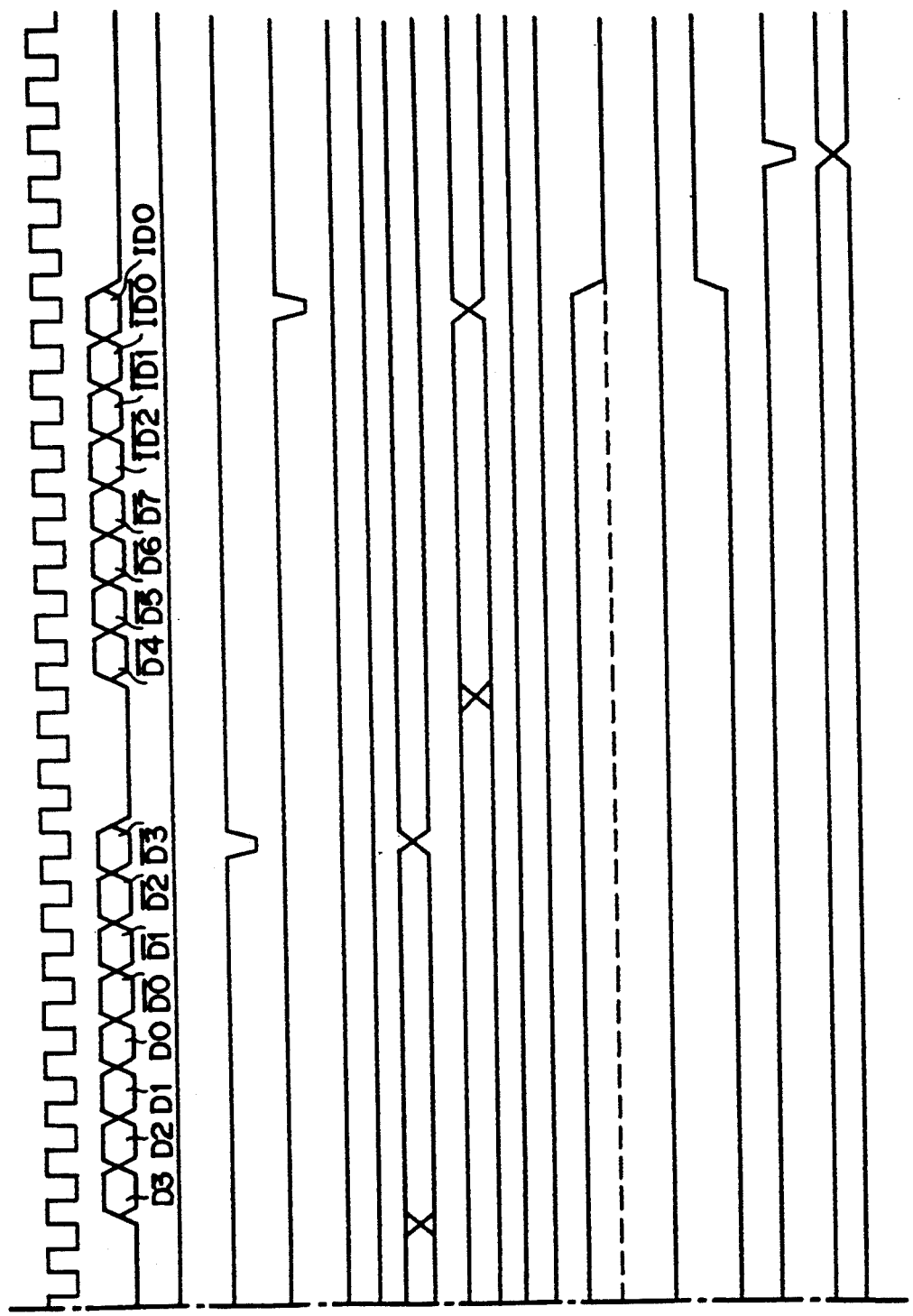

The data respectively latched in the shift data latch circuits 17, 18 and 19 are input to the comparing circuit 20 for comparison which is made under a predetermined condition. In this embodiment, comparison is made under the following conditions: the demodulated data (z) is input in the order of "1, 0, ID2, ID1, D7, D6, D5, D4, X, X, X, X, D3, D2, D1, D0, /D0, /D1, /D2, /D3, X, X, X, /D4, /D5, /D6, /D7, /ID2, /ID1, /ID0, ID0, X", as shown in FIG. 7 (Dn represents data, and /Dn represents inverted data. X represents space bit and is practically "0"). Hence, comparison is made under the predetermined condition shown in FIG. 6.

After comparison, the individual outputs of the EXOR circuits are put together by an NAND gate 201 which outputs an output (n). This data comparison signal (n), together with a demodulation error signal (h), is input to an NOR gate 202 designed to output a signal (l). That is, the data comparison signal (n) assumes a high level if comparison error exists even in a single bit, and thereby lowers the signal (l) regardless of the state of the error signal (h) obtained by the checking conducted during demodulation. As a result, the output of the AND gate 213 is interrupted, and no transmit data is output.

FIG. 7 is a timing chart for the shift data latch circuit and the comparison/selection circuit. The timing chart shown in FIG. 7 is that for the reception of normal data. The signal (n) falls after completion of reception of the demodulated data (z). At that time, since the error signal (h) is also at the logical low level because of no error, the signal (l) rises and thus permits output of the AND gate 213. This enables output of the transmit data. At the same time, the signal (l) also opens the AND gate 22. Consequently, a latch pulse (t) from the timing generating circuit 3 is loaded in the data output circuit 10, and the output data is thereby output. In FIG. 7, (w), (v), and (u) respectively represent the latch pulses from the timing generating circuit 3 for giving load pulses the shift data latch circuits 17, 18 and 19. As these latch pulses are given to the shift data latch circuits, the first, second and third latch data are latched for generation of the comparison result signal (n) shown in FIG. 6. The receive data is thus taken in the communication means.

Figure 8A:
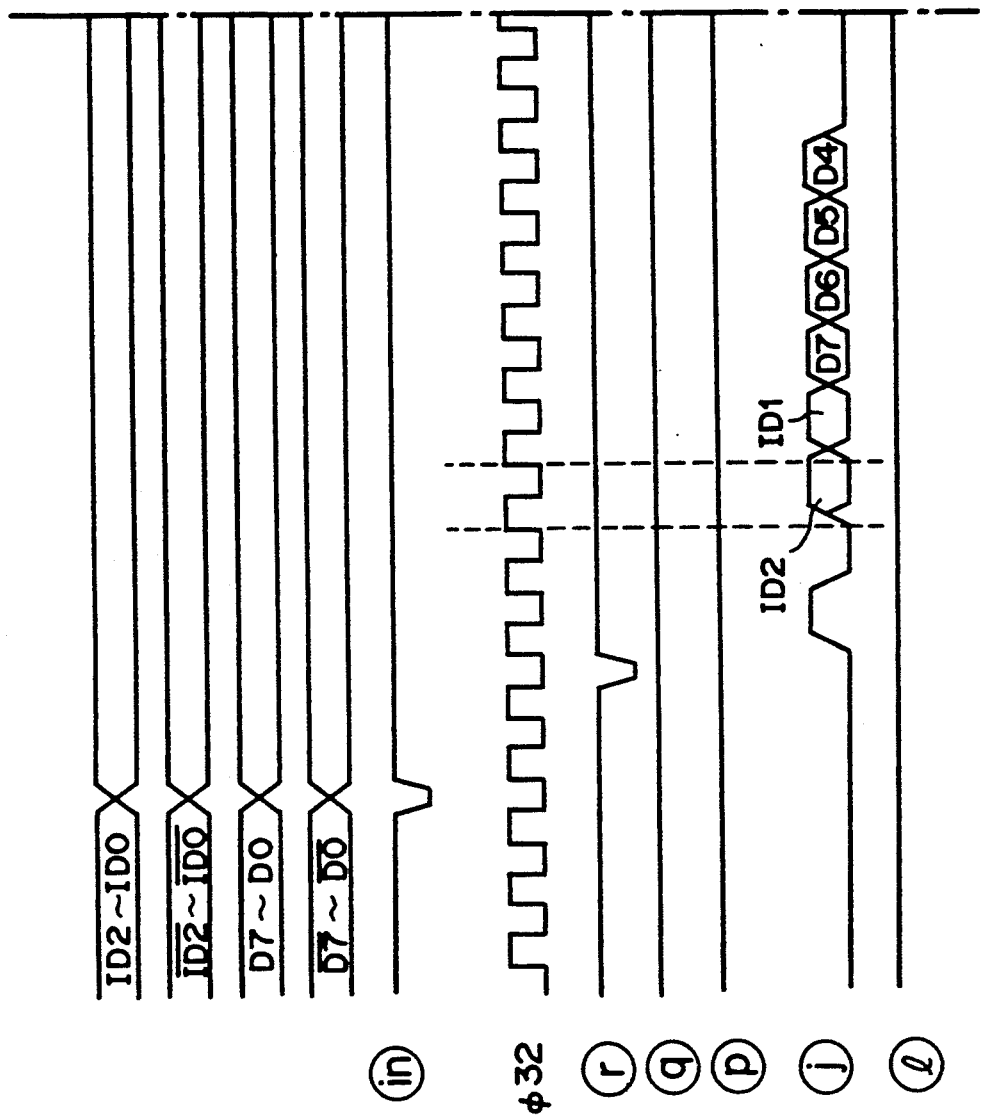
Figure 8B:
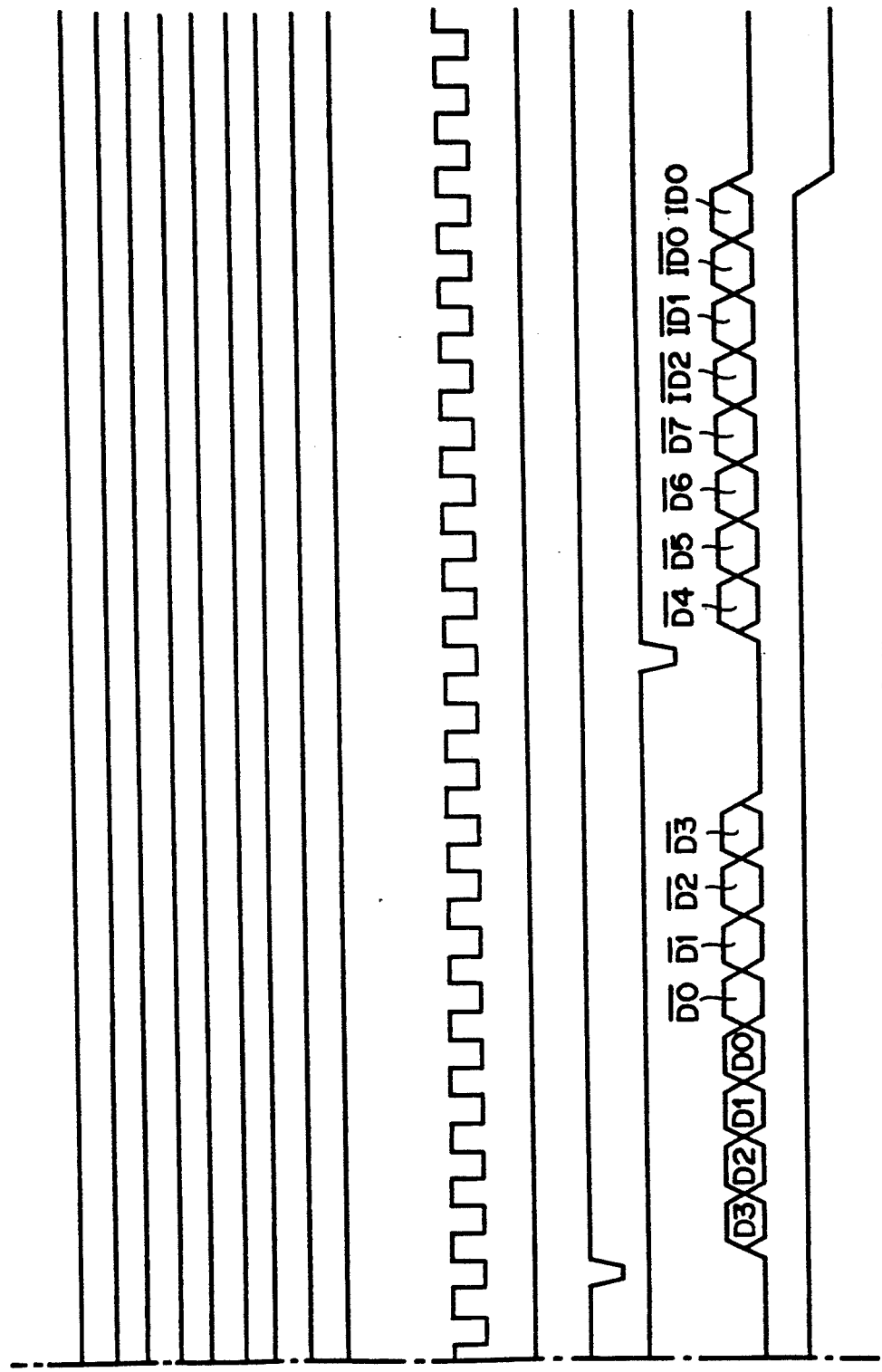

The timing in which transmit data is output from the communication means for transmission will be described with reference to FIG. 8. In FIG. 8, no specification is given to the content of the transmit data. At a given timing, such as when reception is started, a latch pulse is output from the timing generating circuit 3 to the respective data input circuits 8 and 9 to latch data. ID data and data in the transmit data are respectively separated into positive and negative data by the data outputs 11 to 14 (which are respectively indicated by ID 2 to ID0, /ID2 to /ID0, D7 to D0, and /D7 to /D0 in FIG. 8). Thereafter, select pulses (p), (q) and (r) are output from the timing generating circuit 3 to the data encoder circuit 15 in respective timings to prepare the data to be output to the 8-bit shift register 16. Although a shift data loading signal for loading the data in the 8-bit shift register 16 is not shown, ORs of the select pulses (p), (q) and (r) are output from the timing generating circuit 3, and 8-bit shift is conducted three times in total to generate a shift out signal (j) to be output to the EXOR circuit 212 shown in FIG. 2. The transmission permitting signal (l) remains high until the shift out signal (j) has been output, as shown in FIG. 8 when the reception error signal (j) and the data comparison error signal (n) have no errors. Conversely, when the signals (l) and (n) are at the low level, no transmit data is output from the AND gate 213 even when the shift out signal (j) is output.

How one frame data is processed in the serial communication has been described, that is, the comparison means for comparing the positive and negative data in the one frame of the receive data, the timing means for inserting space bits in one frame and thereby timing the effective bits, the means for affixing the positive and negative data to the transmit data, for inserting the space bits and for forming transmit data, and the data error detection means for detecting errors of the comparison means and of the timing means have been described. The circuits described in connection with the structure for processing one frame data in the serial communication are preferred examples of the same and various changes may be made so long as the objects thereof have been attained.

OTHER EXAMPLES OF SERIAL COMMUNICATION MEANS

In the above-described example, serial data for transmission and reception is 32-bit data. However, there is no limitation to the number of bits. Furthermore, separation of one frame communication data into positive and negative data is not necessary for all the effective bits. Furthermore, the provision of space bits may be eliminated. Alternatively, at least one space bit may be provided. It is therefore possible to make the number of bits of the serial data for transmission and reception, for example, 16 bits by using only positive ID data, one start bit, no end bit, eight positive data bits and four negative data bits. In this embodiment, 32-bit serial data is used for transmission and reception in order to reduce the probability of erroneous transmission of data in the serial communication. To further improve reliability, for example, 40-bit, 56-bit or 64-bit data may be used.

Figure 9A:
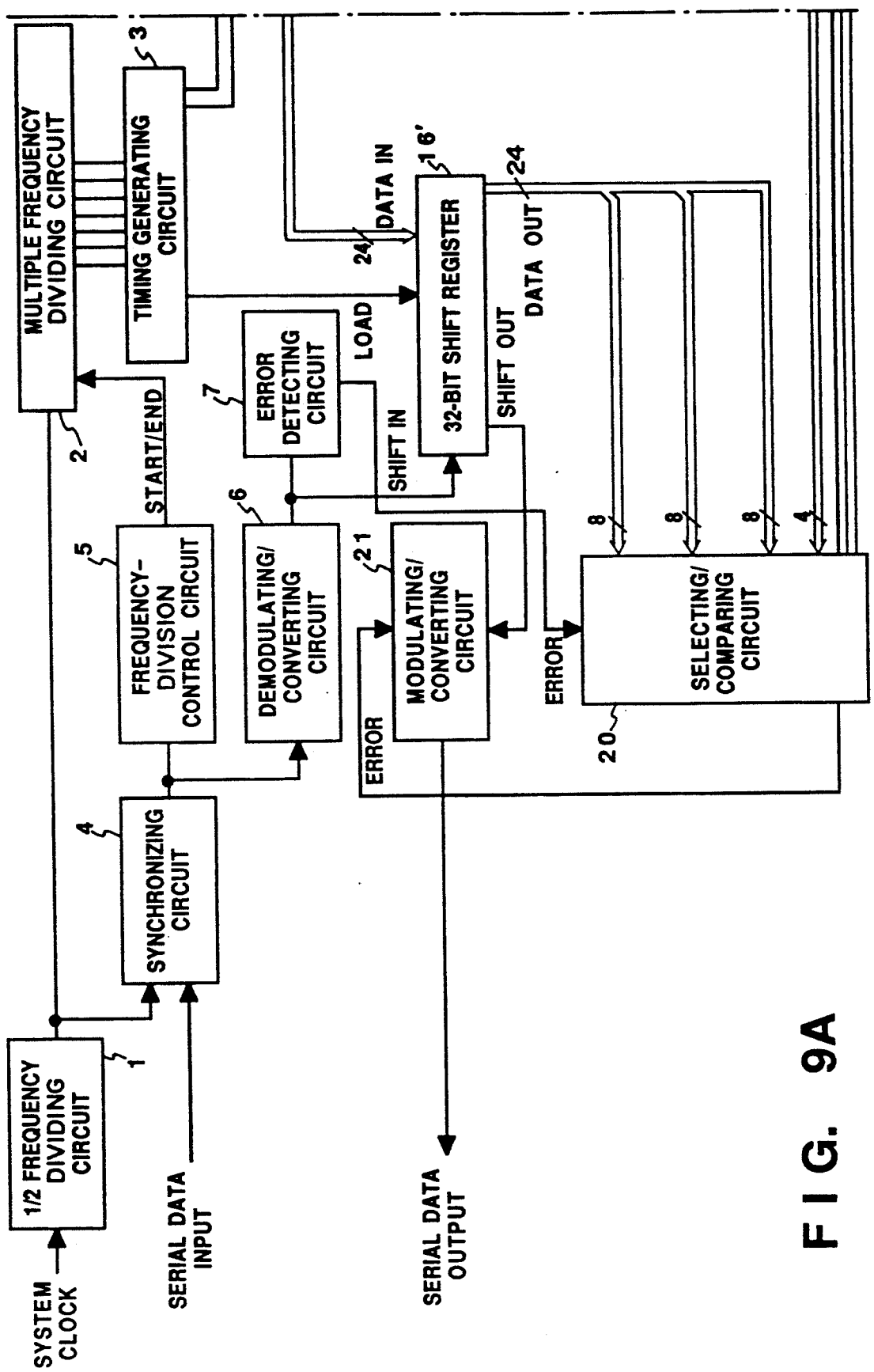
FIGS. 9, comprised of FIGS. 9A and 9B, and 10, comprised of FIGS. 10A and 10B, show modifications of the embodiment shown in FIG. 1.
Figure 9B:
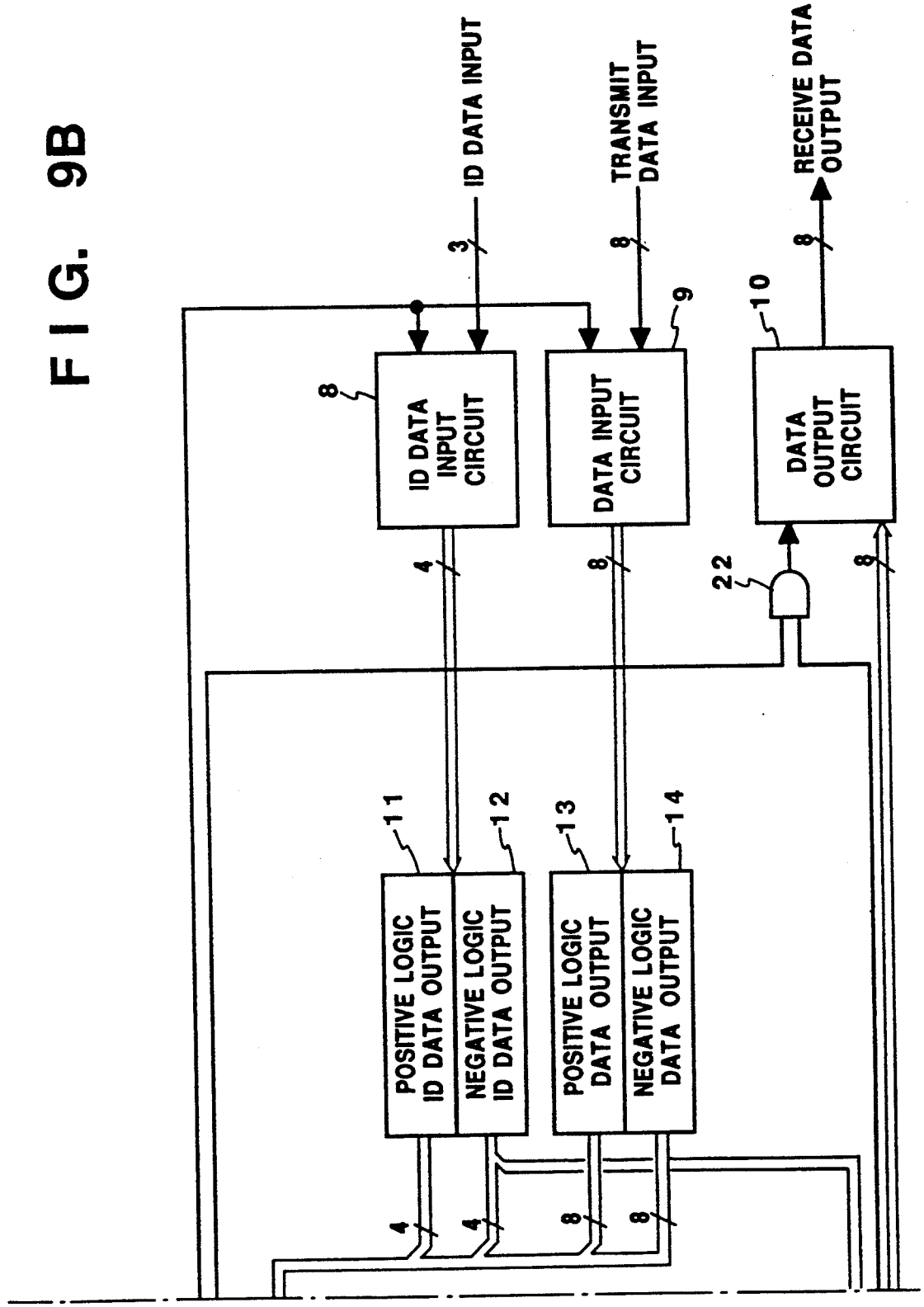

Furthermore, the aforementioned example employs the 8-bit shift register 16. However, the number of bits of the data processed in the shift register may be the same as the number of bits of the serial data for transmission and reception (the number of bits in one frame), i.e., the shift register may be structured as a 32-bit shift register. FIG. 9 shows the configuration of such a 32-bit shift register.

In FIG. 9, the same reference numerals are used to denote components which are the same as those shown in FIG. 1. A reference numeral 16' denotes a 32-bit shift register. The data encoder circuit 15 and the shift data latch circuits 17, 18 and 19 are eliminated because of the use of the 32-bit shift register 16'. The operation of the 32-bit shift register differs from that of the 8-bit shift register in that the data (i) is shifted in and loaded in the comparison/selection circuit 20 in the unit of 32 bits and in that all bits of the transmit data are directly loaded into the shift register from the data outputs 11 to 14.

The aforementioned embodiment is a receiver of the serial communication, that is, a serial communication means which acts as a slave. However, it may also be used as a serial communication means which acts as a master by reversing the order in which the timing generating circuit 3 outputs a group of timing pulses for reception and a group of timing pulses for transmission, that is, by constructing the timing generating circuit 3 such that it outputs a group of timing pulses for transmission first to carry out transmission operation and then outputs a group of timing pulses for reception to carry out reception operation. Hence, the operation of the transmitter of the serial communication, that is, the operation of the serial communication means which acts as a master, can be the same as that of the means shown in FIG. 1. As a result, in the so-called serial communications between the master and slave, the timing in which the transmit data is transmitted and that in which the receive data is received in the master differ from those in the slave, and collision of the transmit and receive signals is thereby eliminated in the serial communication. That is, there is no limitation to the number of lines in both full duplex system and half duplex system.

Furthermore, in the serial communication conducted between one master and N slaves, the serial communication data is combined with the ID data to make it readily identified. Therefore, the serial communication conducted using the serial communication means according to the present invention is not necessarily the serial communication made between one master and one slave. Furthermore, since the timing in which the serial signal is transmitted and the timing in which the serial signal is received differ, in the light signal transmission terminal composed of a light-emitting element and a light-receiving element, when the light signal emitted from the light-emitting element during transmission is received by the light-receiving element as a light signal sent from another optical communication terminal, erroneous operation does not occur.

Figure 10B:
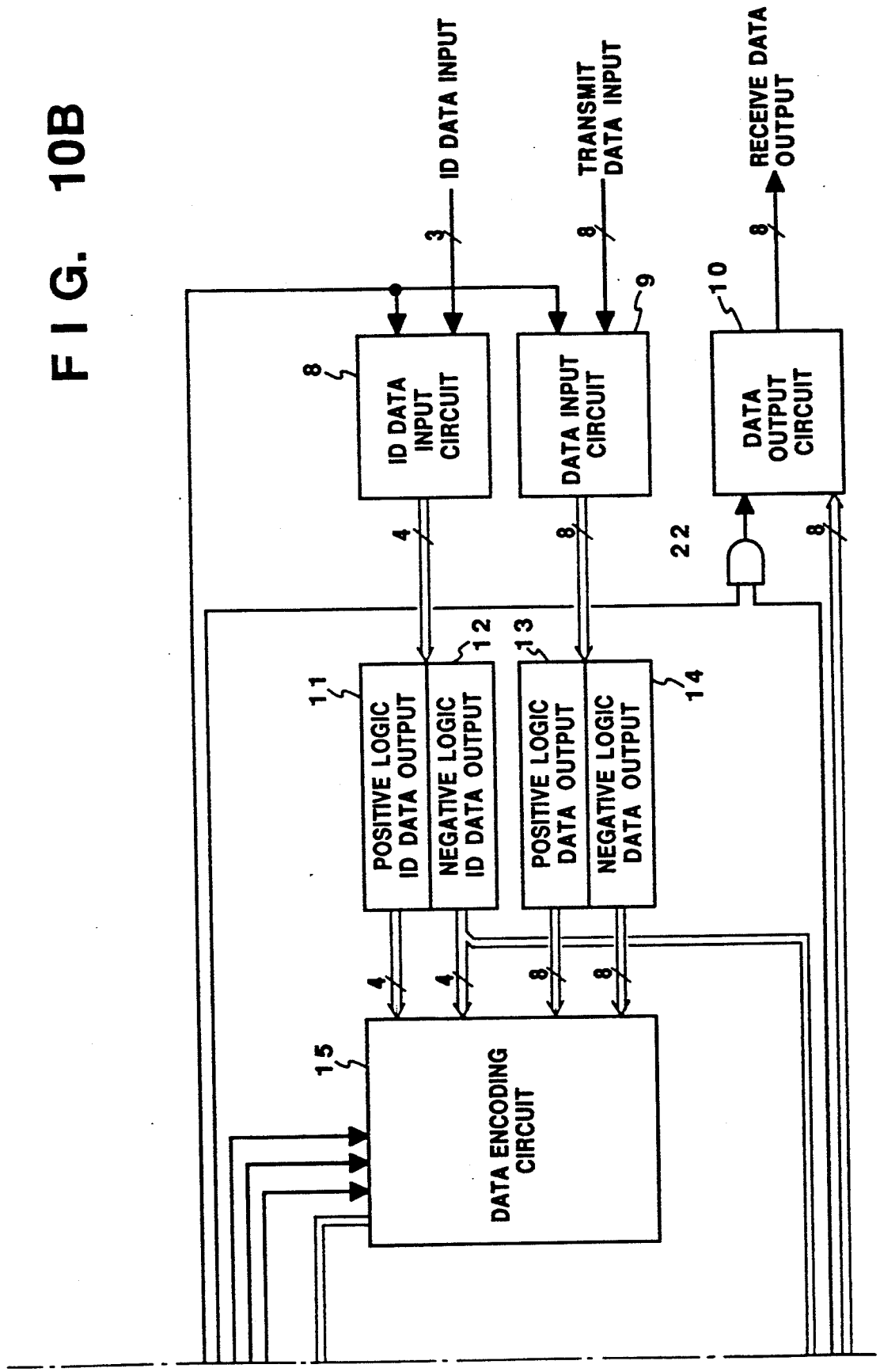

Furthermore, in the embodiment shown in FIG. 1, the receive signal received from the serial data input is accepted by the synchronizing circuit 4 and reception operation is thereby started immediately after reception. Generation of malfunction can be further reduced by providing an AND gate 23, as shown in FIG. 10, and by closing the AND gate 23 by a signal from the timing generating circuit during the transmission of transmit data each time reception is made (although serial transmission does not occur when a communication error, such as modulation error of the receive data or comparison error of the receive data, occurs, reception of the receive data is inhibited during the transmission time) to inhibit reception during the transmission.

As will be understood from the foregoing description, the present invention is characterized by the following.

(1) The output data for the serial communication is modulated under a predetermined condition, and the modulated signal is output as an output signal, and in that the input signal is demodulated under a predetermined condition to obtain an input data.

(2) Modulation or noise error signal is detected during the demodulation of the input signal.

(3) A comparison is made between the positive and negative data of the same data in one frame.

(4) Space bits are inserted in one frame data for timing the effective bits.

(5) Error detection is executed by the comparison and the synchronization.

Provision of the above checking functions enable prevention of erroneous transmission of serial data, such as noise generated in the serial communication means, and prevention of malfunctions of the system.

Furthermore, in a case where the information transmission means of the serial communication is an optical radio transmission means (space transmission such as a remote controller), erroneous transmission of the serial data, such as disturbance generated in the system, and malfunction of the system can be prevented.

APPLICATION EXAMPLES OF SERIAL COMMUNICATION MEANS

Figure 11:
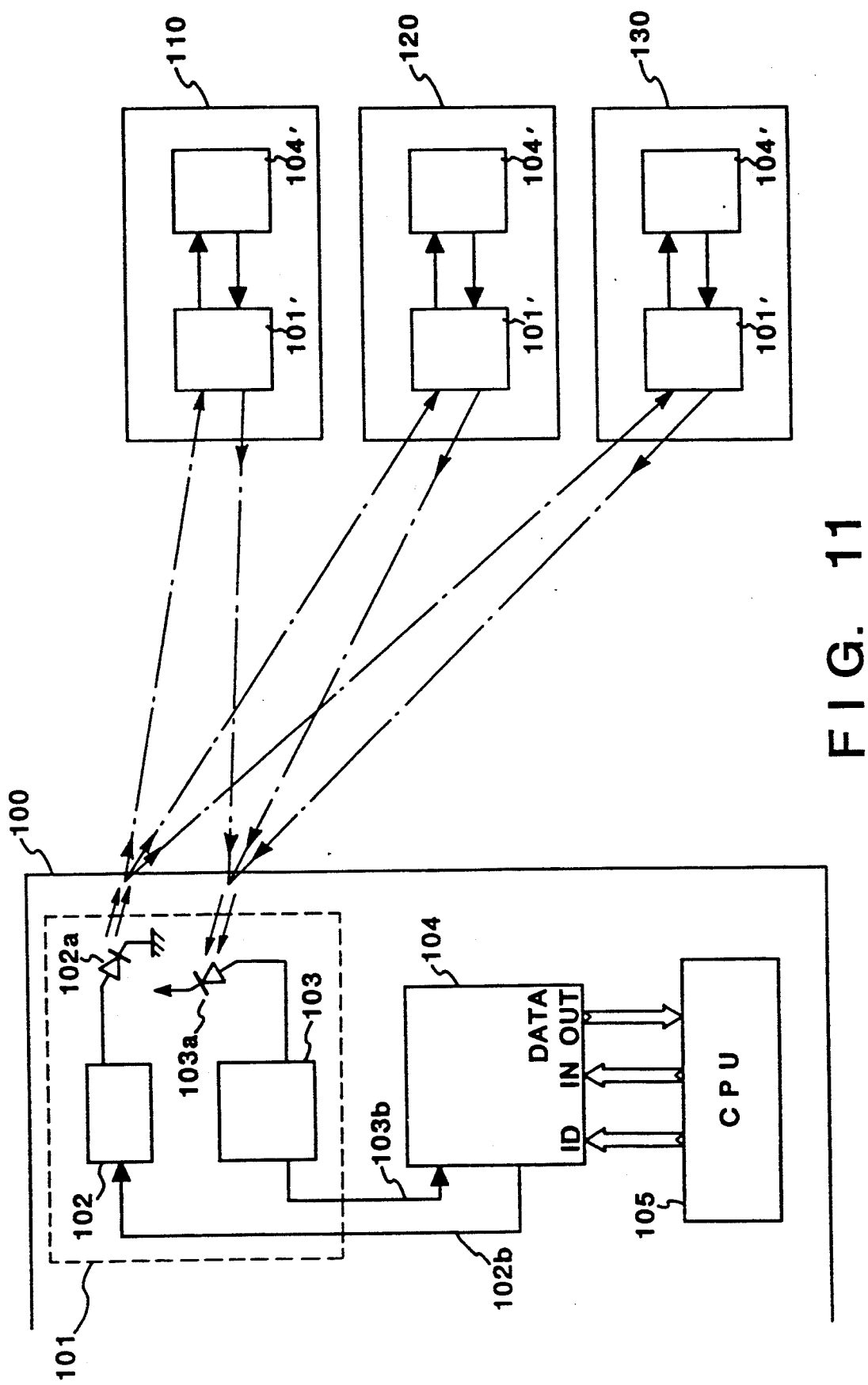
FIG. 11 shows a system to which the communication means of FIG. 1 is applied.

FIG. 11 shows the configuration of an optical communication system which employs the serial communication means. The system shown in FIG. 11 includes a main control unit 100 and units 110, 120 and 130 each of which contains a motor, a fan, an actuator, such as a solenoid, a switch and a sensor. Although the number of units differs depending on the system, the system of this example has three units. The main control unit has a drive circuit 102 for optical communication, a light-emitting element 102a, an amplification circuit 103 for optical communication, and a light-receiving element 103a. A combination of the drive circuit 102 and the amplification circuit 103 is called an optical communication terminal.

The main control unit also has the serial communication means 104 of the aforementioned embodiment. When the serial communication means 104 sends out a serial signal 102b to the optical communication terminal 101, the light-emitting element 102a emits light to transmit the serial data. When the optical transmission is received from either of the respective units 110 to 130 by the light-receiving element 103a, the serial communication means 104 receives a serial signal 103b, and then performs the above-described checking on the received data. If the received data is true, the serial communication means 104 performs serial-parallel conversion and inputs the resultant parallel data to the CPU 105. The data to be sent out from the communication terminal is processed under the aforementioned predetermined condition after it is output from the CPU 105. After parallel-serial conversion, the data is sent out from the light-emitting element 102a.

Each of the units 110, 120 and 130 has an optical communication terminal 101' for executing data transmission with the main control unit 100 using light, although the optical communication terminal is not shown in FIG. 11. Each unit may by constructed such that it is controlled by its own CPU, like the main control unit 100. Alternatively, the data in and data out of the serial communication unit 104 may directly be connected to a solenoid and a sensor.

CONTROL OF TRANSMISSION/RECEPTION TIMING

In the case of optical communication, the serial communication means 104 must be provided with various means for preventing disturbance or collision of light.

Figure 13:
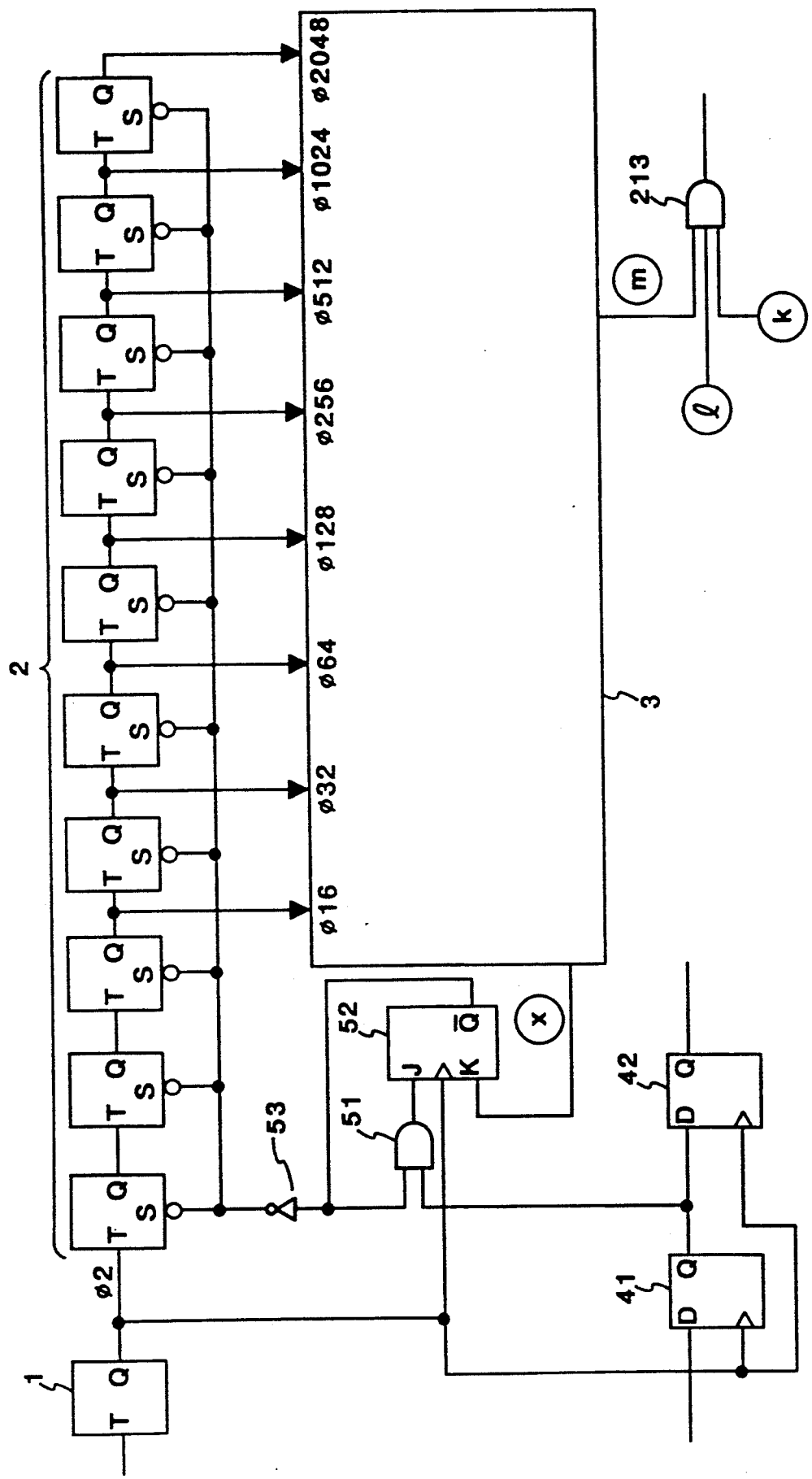
FIG. 13 shows frequency division control conducted when the communication means of FIG. 1 is used in a slave device.

FIGS. 12 and 13 show preferred examples of the ½ frequency dividing circuit 1, multiple frequency dividing circuit 2, synchronizing circuit 4 and frequency multiplication control circuit 5. A description of the timing generating circuit 3 will be omitted since the timing of the output thereof will be explained below in the description of the operation. FIG. 12 shows a concrete example of the serial communication means which is provided in the main control unit 100 shown in FIG. 11. This serial communication means is hereinafter referred to as a master communication means. FIG. 13 shows a concrete example of the serial communication means which is provided in the units 110 to 130, this serial communication means being hereinafter referred to as a slave communication means.

The multiple frequency dividing circuit 2 performs frequency division by "$2^{10}$", and outputs the output of each stage to the timing generating circuit 3 to generate desired timings which will be described later. The circuits shown in FIGS. 12 and 13 are illustrative and not restrictive, since any circuit configuration which achieves the following object can be used.

In FIG. 12, once power is turned on, the circuits are initialized, and the operation of the multiple frequency dividing circuit is started. This makes the signal $\overline{m}$ assume a high level, and thus allows the aforementioned data transmission operation to be enabled. Consequently, the AND gate 213 outputs transmit data as the serial data output 102b shown in FIG. 11. At that time, since the inverted signal of the signal $\overline{m}$ is input to one of the inputs of the AND gate 23 from the timing generating circuit 3, the serial data input signal 103b input to the synchronizing circuit 4 is ignored. Since the signal $\overline{m}$ remains high throughout the transmission of data, reception of the receive data during the transmission of the transmit data is inhibited. In other words, transmission of the transmit data during the reception of the data is inhibited.

Once the transmit data has been output from the master communication means, the signal $\overline{m}$ assumes a low level. This makes the AND gate 23 open for reception of data. Normally, when the master communication means has output the transmit data, the receive data is input from the slave communication means. Once the receive data is input, it is synchronized by the clock $\phi_2$ output from the ½ frequency dividing circuit 1 by D·F/Fs 43 and 44, and the resultant signal is output to the demodulation/conversion circuit 6. Also, the respective outputs of the D·F/Fs 43 and 44 are input to an AND gate 54. The output of the AND gate 54 passes through an NOT gate 56 and is then input to set terminals of the multiple frequency dividing circuit 2. The output of the AND gate 54 is also input to a J terminal of a JK·F/F 55 which outputs a logical low signal from its /G output by a subsequent clock $\phi_2$. The set output from the AND gate 54 to the multiple frequency dividing circuit 2 remains high until a set permitting signal $\overline{y}$ is input to a K terminal of the JK·F/F 55 from the timing generating circuit 3. Since the set permitting signal $\overline{y}$ from the timing generating circuit 3 assumes a high level immediately before the transmission of the transmit data is completed, setting of all the stages of the multiple frequency dividing circuit 2 is not conducted and input processing of the receive signal is thus not conducted even when the receive signal is input from immediately after the reception of the receive data to the completion of a subsequent transmission.

The operation of the multiple frequency dividing circuit will be described. The multiple frequency dividing circuit 2 has a configuration of "$2^{10}$". Since the output of the multiple frequency dividing circuit is decreased by a factor of 2 by means of the timing generating circuit 3, the actual configuration of the multiple frequency dividing circuit 3 is "$2^{11}$". The multiple frequency dividing circuit 2 is set to "FFFH" by the logical low signal from the NOT gate 56. When the multiple frequency dividing circuit 2 has counted down to output when "0" is counted by the timing generating circuit 3, setting of all the stages of the multiple frequency dividing circuit 2 is not performed from immediately after the reception of the receive data to the completion of a subsequent transmission even if a receive signal is input, as in the case shown in FIG. 12. Once the signal ⓧ is input to the K terminal of the JK·F/F 52, the /O output assumes the logical high level, and all the stages of the counter are thus set and then stops until a subsequent reception occurs. In other words, the counter of the multiple frequency dividing circuit 2 in the slave communication means is arranged such that it performs counting down one time for one reception and then stops after data reception and data transmission have been executed. That is, the multiple frequency dividing circuit 2 repeats the following state.

```
- - -Stop- - - -====Reception====-----Transmission-----Stop- - -
     Counter Setting
     7FFH              3FFH              000H
```

"7FFH", the signal ⓜ assumes the logical high level, and transmission is thereby started. When the transmission is completed at "3FFH", the signal ⓜ assumes the logical low level, and reception is thereby permitted. The multiple frequency dividing circuit 2 is set to "FFFH" again at a subsequent reception. That is, the signal ⓜ is controlled such that it has the logical high level while the counter is set to "7XXH" and such that it has the logical low level in other occasions. Therefore, the multiple frequency dividing circuit 2 repeats the following state when normal communication is carried out.

Transmission from the AND gate 213 is enabled by the signal ⓜ which has the logical high level only during the transmission, as in the case shown in FIG. 12. That is, the signal ⓜ has the logical high level only when the counter is set to "3XXH". Output of the transmit data ⓚ is also inhibited by the receive data error signal ⓛ.

EXAMPLE OF TRANSMISSION OF RECEPTION ERROR

In the aforementioned embodiment, when an error is detected, the transmit data is lowered at the AND gate

```
-----Transmission----- .....====Reception====-----Transmission-----
         Counter Setting
7FFH         3FFH         FFFH         7FFH         3FFH
```

In a case where no receive data reaches after "3FFH" has been set, counting down is continued from "0" to "FFFH" At a subsequent "7FFH", a subsequent transmission begins. The multiple frequency dividing circuit 2 is set to "FFFH" and starts counting whenever reception starts between the two transmissions. Since the multiple-frequency dividing circuit 2 is constructed as a so-called ring counter, when no receive data is received, a predetermined period of time is prepared for reception, and reception is then inhibited by the AND gate 23 for a subsequent transmission.

Next, the difference between the slave communication means and the master communication means will be described with reference to FIG. 13. D·F/Fs 41 and 42 conduct synchronization of the receive data, like the D·F/Fs 43 and 44. In the case of the slave communication means, the multiple frequency dividing circuit 2 has the configuration of "$2^{10}$".

In FIG. 13, once power is switched on, the circuits are initialized, and the operation of the multiple frequency dividing circuit 2 is permitted. However, since /O output of a JK·F/F 52 is at the logical high level, the counter which is in a set state is at a stop. Once the receive data is received, the output of an AND gate 51 assumes the logical high level, and the /O output of the JK·F/F 52 thus assumes the logical low level. Consequently, the counter starts counting down. Since a signal ⓧ to be input to a K terminal of the JK·F/F 52 is 213 by the reception error detection signal ⓛ, and transmission of transmit data is not conducted. However, the contents of data error may be sent out as the transmit data, as shown in FIG. 14. In the communication form shown in FIG. 14, the master and slave communication means make one-to-one correspondence for the ease of explanation. In a case where the master and slave make one-to-N correspondence, it may be arranged such that comparison of data and comparison of ID data are separately conducted in the comparison/selection circuit 20 for generating the reception error detection signal ⓛ and such that the results of the ID data comparison is input, together with the reception error detection signal ⓛ, to the AND gate 215 in place of the signal ⓜ. In this way, receive data is received only by the slave communication means designated by the receive data. Once an error occurs, only the slave communication means designated by the receive data sends out the contents of the data error as the transmit data.

The circuit shown in FIG. 14 is a so-called selector circuit. When the receive data error signal ⓛ is at the logical high level, the transmit data signal ⓚ is selected from among the transmission permission signal ⓜ and the transmit data ⓚ and thus appears at the output of an OR gate 216. When the receive data error signal ⓛ is at the logical low level (error), only the transmission permission signal ⓜ appears at the output of the OR gate 216 due to the presence of an AND gate 215, resulting in output of the transmit data having only the logical high level throughout the transmission period. This signal having "only logical high level" is detected by the master communication means. Upon detection of that signal, the master communication means recognizes that data error occurred during the demodulation of data which is conducted by the slave communication means.

Figure 15B:
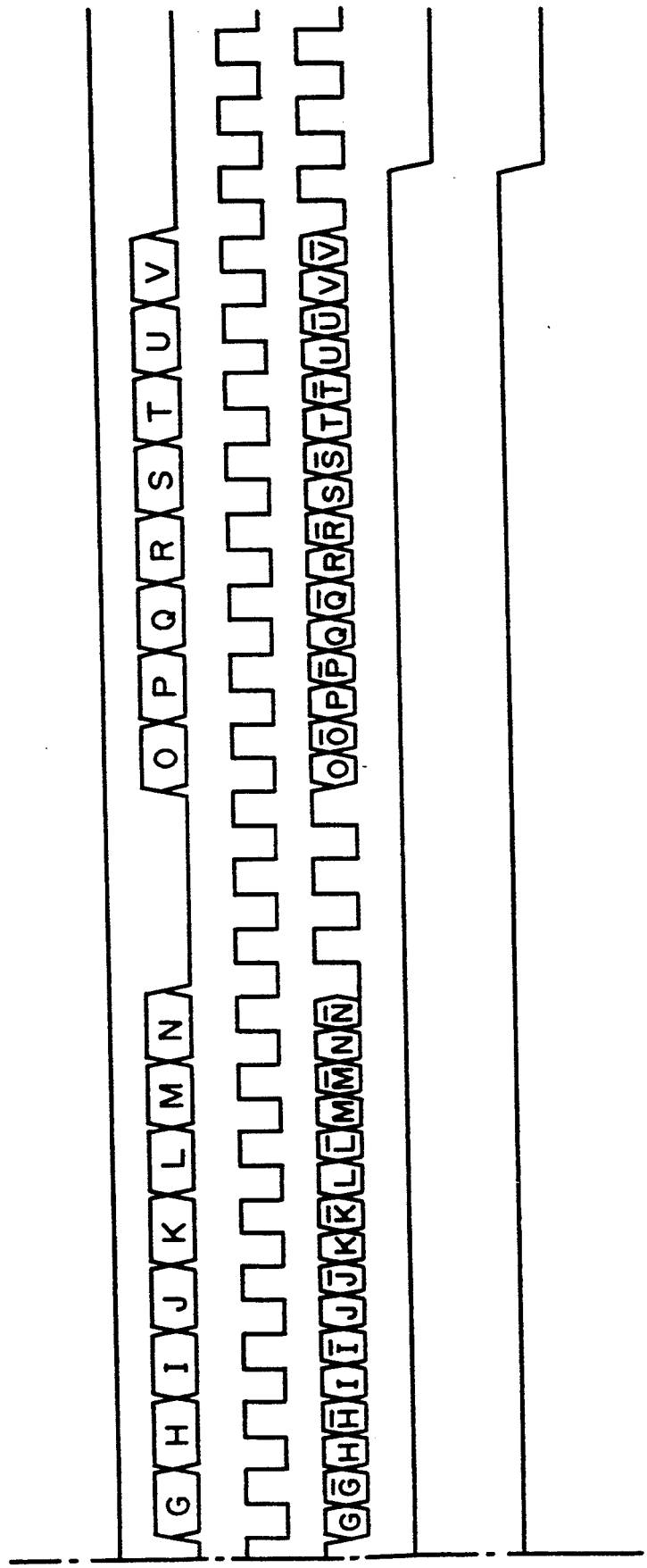
FIG. 15, comprised of FIGS. 15A and 15B, is a timing chart of the circuit shown in FIG. 14.

FIG. 15 is a timing chart for the signals present on the circuit shown in FIG. 14. In this example, data error is returned in the form of a signal having "only logical high level". However, this arrangement is illustrative and not restrictive. In this example, if the master communication means receives a reply after it has conducted transmission, it recognizes the presence of the remote unit. If the master communication means receives no reply, it recognizes either the absence of the remote unit or failure of the transmission path. Also, if there exists at least one slave communication means which is capable of communication, it is determined that the unit which returns no reply is not present.

As will be understood from the foregoing description, data reception is inhibited during the data transmission. Once the receive data is received, starting of the reception operation of new receive data is inhibited until the counting of data reception period is completed. Furthermore, once the receive data error is detected, transmission of the transmit data is inhibited. In this way, optical transmission of data at a relatively high speed is enabled, and collision of the light or erroneous transmission caused by a disturbance during the bidirectional data transmission can be overcome.

Furthermore, even though transmission fails, the presence or absence of a remote unit can be confirmed by sending out the contents of the data error as the transmit data, as shown in FIG. 14. In the case of communication made between one master communication means and N slave communication means, transmission is inhibited by the ID data, and erroneous transmission of the transmit data generated by the collision of the light can thus be prevented.

Processing of other communication errors will be described with reference to FIG. 16.

Figure 16:
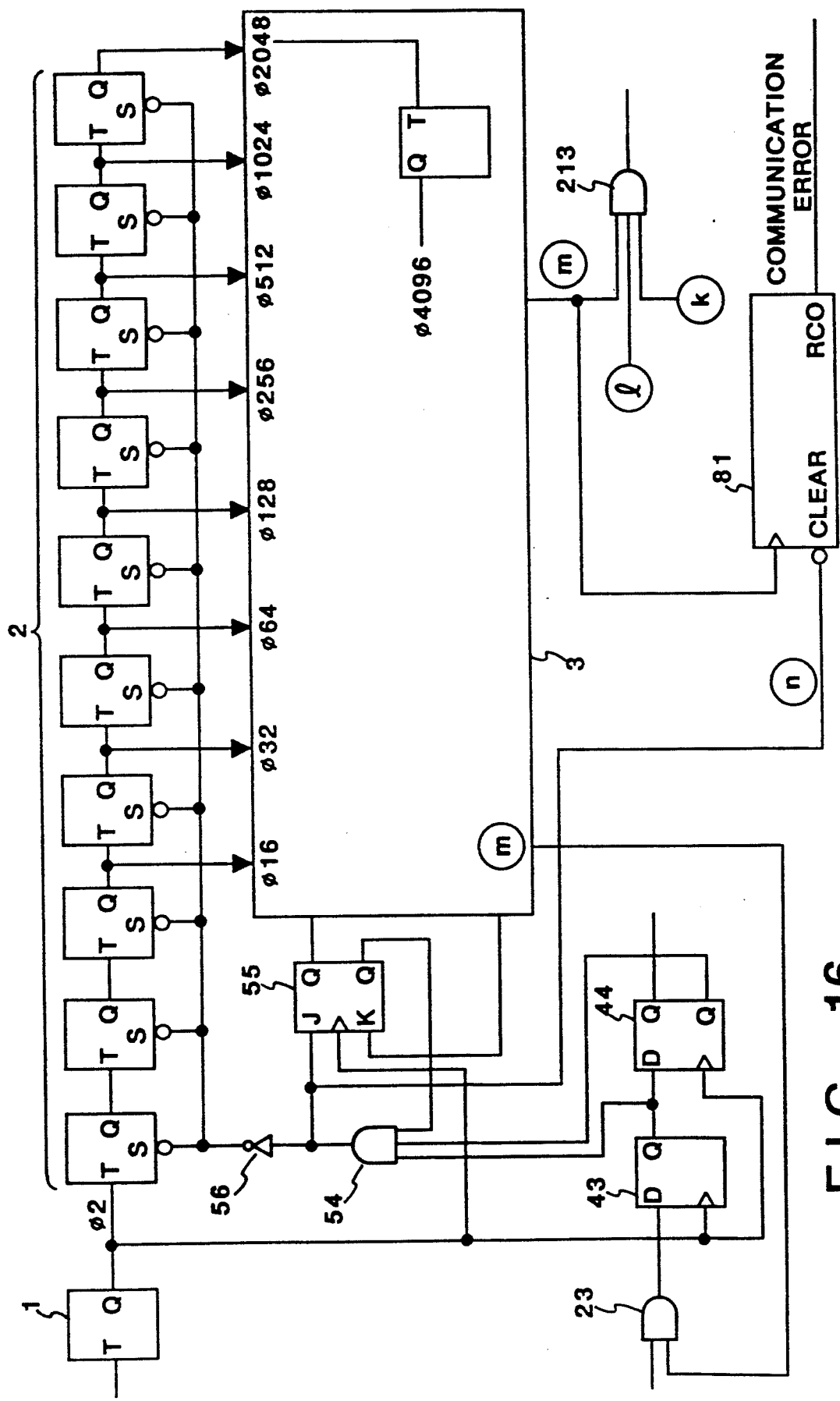

In FIG. 16, a reference numeral 81 denotes a counter circuit having a predetermined number of stages. Synchronization of the counter circuit 81 is made using the transmission permitting signal ⓜ as the clock. The counter circuit 16 is reset by the output signal ⓝ of the AND gate 54. The other configuration is the same as that shown in FIG. 12. The counter circuit 81 starts counting by the transmission permitting signal ⓜ which assumes the logical high level when transmission is conducted by the serial communication means, each time transmission is conducted. The counted value of the counter circuit 81 is reset by the signal ⓝ from the AND gate 54 each time reception is conducted by the serial communication means. Thus, the overflow of the counted value of the counter circuit 81 does not occur when the normal communication is carried out. However, in a case where reception is not conducted continuously, the counted value of the counter circuit 81 overflows, and the counter circuit 81 outputs a ripple carry out (RCO). Resetting of the system may be conducted using this ripple carry out as the communication error signal. No operation may be made in each of the slave communication means when the communication error is detected. Alternatively, the slave communication means may be arranged such that it is reset when the transmission does not reach from the master communication means cyclically (although no concrete example is given, the counter circuit 81 may be provided).

As stated above, counting is performed when no reception is received after transmission is made. When the counted value a reaches a predetermined value, communication error is detected. In this way, communication run away of the optical communication means can be prevented, and presence of the remote unit can be confirmed.

Next, processing of still another communication errors will be described with reference to FIG. 17.

In FIG. 17, a reference numeral 90 denotes a selector circuit for selecting the reception synchronizing signal ⓝ which is the output of the AND gate 54 in accordance with the ID data from the ID data input circuit 8 and for outputting the selected signal to a desired counter circuit. Reference numerals 94, 95 and 96 respectively denote counter circuits which use the transmission permitting signal ⓜ as the clock. The output of the selector circuit 90 is input to a clear terminal of either of the counter circuits 94, 95 and 96. A reference numeral 97 denotes an AND gate to which a ripple carry out is input when overflow occurs in the counter circuits 94 to 96. The ripple carry out of the counter circuits 94 to 96 and the output of the AND gate 97 are input to a CPU 105.

The counter circuits 94 to 96 start counting by the transmission permitting signal ⓜ which is output each time transmission is conducted. When the counted value overflows, the corresponding counter circuit outputs the ripple carry out (indicated by RCO in FIG. 17) to the CPU 105. When the counter values of all the counter circuits overflow, the AND gate 97 informs of this fact to the CPU 105. The counter circuits 94 to 96 are cleared in accordance with the ID data from the ID data input circuit 8 each time reception is made. Therefore, counter ripple carry out is not output when communication is made in a normal state. The circuit configuration shown in FIG. 17 is illustrative and not restrictive and any other circuit configuration may be adopted so long as it achieves the objective.

TESTING FUNCTION OF SERIAL COMMUNICATION MEANS

Figure 18:
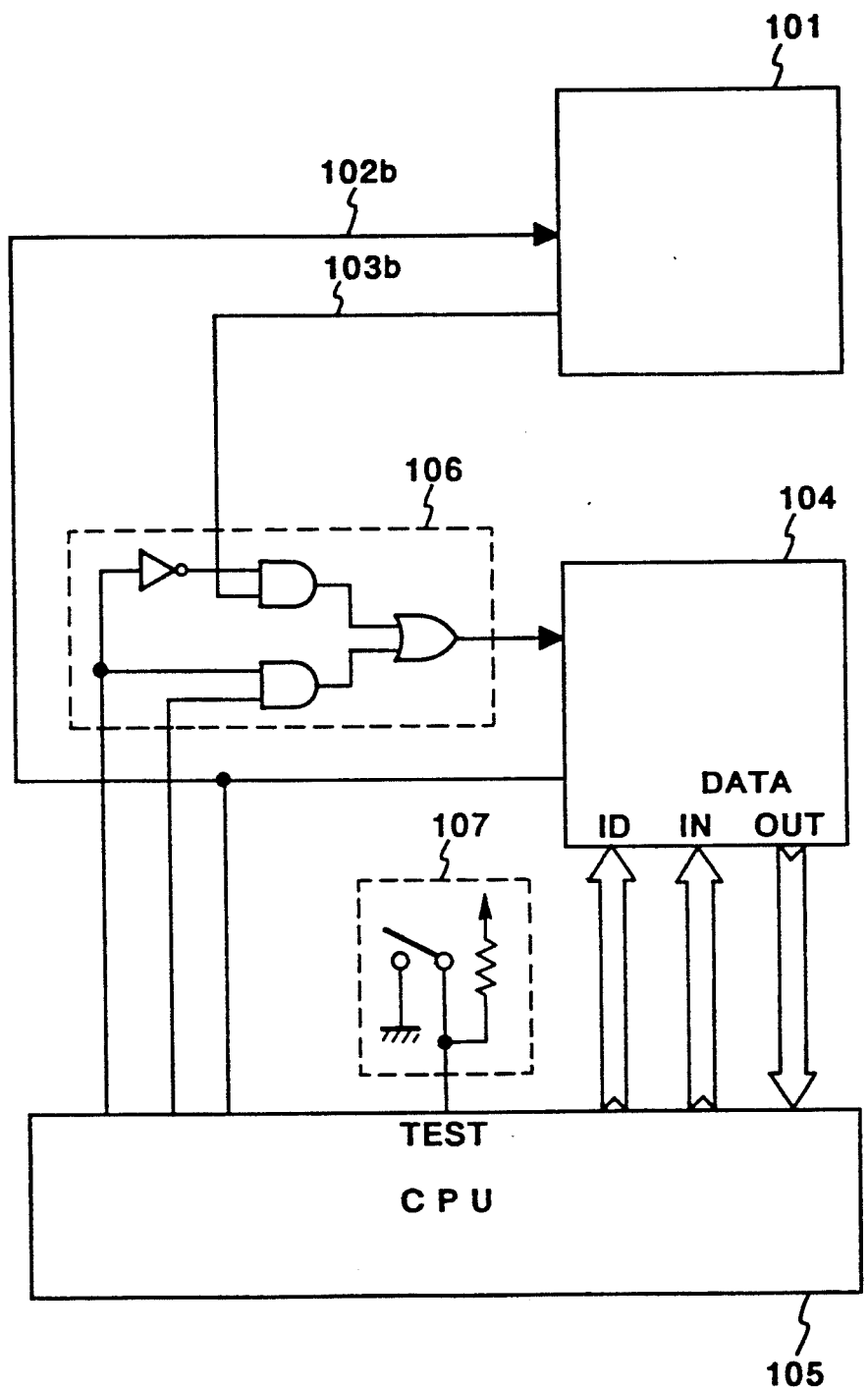
FIG. 18 shows a circuit used in the test mode in the master device.

The configuration used to implement the adjustment conducted during the assembly or maintenance of the optical communication means will be described with reference to FIG. 18. In FIG. 18, a reference numeral 106 denotes a selector circuit for outputting to the serial communication means either the received serial signal 103b or a serial signal output from the CPU 105 for testing. A reference numeral 107 denotes a test input means for giving an instruction to operate in a test mode to the CPU 105. The operation of the test mode may also be instructed externally. The configuration shown in FIG. 18 corresponds to the main control unit 100 shown in FIG. 11. The same reference numerals are therefore used in FIG. 18 to denote parts which are the same as those shown in FIG. 11.

PROCEDURE OF ERROR PROCESSING AND TESTING

Figure 19:
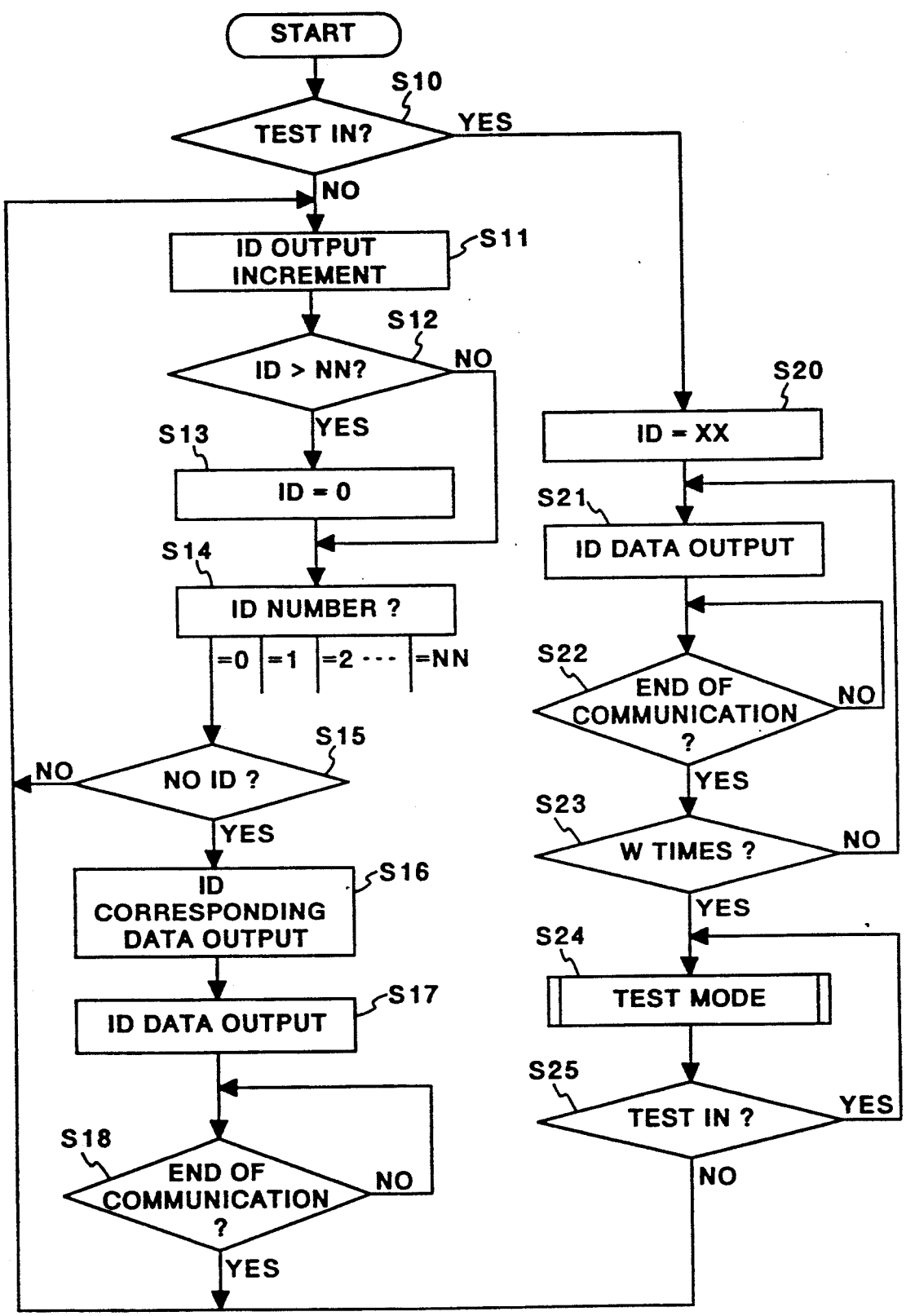
FIG. 19 is a flowchart of the control of a CPU 105.

The CPU 105 performs control in accordance with the procedures shown in FIG. 19. Although the CPU 105 performs controls other than that shown in FIG. 19, the necessary program alone will be described below for ease of explanation.

In step S10, the CPU 105 determines whether or not the test mode request is present. If a communication mode is requested, the order in which the ID data is output is determined in steps S11, S12, and S13. Thereafter, in step S14, the ID data to be transmitted is recognized. The number of ID data corresponds to the number of counter circuits shown in FIG. 17 and, hence, to the number of slaves for optical communication. Therefore, the ID number "NN" shown in the program is determined by the number of slaves for optical communication. When the ID is "0", the following process will be executed. The same processing is executed when the ID is "1", "2" . . . "NN", description thereof being omitted.

In step S15, it is determined whether or not the ripple carry out signal output from the counter circuits corresponding to the currently designated ID numbers is present. Although this is simply described "No ID ?" on the flowchart of FIG. 19, it is first checked in step S15 whether or not all errors are present from the output of the AND gate 97. If all errors are present, communication control is suspended, and the communication means is then reset. If the answer is negative, the counters corresponding to the currently designated IDs are checked. If there is no overflow, the process goes to step S16. If there is an overflow, it is determined that there exists no remote unit, and the process returns to step S11. In step S15, only as to whether or not there exists a communication error may be determined. In that case, transmission is made regardless of the presence or absence of the remote unit. Thereafter, in steps S16 and S17, the individual data are called from the memory and then respectively output to the previously allocated output ports. Subsequently, it is determined in step S18 whether or not communication is ended. If the answer is affirmative, the process returns to step S11, and the above-described processings are repeated.

In steps S11 to S13, the ID number to be transmitted subsequently is decided sequentially. However, this is not restrictive. For example, after the units are classified into a group to which data should be transmitted in a relatively short period and a group to which transmission is conducted in a relatively long period, transmission order may be determined. Thus, a desired priority may be given to the unit before transmission order is decided.

If the test mode is instructed to be actuated by the test input means 107, test mode register number (which is expressed by XX in this embodiment) is assigned to the ID number in step S20. Next, in step S21, ID data and transmission data are output. The transmission data for testing is not specified. It may be data instructed to the individual slave communication means for testing or may be data other than that. After it is determined in step S22 that communication is completed, it is determined in step S23 whether or not communication has been conducted a few times. In this way, even if the slave communication means fails reception of the first test mode in instruction, it may receive at least one test mode instruction from among a plurality of test mode in instructions. Thereafter, test operation of this serial communication means is carried out in step S24. Although the contents of the test operation are not described, any operation which checks the serial communication means itself may be conducted. Furthermore, since the contents of the test operation differ depending on the system to which this serial communication means is applied, there is no limitation on them. Just one example will be given below.

The test mode operation may be the so-called checking program for the CPU which checks input and output. In this program, the serial data output from the CPU for testing is given to the communication means 104 as the receive data received from another unit. The CPU checks the parallel data and transmit data (serial out data) which are output from the communication means 104 as a consequence of reception of the serial data for testing. The CPU checks not only the state in which communication is successful but also the abnormal operations.

After the test is completed, it is checked in step S25 whether or not the test mode has been cancelled. If the test mode has not been cancelled, the process returns to step S24 and the test operation is repeated. If the test operation has been cancelled, the process returns to step S11.

Next, the test mode operation of the slave communication means will be described. Although the test mode operation conducted for the master communication means in this embodiment will be described separately from the test mode operation conducted for the slave communication means for the ease of explanation, either test mode operation may be conducted on the communication means. Of course, there is no difference between these two types of test mode in operations in terms of hardware.

In order to carry out the test operation, the communication means is provided with two additional means 108 and 109. The test mode in detection means 108 determines whether or not the ID data in the received data represents the test mode by comparing the previously registered ID number "XX" with the received ID number. The selector circuit 109 makes a selection as to whether the serial data is input to this communication means as a consequence of the results of the comparison made by the ID comparison circuit 108 as the data sent from the master communication means or as the serial data transmitted by itself. In the case of the serial data transmitted by itself, since the ID data in the data does not generate receive data error in the comparison made by the comparison/selection circuit 20, the data input from the transmit data input of this communication means is output from the receive data output. That is, the states of the individual sensors are output to the corresponding actuators or the like. For checking, a checking tool may be mounted on this communication means. For example, an input of switches may be received by an LED. Checking can be performed using a checking tool mounted on the communication means or without it.

More specifically, this test mode is intended to achieve closed-loop operation of the serial communication system which is confined to a single slave communication means and thereby enable checking of communication of the single slave communication means. In order to achieve this object, the communication means includes the ID comparison circuit 108 for determining whether or not test mode is instructed and the selector (switch-over) circuit 109 for inputting the transmit data transmitted by itself as the receive data.

Therefore, there is no limitation to the configuration of this test mode but any configuration may be used so long as it includes:

1. receive data switch-over means (109) and 2. test mode determination means (108).

That is, in the case of the optical communication, the light from the transmission LED reflected by a mirror may be received by the light-receiving element for reception as the receive data.

Figure 20A:
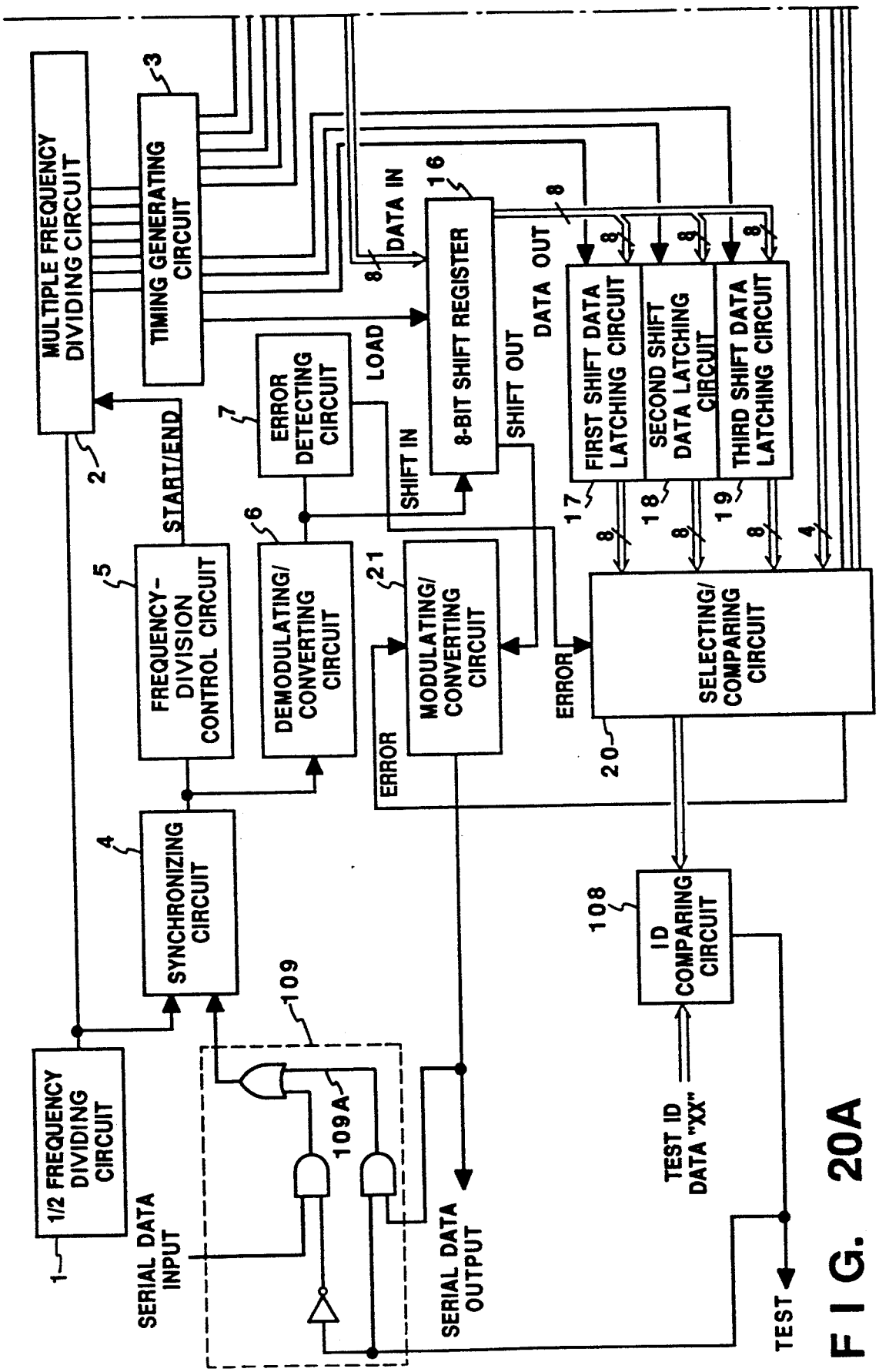
FIG. 20, comprised of FIGS. 20A and 20B, shows a circuit used in the test mode in the slave device.
Figure 20B:
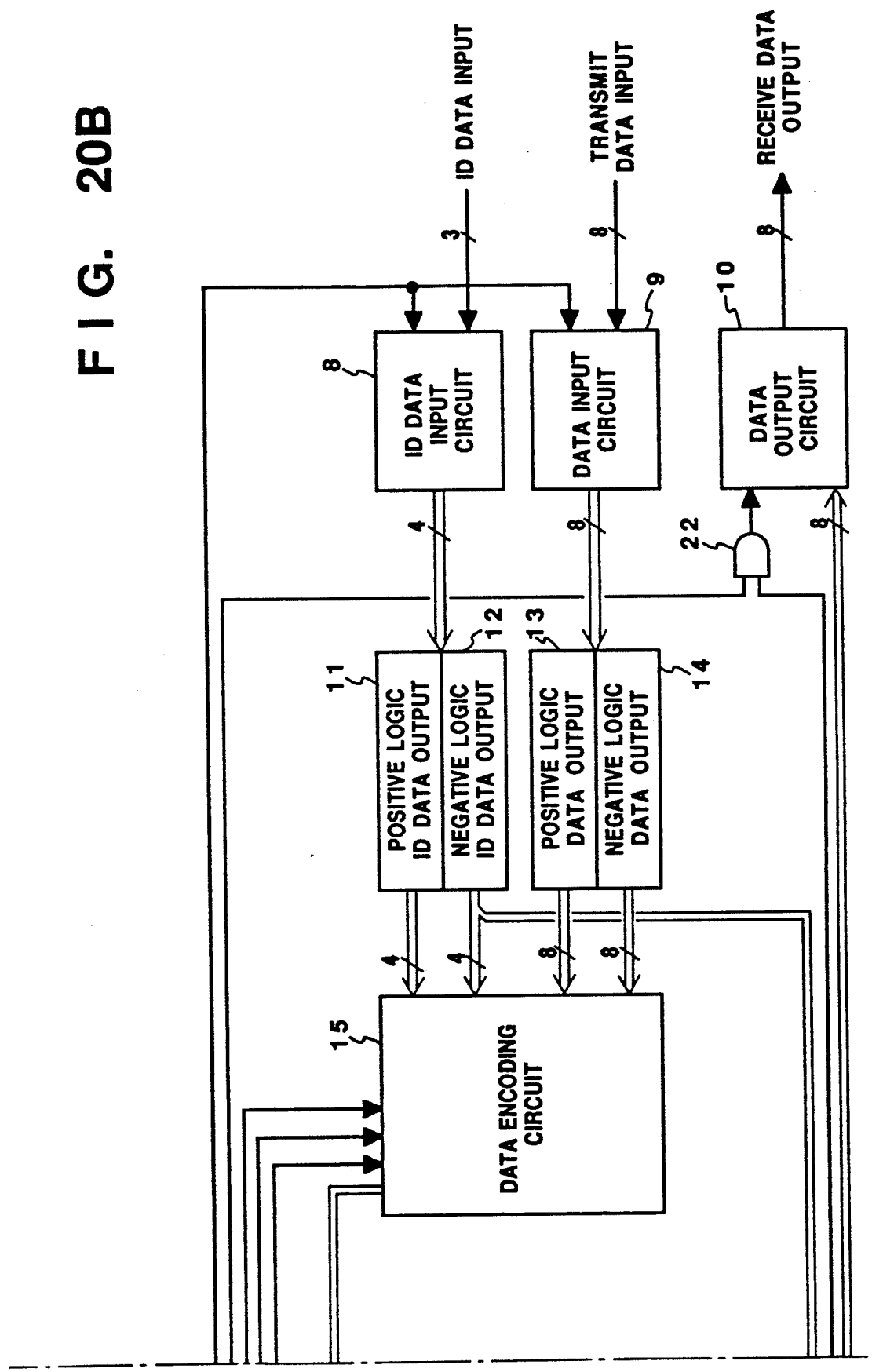

However, the aforementioned communication system does not accept new reception during the reception or transmission. Therefore, the configuration shown in FIG. 20 is not sufficient to carry out the closed-loop operation of the communication system. In order to carry out the closed-loop operation in the aforementioned communication system, a delay circuit for delaying data for the time corresponding to one frame may be provided on the signal line indicated by 109A in FIG. 20. Practically, receive data is delayed until the output of the transmit data is completed by means of a 32-bit shift register or the like, and reception is executed upon completion of transmission.

Alternatively, the shift register 16 for both reception and transmission may be replaced with a shift register for reception only and a shift register for transmission only so as to make reception possible during the transmission.

In other words, there is no limitation on the configuration of this test mode because it can be readily implemented.

Although the aforementioned test operation for slave communication means may be implemented in hardware alone, as described above, when the slave communication means contains a CPU, the same test operation as that conducted in the master communication means may be conducted.

As will be understood from the foregoing description, a counting means for conducting counting when there is no reply from the slave communication means is provided for each peculiar number, and it is determined that a communication error is present when all the counted values exceed a predetermined value. Alternatively, when some counted values in a plurality of counting means exceed the predetermined value, it is determined that the units corresponding to these counting means do not exist. This allows the main control unit to determine the existence or non-existence of the remote communication means.

Furthermore, when it is determined that the slave communication means does not exist, transmission of the transmit data from the main control means to that unit is not conducted in order to improve the communication efficiency.

Furthermore, when it is determined that the peculiar number designated in the receive data is the register number of the main control means, serial communication is suspended, and the test mode is attained independently. This facilitates adjustment conducted during assembly of the system.

Furthermore, when it is determined that the peculiar number in the transmit data is the register number of the main control means, serial communication is suspended, and the test mode is attained independently. This facilitates adjustment. When the transmit data with the peculiar number which is the register number of the main control means is transmitted, transmission is conducted a plurality of times so as to save a communication means which fails to attain the self-diagnosis mode due to an accidental communication error.

SYSTEM CONFIGURATION OF THIS EMBODIMENT

Figure 21:
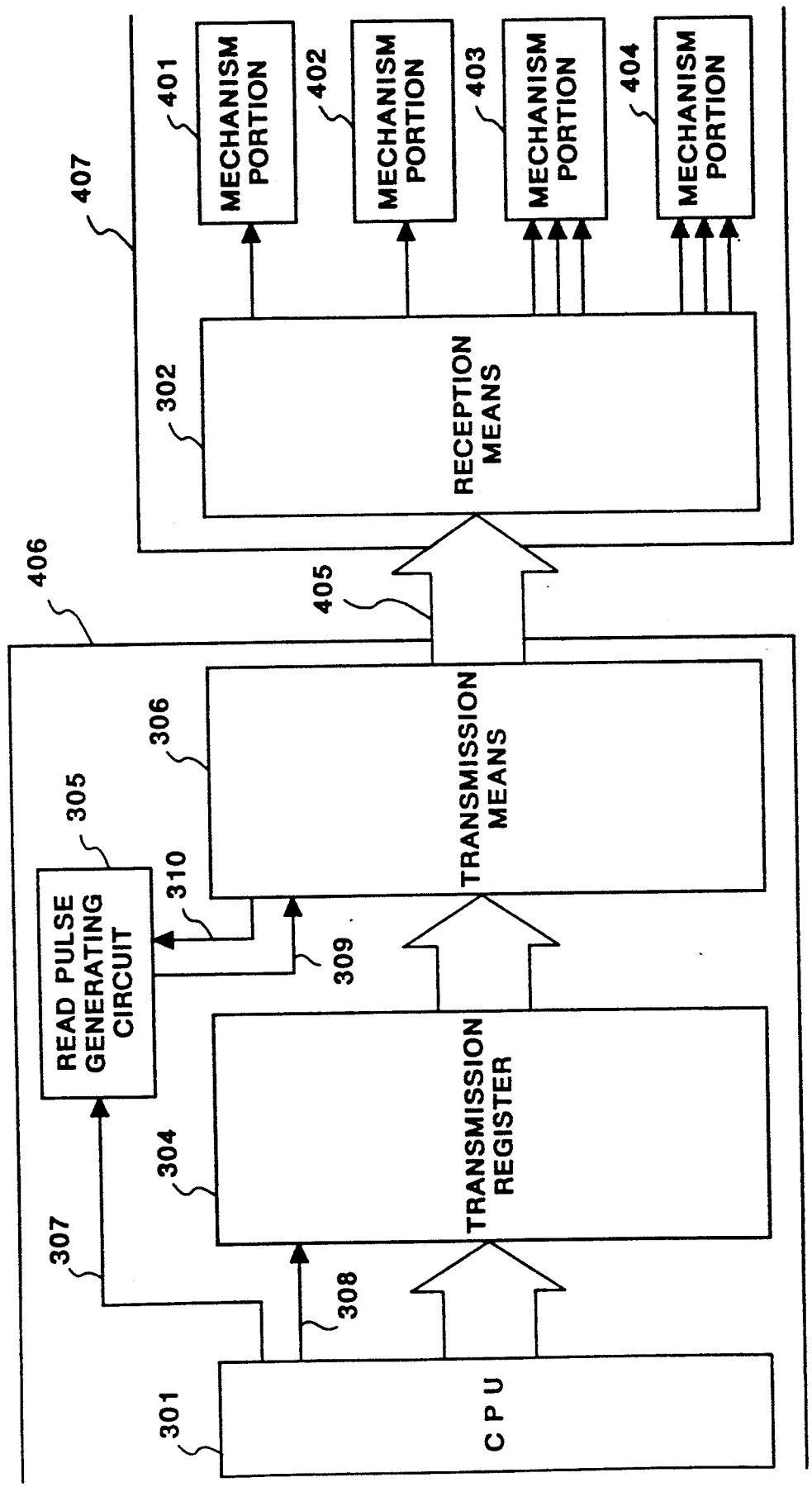
FIG. 21 is a block diagram showing a system configuration of the embodiment of the present invention.

FIG. 21 is a block diagram showing the system configuration of this embodiment. The system shown in FIG. 21 is a circuit for transmitting data from the CPU 301 to another unit 407. Data is latched in a transmission register 304 by a writing pulse 308. The CPU 301 outputs as a signal dependent on a processing cycle an address latch signal 307 for switching over the same signal line between a data bus and an address bus on the time sharing basis. That is, the CPU 301 has a so-called multiplex bus which is used as the address bus when the address latch signal is at the logical high level. A transmission means 306 outputs a read request signal 310 when it has completed nth transmission and is thus ready to receive subsequent data. In other words, the transmission data is latched in the transmission means 306 by the application of a read pulse 309 to the transmission means 306 at that time, the latched data being then sent to a reception means 302 through a communication line 405 for controlling the individual mechanism portions 401 to 404 in the controlled unit 407. The read pulse 309 is generated by a read pulse generating circuit 305 from the address latch signal 307 and the read request signal 310. The configuration of the read pulse generating circuit 305 can be very simple. An example of such a read pulse generating circuit 305 is shown in FIG. 22. In FIG. 22, the CPU 301, the transmission register 304 and the writing signal 308 for the transmission register 304 have the same functions as those shown in the conventional technique. An AND circuit 311 having a negative lock corresponds to the aforementioned read pulse generating means 305. In this embodiment, the read pulse 309 is generated by performing AND operation on the read request signal 310 from a read request signal generation means 314 and from the address latch signal 307. FIG. 23 is a timing chart of an address signal 313 for the CPU 301, a data bus 315, the address latch signal 307, and a write signal 316. The data bus 315 outputs an address signal 317 and a data signal 318 on the time-sharing basis.

Figure 24:
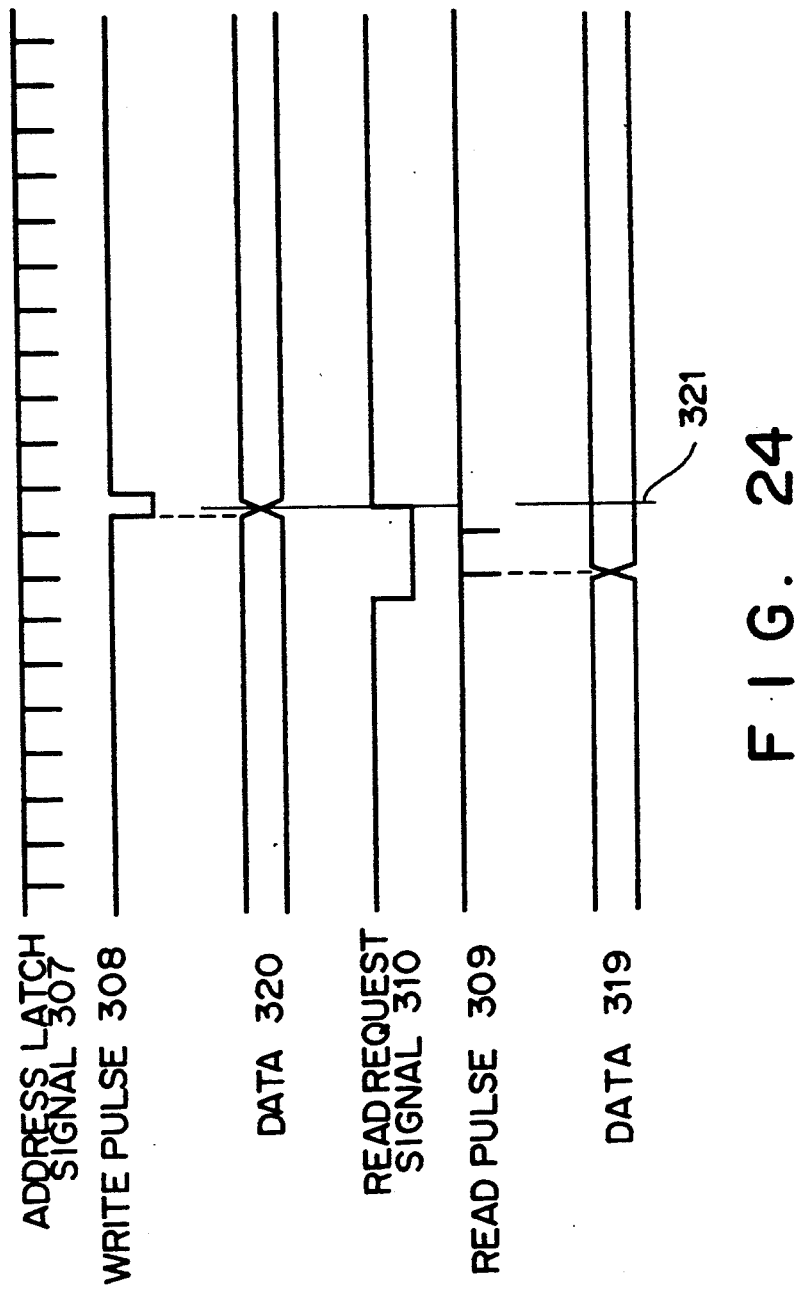
FIG. 24 is a timing chart of the operation of inputting data in and outputting data from the transmission register 304.

A decoder 312 decodes only the address signal 313 and ignores the address signal 317. FIG. 24 shows how the aforementioned transition overlaps the data latched portion in the timing chart shown in FIG. 23. In FIG. 24, a reference numeral 307 denotes the address latch signal; 310 denotes the read request signal; and 319 denotes data taken in the transmission means 306. A reference numeral 308 denotes the writing pulse for the transmission register 304; and 320 denotes data latched in the transmission register 304. Since the read pulse 309 is formed by conducting the AND operation on the address latch signal 307 and the read request signal 310, even if the read request signal 310 is output when the write pulse 308 for the CPU 301 is false, the data is not immediately read but is latched at the defined portion.

Thus, data can be guaranteed by the provision of a small-scale circuit.

That is, the transmission register 304 takes in data from the CPU 301, and the data taken in the transmission register 304 is read out by the transmission means 306 asynchronously with the data taking in operation of the transmission register 304. At that time, the transmission means 306 takes in data from the transmission register 304 while the CPU 301 is not outputting data to the transmission register 304 (while the address latch signal 307 is at the logical low level). Consequently, the data read by the transmission means 306 does not become undefined.

In the aforementioned embodiment, the present invention is applied to the transmission of data from the CPU 301 to the unit 407. The present invention can also be applied to the reception.

Figure 25:
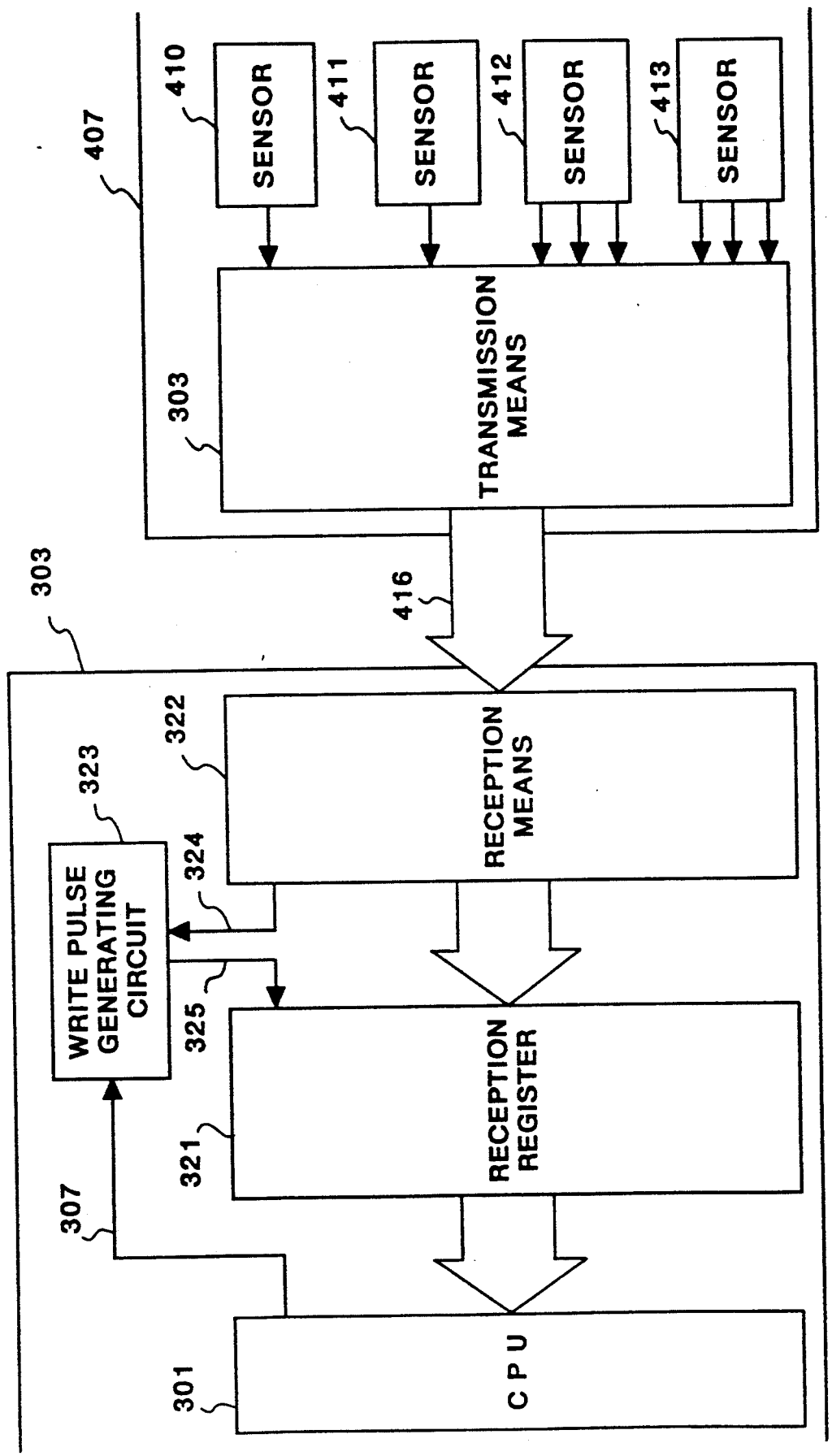
FIG. 25 is a block diagram showing a system configuration of another embodiment of the present invention.
Figure 26:
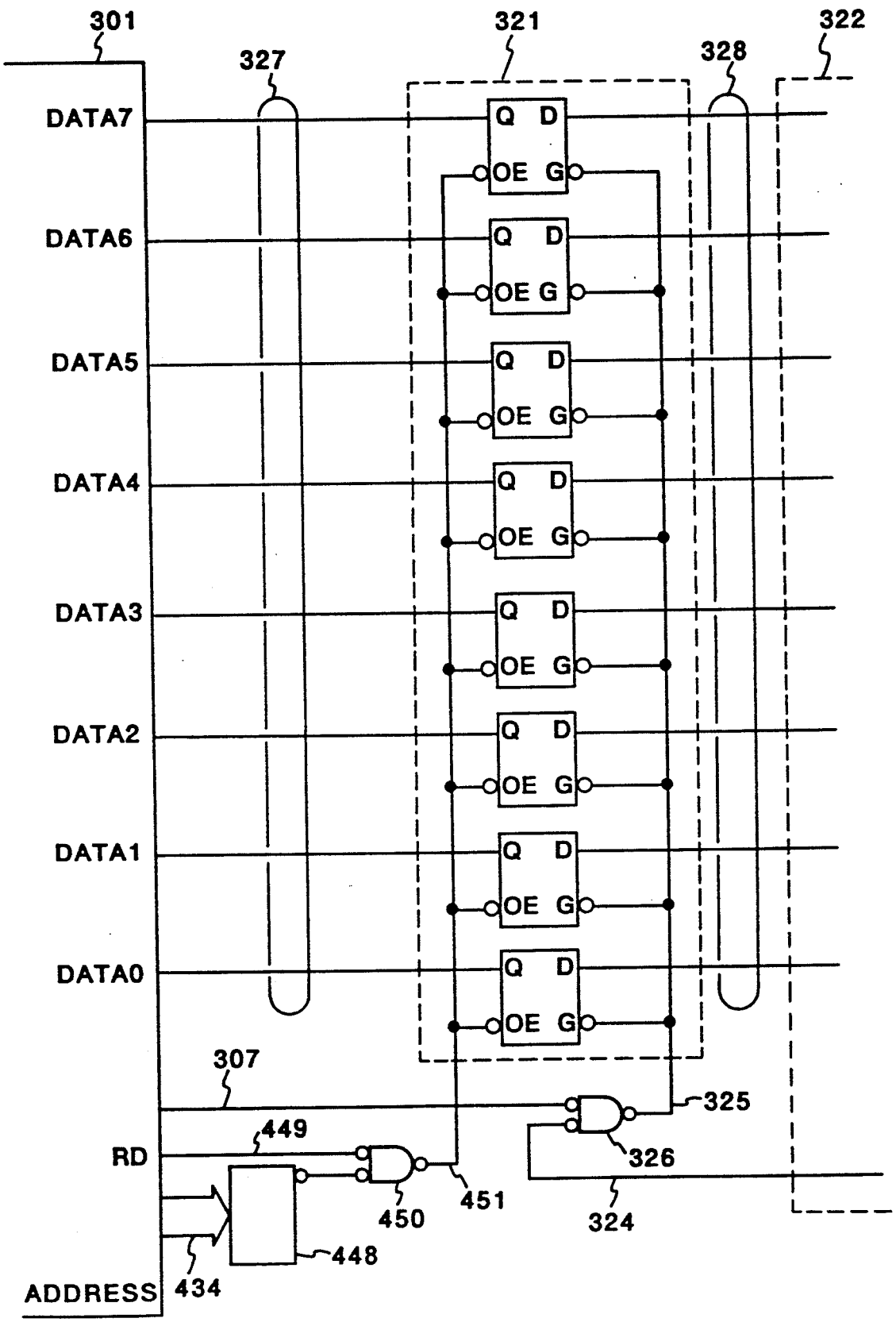
FIG. 26 is a circuit diagram of the vicinity of a reception register 321 shown in FIG. 25.

FIG. 25 shows such a configuration. In FIG. 25, a reference numeral 307 denotes the signal similar to the address latch signal. When a reception means 322 receives the input from the sensors 410 to 413 in the external unit 407 through the transmission means 306, it generates a write request signal 324. A write pulse generating circuit 323 generates a write pulse 325 for a reception register 321.

The write pulse generating circuit 323 and the reception register 321 will be described below in detail. An address signal 434, a decoder 448, a write signal 449, and a write pulse 451 are the same as those described above. A write pulse for the reception register 321 is generated by performing logical AND on the write request signal from the reception means 322 and the address latch signal 307.

Figure 28:
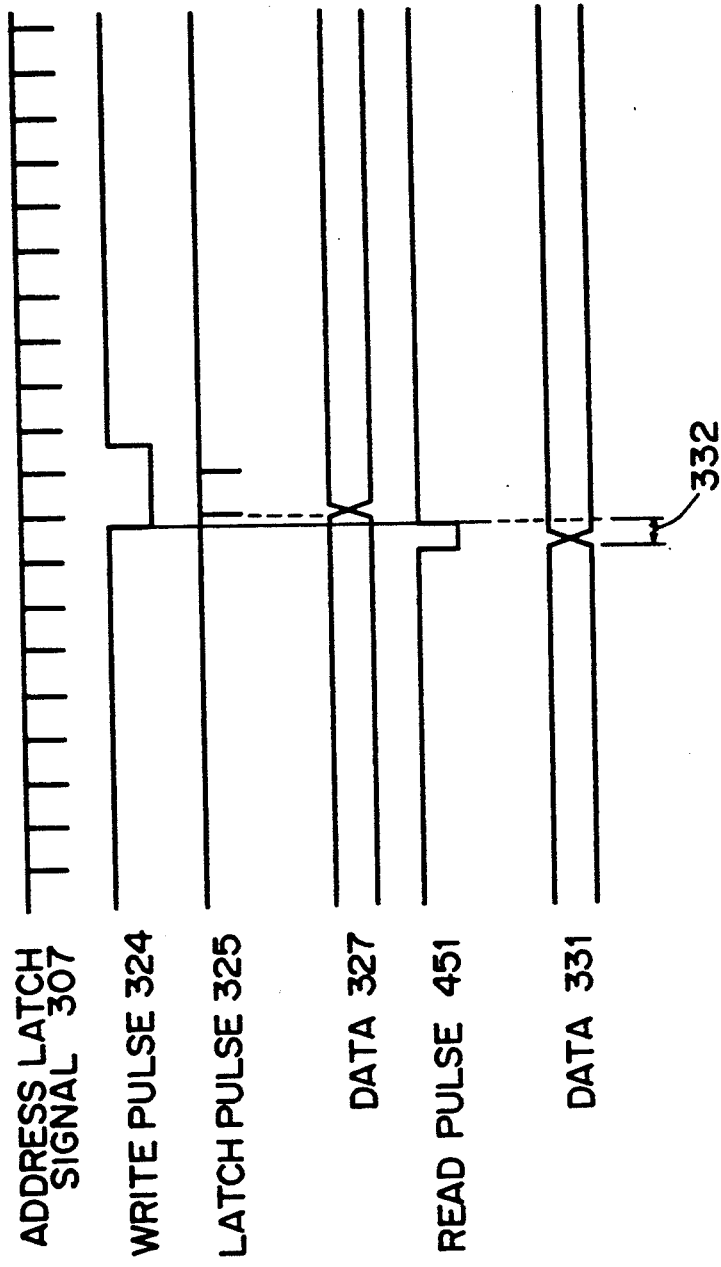
FIG. 28 is a timing chart of the operation of inputting data in and outputting data from the reception register.
Figure 31:
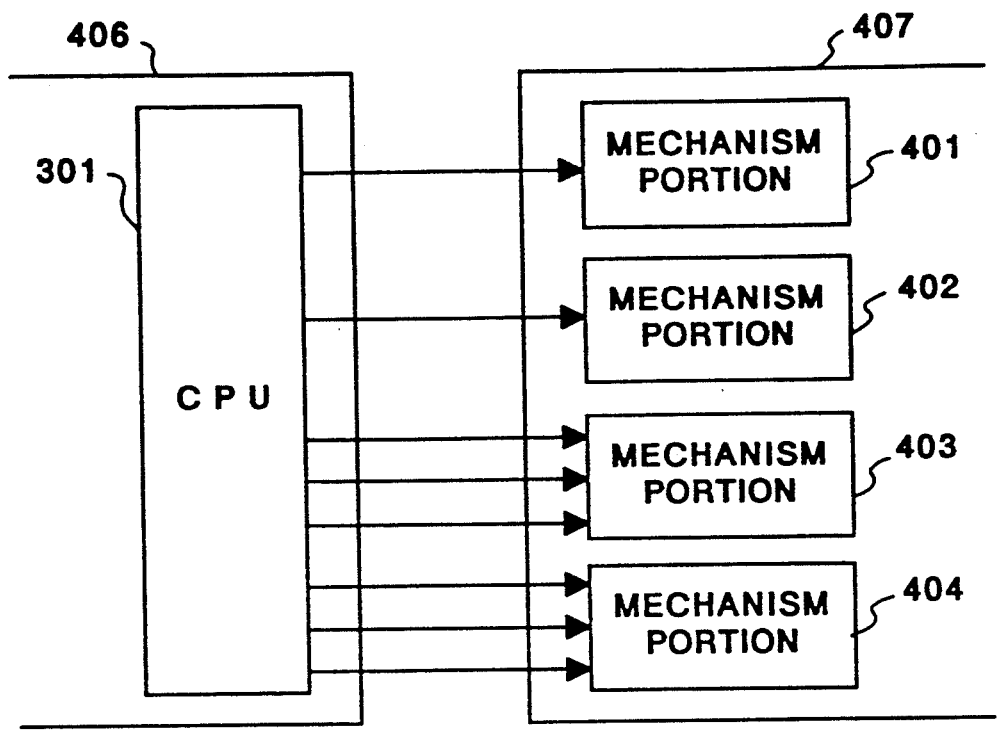
FIGS. 31 to 34 are block diagrams showing the configuration of a conventional technique.
Figure 32:
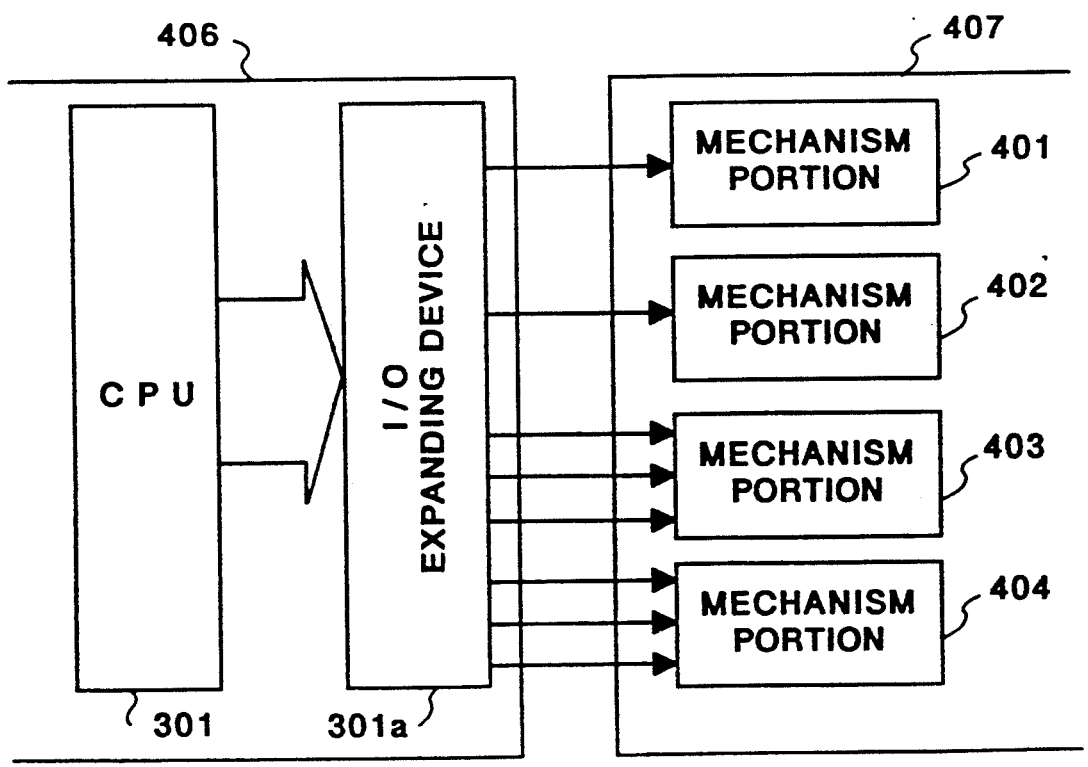
Figure 33:
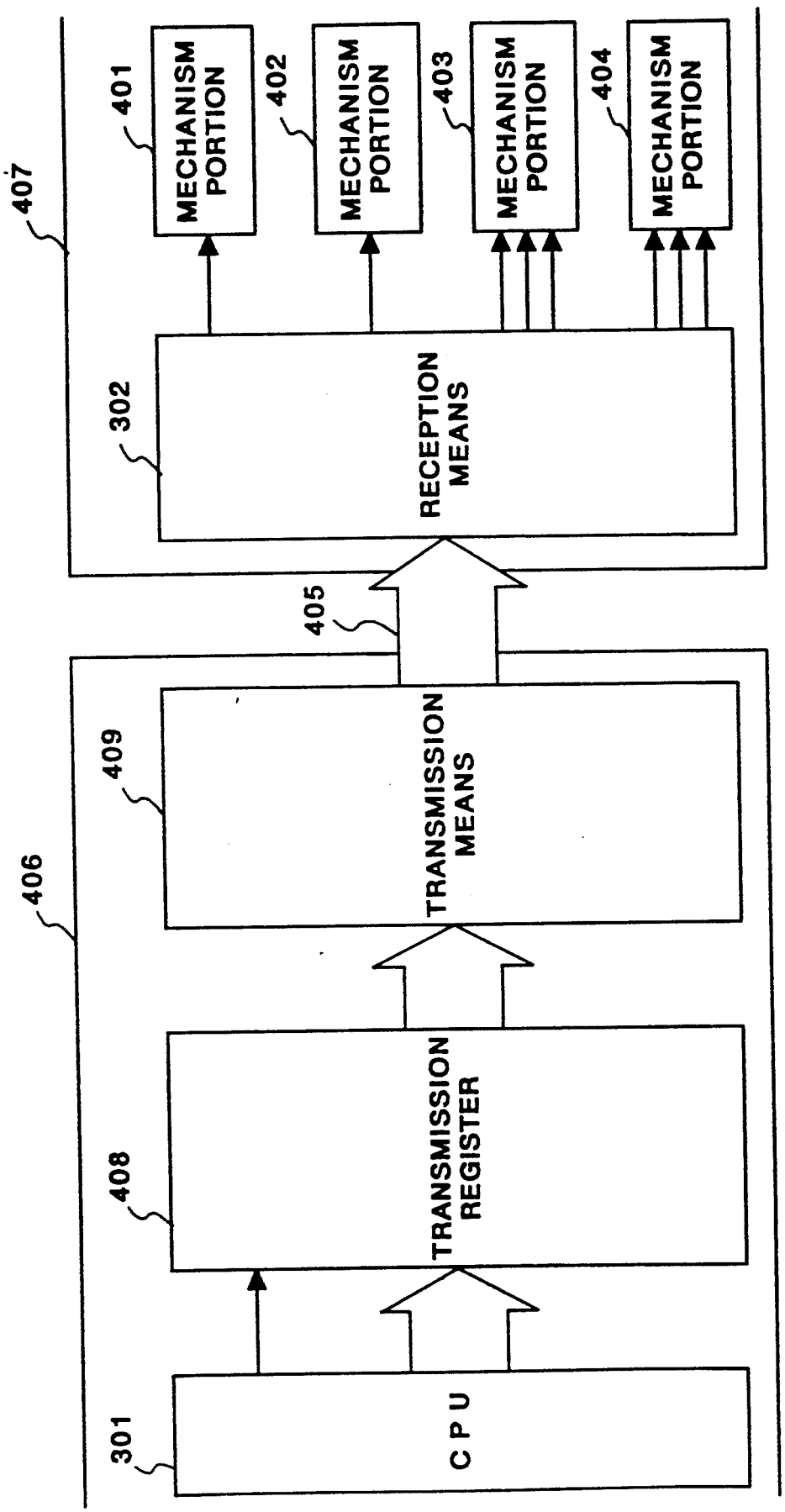
Figure 34:
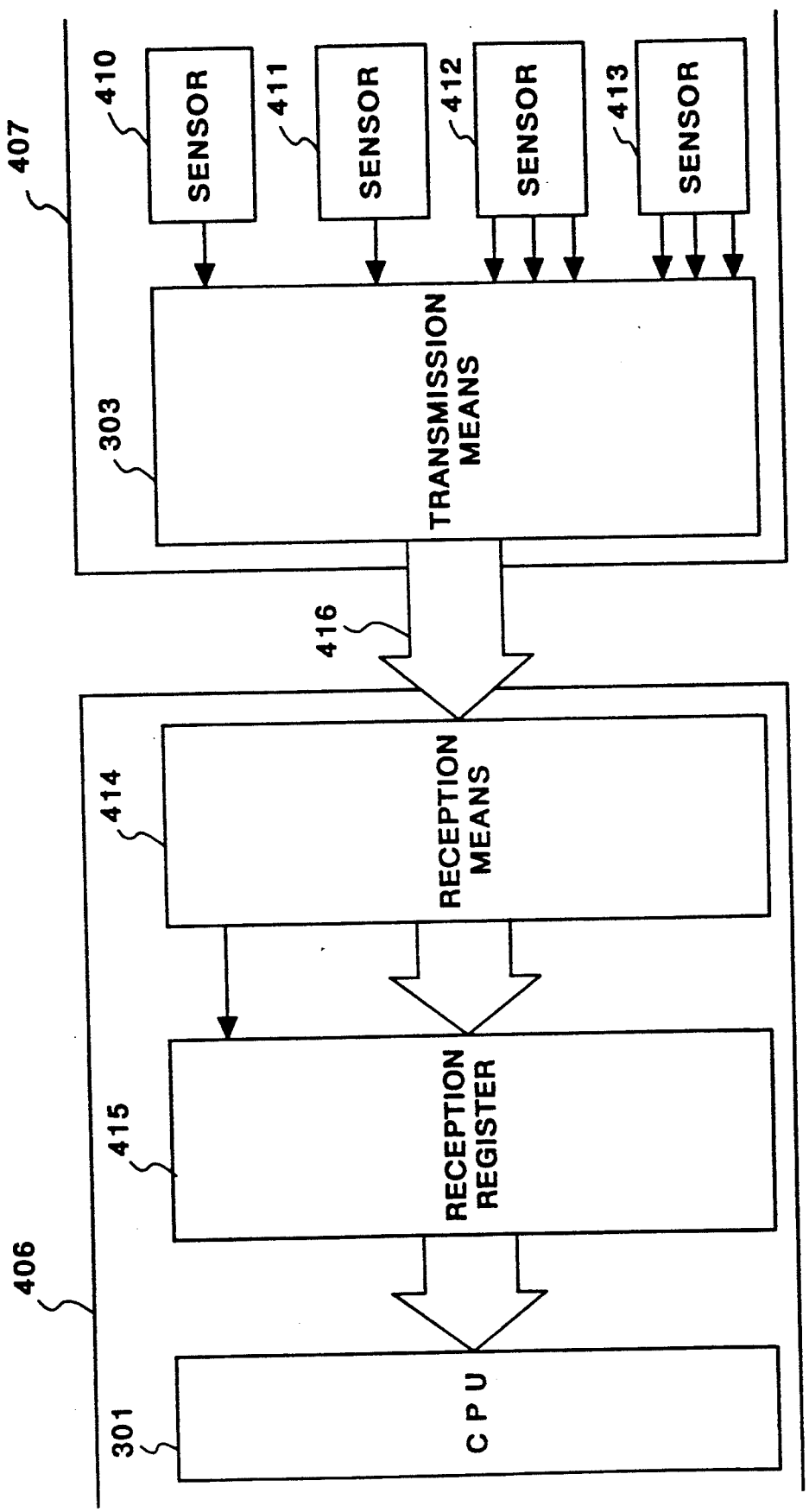
Figure 35:
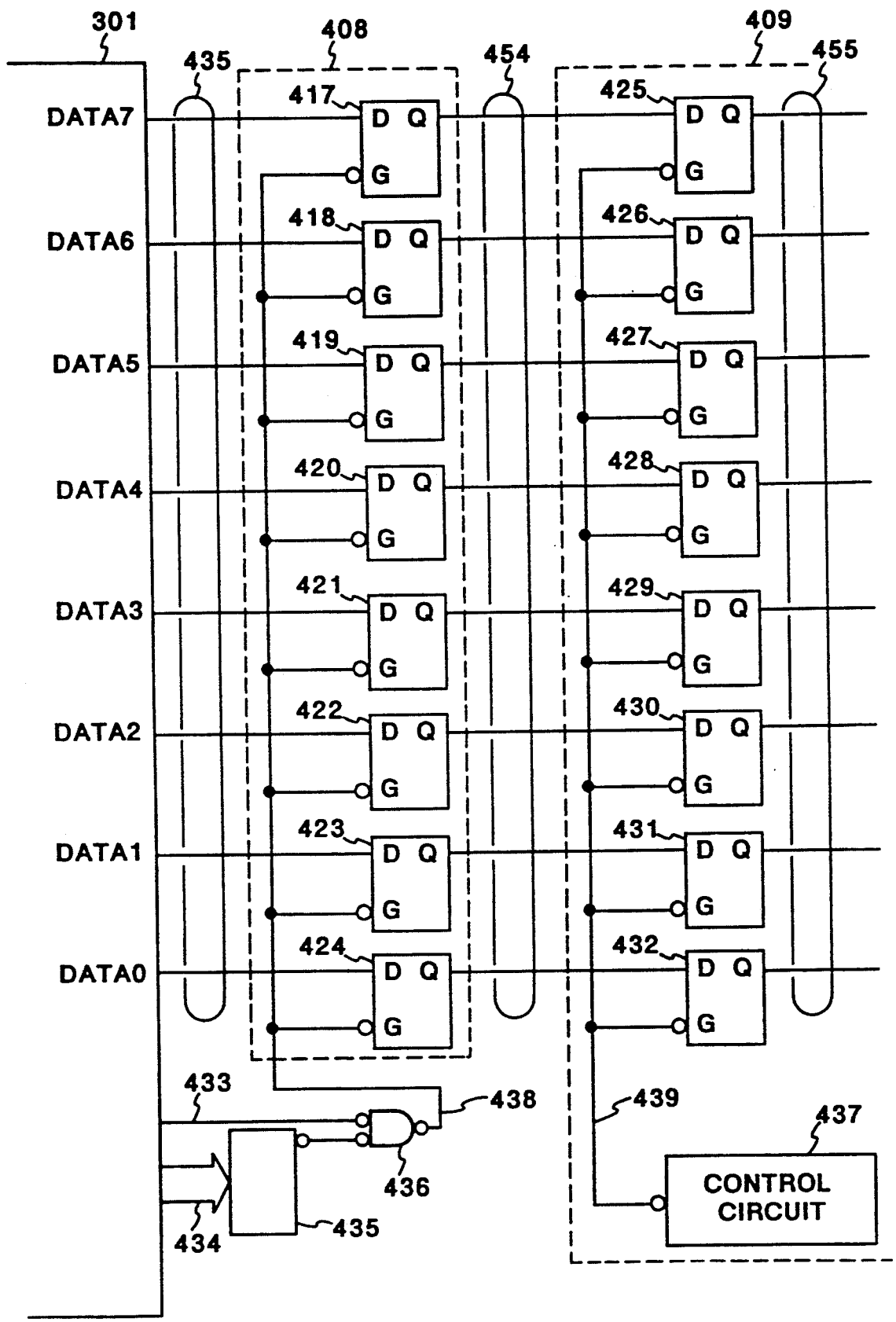
FIGS. 35 and 36 are circuit diagrams of the vicinity of a transmission register 408 and that of a reception register 415 which are respectively shown in FIGS. 33 and 34.
Figure 36:
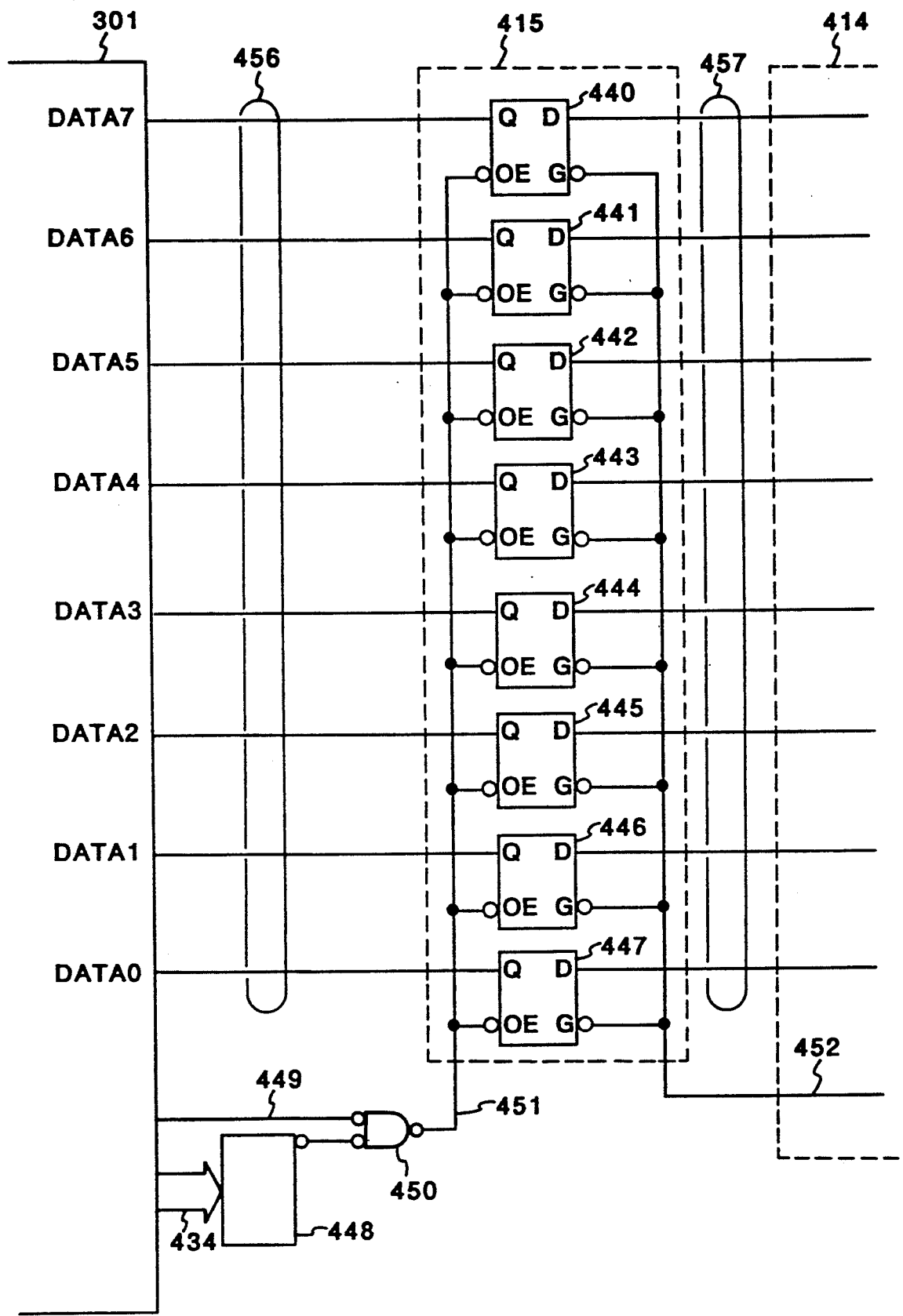
Figure 37:
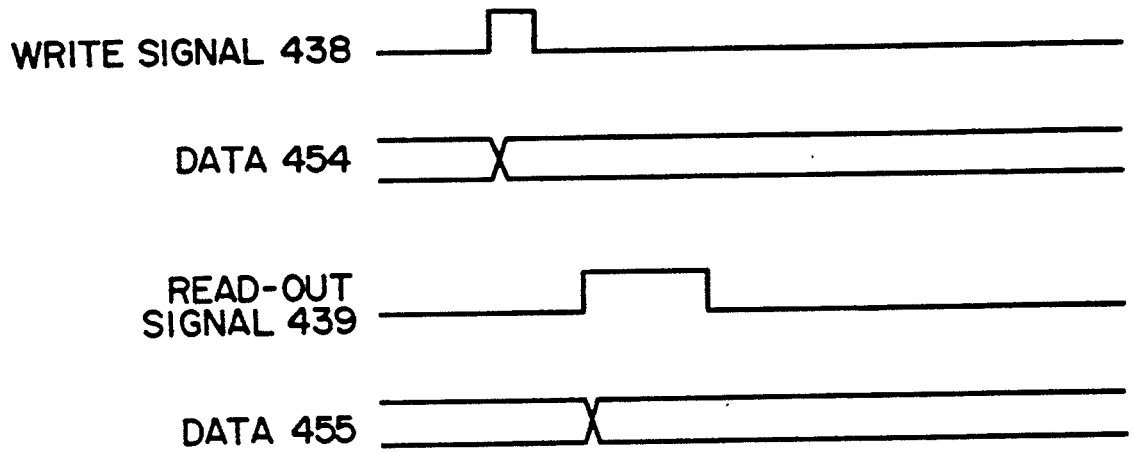
FIGS. 37 to 40 are timing charts of the operations in the configurations shown in FIGS. 33 and 34.
Figure 38:
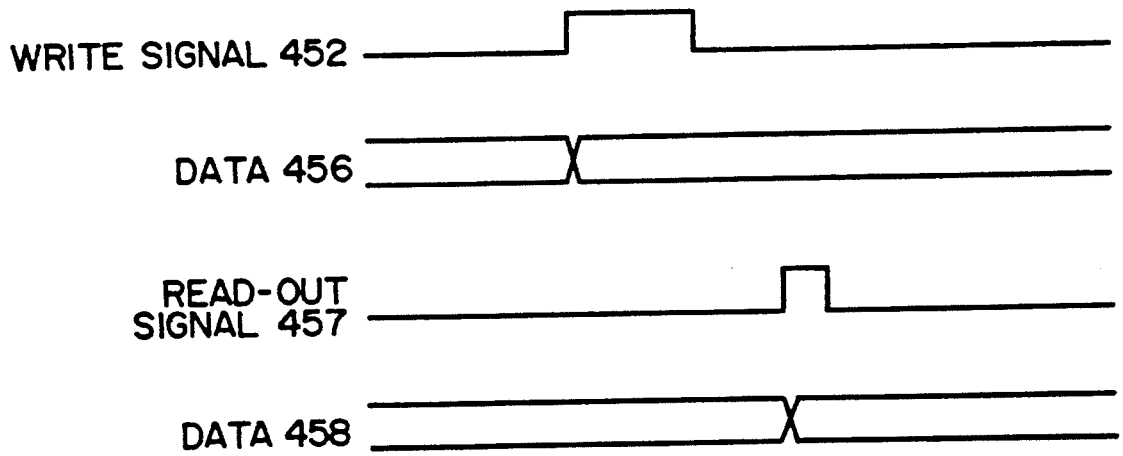
Figure 39:
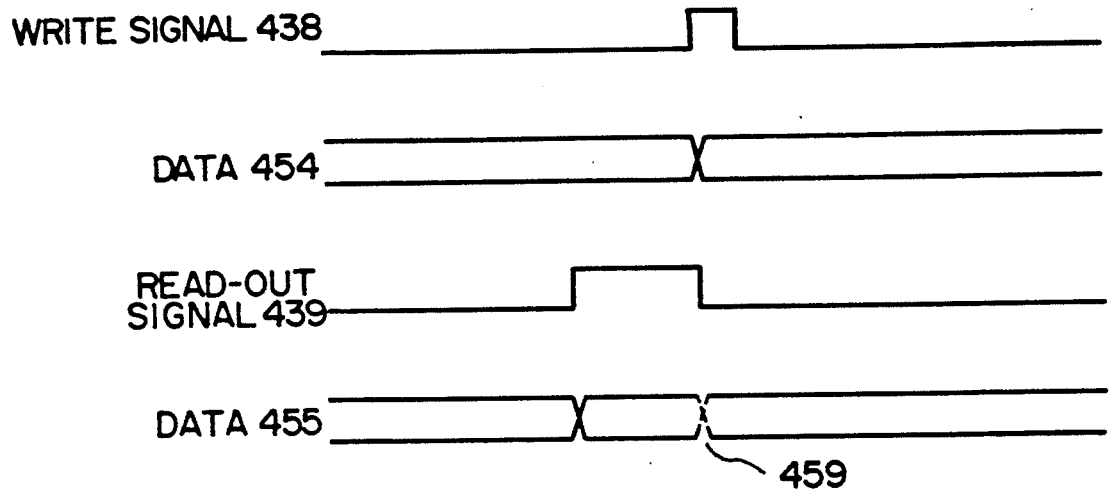
Figure 40:
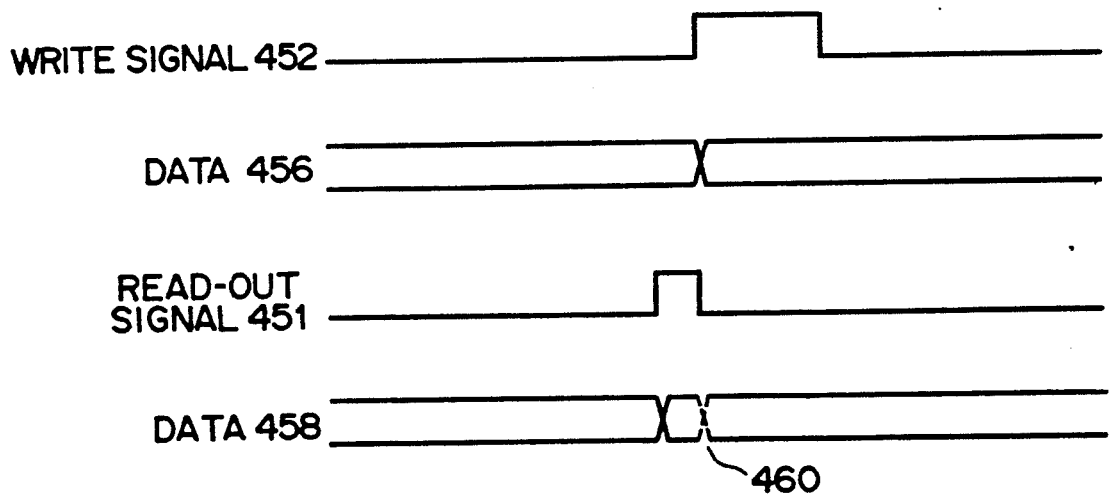

FIG. 27 is a timing chart for the read cycle of the CPU. A reference numeral 434 denotes an address signal for the CPU 301; 327 denotes a data bus (the portion indicated by a reference numeral 330 is the data, the address signal indicated by a reference numeral 329 being not used in this embodiment); 307 denotes an address latch signal; and 449 denotes a read signal. FIG. 28 shows the timing in which the aforementioned transition overlaps the data latched portion in the timing chart shown in FIG. 27. In FIG. 28, a reference numeral 307 denotes an address latch signal; 324 denotes a write pulse for the reception means 322; and 325 denotes a write pulse obtained by performing logical AND on the address latch signal 307 and the write pulse 324. In this way, data is not read at the transition of the data 327 latched in the reception register 321. That is, when the CPU 301 outputs the read signal 451, the latch pulse 325 can be generated at a time other than the time 332 at which the data 331 to be taken in the CPU is unstable.

More specifically, the reception register 321 takes in data from the reception means, and the data in the reception register 321 is read by the CPU 301 asynchronously with the taking in operation of the reception register 321. At that time, the reception register 321 takes in data from the reception means while the CPU 301 is not reading data from the reception register 321 (while the address latch signal 307 is at the logical low level). Consequently, the data read by the CPU 301 does not become undefined.

The aforementioned embodiments use the CPU having the multiplex data bus. However, other types of CPU may also be used. FIGS. 29 and 30 are timing charts for the read and write operation of the CPU in still another embodiment. In FIGS. 29 and 30, the address signals 332 and 335, the read signal 334 and the write signal 337 are the same as those in the aforementioned embodiments.

Memory request signals 333 and 336 are signals output by the CPU when the CPU reads data from and writes data in the memory. It is possible to implement the circuit similar to those of the aforementioned embodiments by using the rising edge of the memory request signals 333 and 336 as the address latch signal 307. That is, data is taken in the reception register 333 or data is taken out from the transmission register 304 when the memory request signals 333 and 336 rise while the aforementioned read request signal 310 or the write pulse 324 is at the logical low level.

In that case, the CPU 301 reads out data from the reception register 322 when the read signal 334 is at the logical low level and the data is taken in the reception register 322 when the memory request signal 333 rises (FIG. 29). Consequently, the data read out by the CPU 301 does not become undefined.

The CPU 301 writes data in the transmission register 304 when the write signal 337 is at the logical low level, and the data is taken out from the transmission register 304 by the transmission means 306 when the memory request signal 336 rises (FIG. 30). Consequently, the data taken in the transmission means does not become undefined.

Although an address strobe signal may be used as the memory request signals 333 and 336, if they are output while the write and read signals are not output, other signals may be used.

As will be understood from the foregoing description, the data used in the communications conducted within the control system can be guaranteed by the provision of a small circuit. Therefore, the present embodiments are suited to reduction in the size of the system and are advantageous in terms of production cost.

COMMUNICATION FORM OF THIS EMBODIMENT

The communication form of this embodiment will be described below in brief. A main control device (hereinafter referred to as a master communication device) for performing communication control is incorporated in a central processing device, and a sub-communication device (hereinafter referred to as a slave communication device) is incorporated in each of the units scattered within a system. Basically, the slave communication device in each unit converts serial data sent out from the master communication device into parallel data. The converted parallel data is used for control of actuators or switching of a high-voltage power source incorporated in that unit. Also, the slave communication device converts data representing the states of the sensors or switches provided within the unit into serial data and feeds it back to the master communication device. The serial data signal may be a modulated one.

That is, communication conducted in this system is performed on the basis of a handshake between one master communication device and one slave communication device, with one master communication device designating in serial data one desire slave communication device from N slave communication devices.

The actual operation of the slave communication device will now be described further.

Each slave communication device processes the received serial data under a predetermined condition and thereby makes a determination as to whether or not the received serial data is sent to itself. If the slave communication device determines that the received data is the serial signal sent to itself, it converts the control signal in the received serial data into parallel data. Also, the slave communication device converts the parallel data into serial data under a predetermined condition, and returns the serial signal to the master communication device together with the identification code of itself. Also, if the received data is the one sent to another slave communication device, the slave communication device neither accepts the control signal in the received serial data nor returns the parallel data input to itself to the master communication device.

In this way, collision of serial data can be avoided even in 1: N communication based on a handshake.

Figure 41:
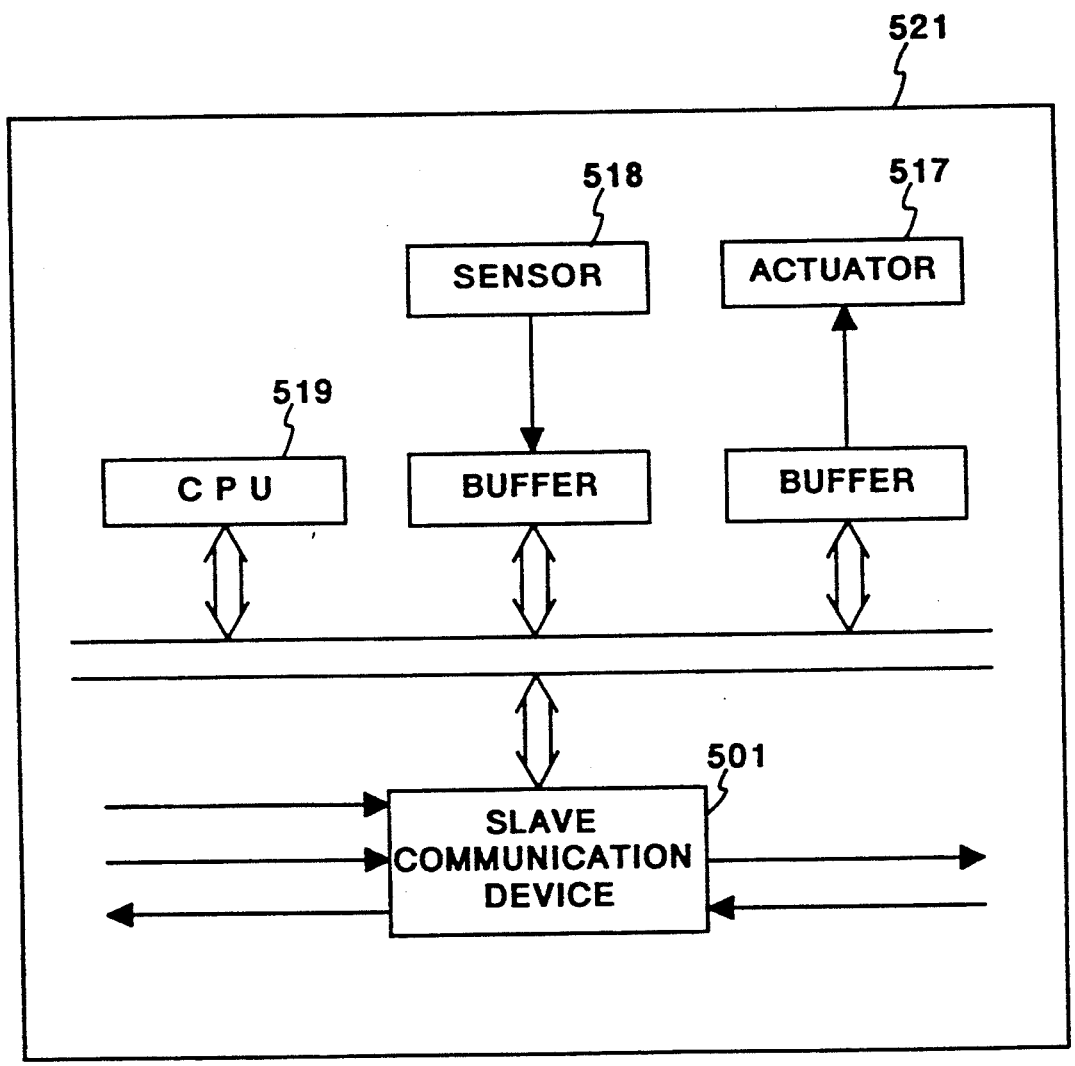
FIG. 41 is a block diagram of the unit employed in the embodiment of the present invention.

The configuration of each of the units in the system will be described with reference to FIG. 41. The unit includes a slave communication device 501, an actuator 517, a sensor 518, and a CPU (central processing unit) 519. The CPU 519 controls the actuator 517 on the basis of the instructions of the central processing device which is received by the slave communication device 501, and sends the detection output from the sensor 518 to the central processing device through the slave communication device 501.

Next, the operation of the slave communication device shown in FIG. 41 will be described with reference to FIG. 42.

In FIG. 42, the slave communication device 501 is a single chip integrated circuit.

A serial-parallel converting section 502 receives the serial signal used in the aforementioned communication form from the master communication device and outputs the received control data to the CPU 519 through a parallel output 512.

A parallel-serial converting section 503 receives the state data from the CPU 519 through a parallel input 513 and returns the serial signal to the master communication device.

The unit also includes input buffers 506 to 509, output buffers 504, 505 and 510, and a OR circuit 511.

In the slave communication device 501 shown in FIG. 42, the serial signal from the master communication device is not only received by the serial-parallel converting section 502 through the input buffer 509 but also is bypassed to the output buffers 504 and 505 so that it can be passed to another slave communication device.

Furthermore, the logical OR operation is performed on the serial signal from another slave communication device, which is input from the input buffers 506 and 507, and the serial signal from the parallel-serial converting section 503 by means of the OR circuit 511, by which the serial signal from another slave communication device is bypassed.

The bypassing function of the output buffers 504, 505 and 510 are maintained regardless of the state of the reset signal sent to that slave communication device.

Next, an example of connection between the slave communication devices and the master communication device will be described with reference to FIG. 43.

Figure 43:
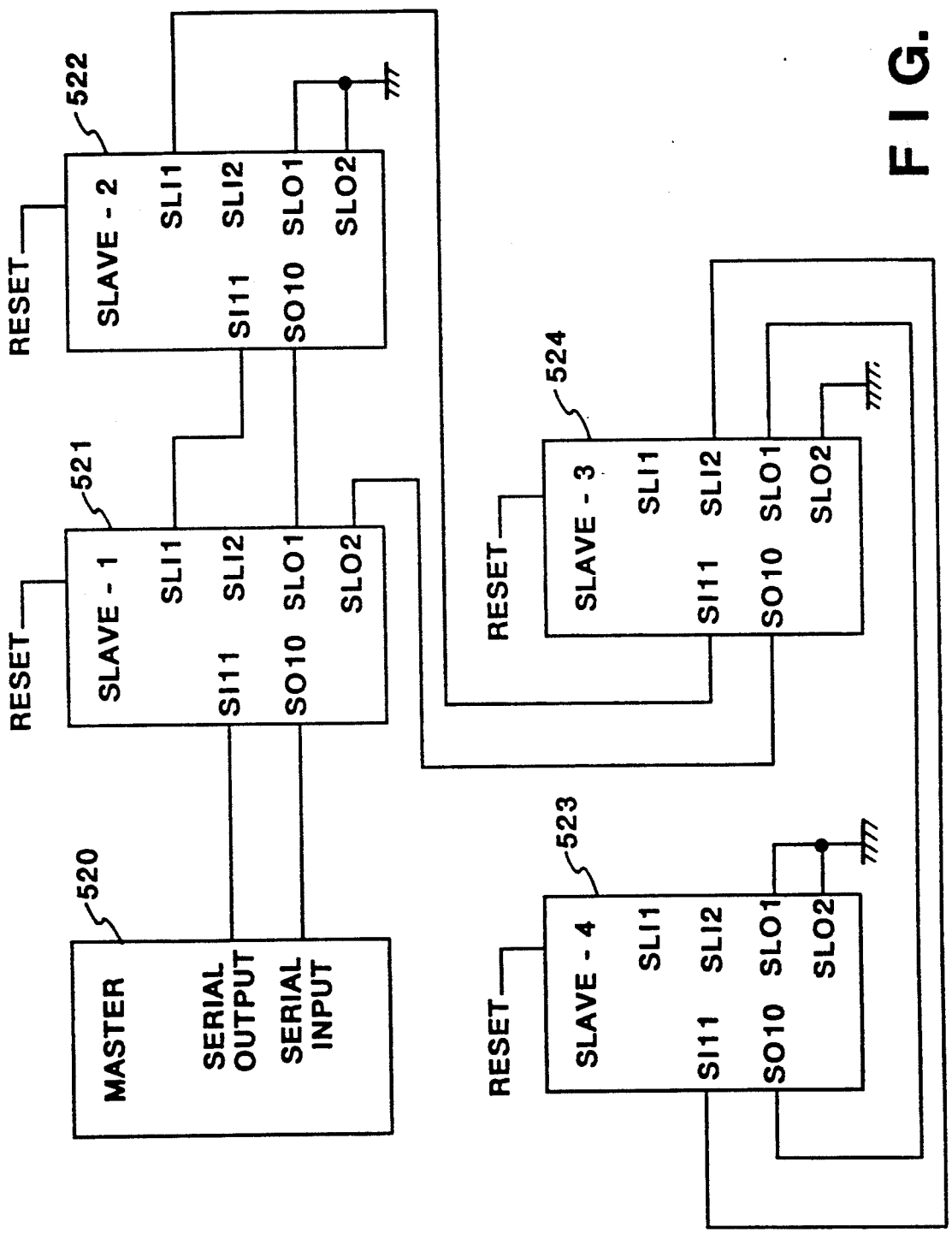
FIG. 43 is a block diagram showing the connection form in the embodiment.
Figure 45:
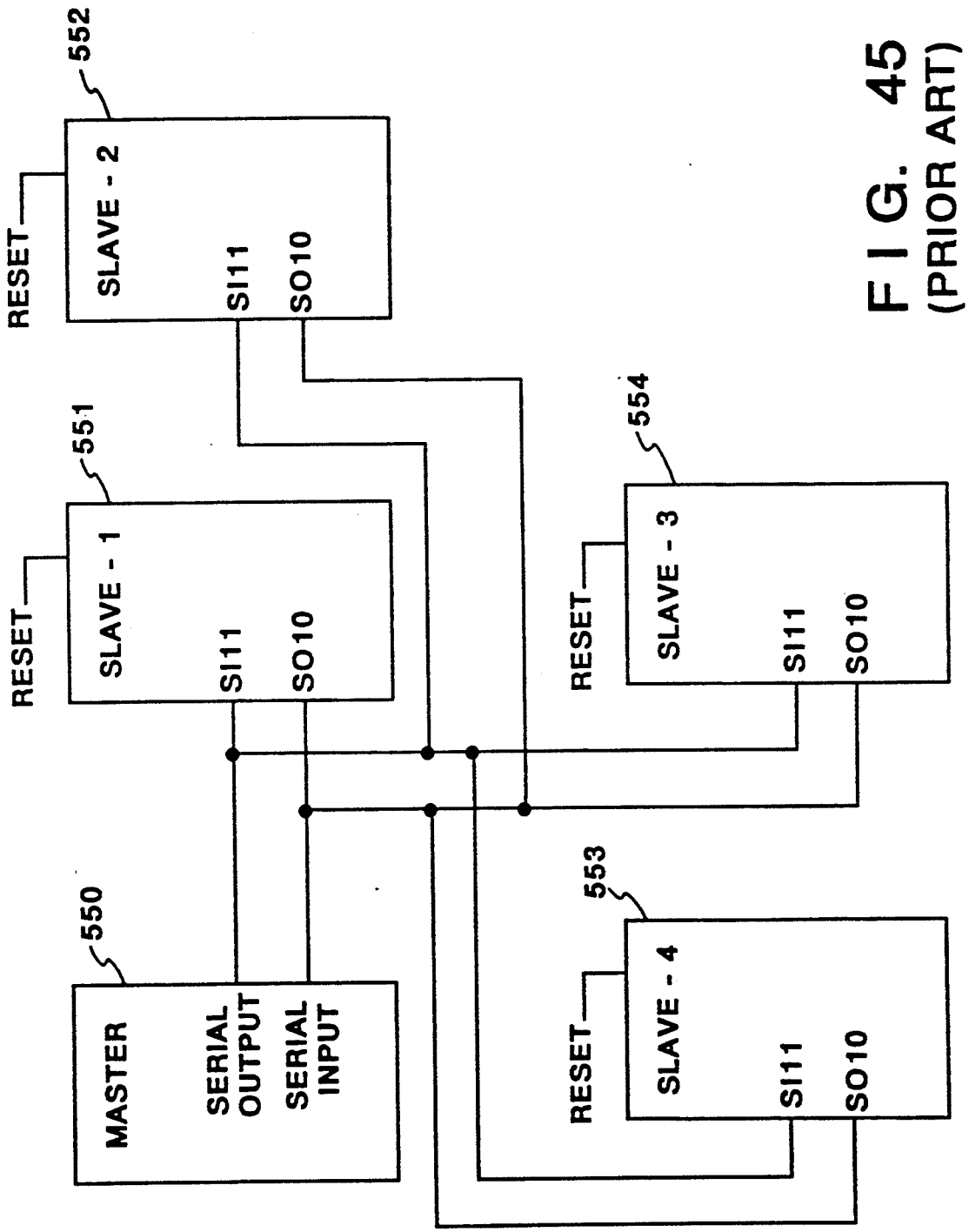
FIG. 45 is a block diagram showing the connection form in the conventional communication device.

In FIG. 43, a reference numeral 520 denotes the aforementioned master communication device, and reference numerals 521 to 524 respectively denote slave communication devices incorporated in individual units scattered within a system. Unlike the wiring shown in FIG. 45, serial communication lines are not pulled around but bypassed from the adjacent slave communication device. Also, it is not necessary for the serial communication lines to be made open when one of the slave communication devices is set to a reset state. Consequently, direct connection with the master communication device can be maintained in the slave communication devices connected behind the slave communication device which is in the reset state.

Figure 44:
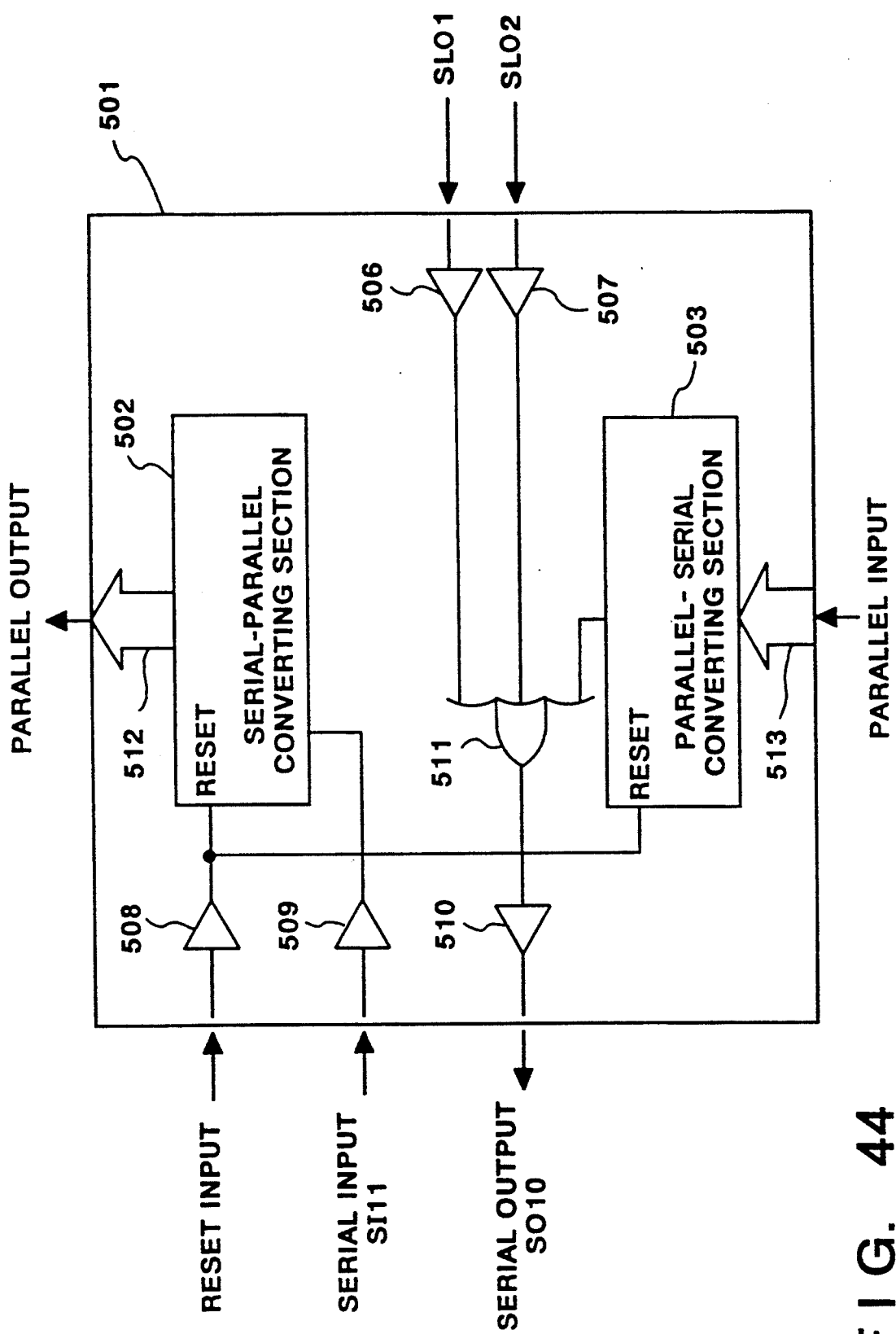
FIG. 44 is a block diagram showing another embodiment.

FIG. 44 shows another example of the configuration of the slave communication device. The same reference numerals are used to denote parts which are the same as those shown in FIG. 42. The slave communication device shown in FIG. 44 has no bypass means for bypassing the serial signal from the master communication device. That is, whereas bypass of the serial signal is conducted using the buffers in the slave communication device shown in FIG. 42, it may be conducted when necessary in the slave communication device shown in FIG. 44 by using transistors or the like attached to the slave communication device.

The examples of the serial signal bypassing circuits shown in FIGS. 42 and 44 are illustrative and not restrictive. Any circuit configuration can be used when it implements bypass which is not interrupted by the reset of that slave communication device.

The number of bypasses is not limited to that shown in these examples. It may be at least one. Furthermore, the number of communication lines for reception of the serial signal need not coincide with that for transmission thereof.

As will be understood from the foregoing description, in the present invention, a bypass means is provided in the sub-communication device for transferring the serial communication signal received by or transmitted from that sub-communication device to another sub-communication device. Furthermore, even when the sub-communication device is set to a reset state, the bypass means is capable of transferring the serial communication signal regardless of the state of that sub-communication device. Consequently, the master communication device can be connected to the slave communication devices physically in series and electrically parallel. As a result, it is not necessary for the drive ability of the serial communication signal of the master communication device to be enhanced, and the length of extension of the serial lines can be greatly decreased. Furthermore, as compared with the configuration in which the master communication device and the individual slave communication devices are parallel-connected independently, the length and number of wires and the assembly cost can be decreased. This leads to reduction in the production cost.

It is clear that the above-described communication form can also be applied to optical radio communication which utilizes light.

While there has been described what is at present considered to be the preferred embodiments of the invention, it will be understood that various modifications, changes and additions maybe made therein, and it is intended to cover in the appended claims all such modifications, changes and additions as fall within the true spirit and scope of the invention.

What is claimed is:

1. A communication system including:
   a plurality of units;
   a main control portion for controlling said plurality of units;
   communication means for transmitting and receiving information between said main control portion and said plurality of units; and
   error detecting means connected to said communication means for detecting a communication error during transmitting and receiving information via said communication means, said error detecting means including at least one of first and second error detection means,
   said first error detection means including transmit data creation means for creating first data in which positive data and negative data opposite to the positive data of the information to be transmitted are contained at predetermined positions in one frame, receive data analysis means for analyzing whether received valid information includes positive data and negative data opposite thereto in a frame, and detecting means for detecting a communication error when said receive data analysis means analyzes that the valid information does not include the positive and negative data, said second error detection means including space bit addition means for creating second data in which a predetermined space bit is added in one frame of information to be transmitted, space bit separation means for separating a space bit from received valid information, and communication error detecting means for detecting a communication error in received valid information independently of values of the received valid information when said space bit separation means detects that the predetermined space bit is not existent.

2. The communication system according to claim 1, further comprising means for creating serial data based on the information which is to be transmitted between said plurality of units and said main control portion in a state in which ID data characterizing each of said plurality of units is added in the one frame.

3. The communication system according to claim 1, wherein said communication means includes photoelectrical conversion means for conducting conversion between an electric signal and a light signal, the serial transmission of data being conducted by an optical communication.

4. The communication system according to claim 1, wherein said communication means transmits and receives information serially.

5. A communication error detection apparatus comprising:
receiving means for receiving a plurality of valid bits of sequential data;
discriminating means connected to said receiving means for discriminating whether the plurality of valid bits includes positive data at one predetermined position in a frame and negative data opposite to the positive data at another predetermined position in the frame; and
detecting means connected to said discriminating means for detecting a communication error when said discriminating means discriminates that the plurality of valid bits does not include the positive data and the negative data.

6. A communication error detection apparatus according to claim 5, wherein said receiving means receives serial data.

7. A communication error detection apparatus comprising:
receiving means for receiving a plurality of bits of sequential data;
discriminating means connected to said receiving means for discriminating whether a data bit at a predetermined bit position in the plurality of bits is a space bit; and
detecting means connected to said discriminating means for detecting a communication error independently of values of the plurality of bits when said discriminating means discriminates that the data bit at the predetermined bit position is not a space bit.

8. A communication error detection apparatus according to claim 7, wherein the space bit is zero.

9. A communication error detection apparatus according to claim 7, wherein said receiving means receives serial data.

10. A communication error detection apparatus comprising:
receiving means for receiving a plurality of bits of sequential data;
comparing means connected to said receiving means for comparing two data bits at adjacent bit positions in the plurality of bits;
first detecting means connected to said comparing means for detecting a first communication error when the two data bits compared by said comparing means are equal, said apparatus changing the two data bits to a valid bit in response to said first detecting means not detecting the first communication error;
discriminating means connected to said receiving means for discriminating whether a plurality of valid bits of the received sequential data include positive data and negative data opposite to the positive data; and
second detecting means connected to said discriminating means for detecting a second communication error when said discriminating means discriminates that the plurality of valid bits do not include the positive data and the negative data.

11. A communication error detection apparatus according to claim 10, wherein said comparing means compares two adjoining data bits included in the plurality of bits.

12. A communication error detection apparatus according to claim 10, wherein said receiving means receives serial data.

13. A communication error detection apparatus comprising:
receiving means for receiving a plurality of bits of sequential data;
comparing means connected to said receiving means for comparing two data bits at predetermined bit positions in the plurality of bits;
first detecting means connected to said comparing means for detecting a first communication error when the two data bits compared by said comparing means are equal, said apparatus changing the two data bits to a valid bit in response to said first detecting means not detecting the first communication error;
discriminating means connected to said receiving means for discriminating whether a data bit at a predetermined bit position in a plurality of valid bits of the received sequential data is a space bit; and
second detecting means connected to said discriminating means for detecting a second communication error independently of values of the plurality of bits when said discriminating means discriminates that the bit data at the predetermined bit position is not a space bit.

14. A communication error detection apparatus according to claim 13, wherein said comparing means compares two adjoining data bits included in the plurality of bits.

15. A communication error detection apparatus according to claim 13, wherein said receiving means receives serial data.

16. A communication error detection apparatus according to claim 13, wherein the space bit is zero.

17. A communication error detection apparatus comprising:
- receiving means for receiving a plurality of valid bits of sequential data;
- first discriminating means connected to said receiving means for discriminating whether the plurality of valid bits include positive data and negative data opposite to the positive data;
- first detecting means connected to said first discriminating means for detecting a first communication error when said first discriminating means discriminates that the plurality of valid bits do not include the positive data and negative data;
- second discriminating means connected to said receiving means for discriminating whether a data bit at a predetermined bit position in the plurality of valid bits is a space bit;
- second detecting means connected to said second discriminating means for detecting a second communication error independently of values of the plurality of valid bits when said second discriminating means discriminates that the data bit included at the predetermined bit position is not a space bit; and
- error detecting means connected to said first and second detecting means for detecting a combination communication error when at least one of the first and second communication errors is detected.

18. A communication error detection apparatus according to claim 17, wherein said receiving means receives serial data.

19. A communication error detection apparatus according to claim 17, wherein the space bit is zero.

20. A communication error detection apparatus comprising:
- receiving means for receiving a plurality of bits of sequential data;
- comparing means connected to said receiving means for comparing two data bits at a predetermined bit position in the plurality of bits;
- first detecting means connected to said comparing means for detecting a first communication error when the two data bits compared by said comparing means are equal, said apparatus changing the two data bits to a valid bit in response to said first detecting means not detecting the first communication error;
- first discriminating means connected to said receiving means for discriminating whether the plurality of valid bits of the received sequential data include positive data and negative data opposite to the positive data;
- second detecting means connected to said first discriminating means for detecting a second communication error when said first discriminating means discriminates that the plurality of valid bits do not include the positive data and negative data;
- second discriminating means connected to said receiving means for discriminating whether a data bit at a predetermined bit position in the plurality of valid bits is a space bit when all of the plurality of bits are changed to valid bits;
- third detecting means connected to said second discriminating means for detecting a third communication error independently of values of the plurality of valid bits when said second discriminating means discriminates that the data bit at the predetermined bit position is not a space bit; and
- error detecting means connected to said first, second and third detecting means for detecting a combination communication error when the first communication error is detected or when at least one of the second and third communication errors is detected.

21. A communication error detection apparatus according to claim 20, wherein said comparing means compares two adjoining data bits included in the plurality of bits.

22. A communication error detection apparatus according to claim 20, wherein said receiving means receives serial data.

23. A communication error detection apparatus according to claim 20, wherein the space bit is zero.

* * * * *